(12) United States Patent
Boothroyd et al.

(10) Patent No.: US 8,817,371 B1
(45) Date of Patent: Aug. 26, 2014

(54) POLARIZING BEAM SPLITTERS

(76) Inventors: Simon Andrew Boothroyd, Ottawa (CA); Jerzy Adam Dobrowolski, Ottawa (CA)

(*) Notice: Subject to any disclaimer, the term of this patent is extended or adjusted under 35 U.S.C. 154(b) by 445 days.

(21) Appl. No.: 12/512,007

(22) Filed: Jul. 29, 2009

Related U.S. Application Data

(60) Provisional application No. 61/085,817, filed on Aug. 1, 2008.

(51) Int. Cl.
*G02B 5/30* (2006.01)
*G02B 27/28* (2006.01)

(52) U.S. Cl.
USPC ............... 359/485.02; 359/485.03; 359/583; 359/900

(58) Field of Classification Search
USPC ........... 359/485.02, 485.03, 489.19, 583, 900
See application file for complete search history.

(56) References Cited

U.S. PATENT DOCUMENTS

| | | | |
|---|---|---|---|
| 2,403,731 A | | 7/1946 | MacNeille |
| 4,320,936 A | * | 3/1982 | Sawamura .................... 359/359 |

(Continued)

OTHER PUBLICATIONS

"Visible Broadband, Wide-Angle, Thin-Film Multilayer Polarizing Beam Splitter", Li et al., May 1, 1996, vol. 35, No. 13, Applied Optics, p. 2221-2225.

(Continued)

*Primary Examiner* — Ricky D Shafer
(74) *Attorney, Agent, or Firm* — Marks & Clerk; Richard J. Mitchell

(57) ABSTRACT

A polarizing beam splitter has a pair of opposed transparent prism substrates with a refractive index $n_0$, and providing at least one input port and at least one output port. The input port accepts light incident over a range of operational angles including a central operational angle. A multilayer thin film structure is sandwiched between the pair of opposed transparent substrates and consists essentially of a plurality of layers $l_1 \ldots l_m$ having respective refractive indices $n_1 \ldots n_m$, wherein at least three of said refractive indices $n_1 \ldots n_m$ are different, and wherein the refractive index of the substrates $n_0$ lies between the highest refractive index $n_H$ and lowest refractive index $n_L$, and wherein $n_H$, $n_L$ and $n_0$ define a Brewster angle $\theta_{OB}$:

$$\theta_{OB} = \arcsin\left(\frac{n_L n_H}{n_0 \sqrt{n_L^2 + n_H^2}}\right), \text{ and}$$

a critical angle $\theta_c$:

$$\theta_C = \arcsin\left(\frac{n_L}{n_0}\right).$$

The refractive indices $n_0$ and $n_1 \ldots n_m$ are selected such that the central operational angle for a beam incident on the multiple thin film structure lies above the Brewster angle $\theta_{OB}$ and such that most or all the operational angles defined by said input port lie above the Brewster angle $\theta_{OB}$. For p-polarized light at least one optical admittance of the layers with refractive indices $n_1 \ldots n_m$ is lower or very close to that of the optical admittance of the substrate for the operational angles such that the thin film polarizing beam-splitter favors the transmittance for p-polarized light incident at that input port such that most of the p-polarized light is transmitted through the multiple thin film structure. For s-polarized light the polarizing beam-splitter acts as a high reflective coating to favor the reflectance for s-polarized light incident at the input port such that most of the s-polarized light is reflected from said multiple thin film structure. The polarizing beam splitter is compact and yet remains functional over a wide range of operational angles.

34 Claims, 22 Drawing Sheets

(56) References Cited

U.S. PATENT DOCUMENTS

| | | | |
|---|---|---|---|
| 4,733,926 A * | 3/1988 | Title | 359/352 |
| 5,122,906 A * | 6/1992 | Wheatley | 359/586 |
| 5,400,179 A * | 3/1995 | Ito | 359/588 |
| 5,453,859 A | 9/1995 | Sannohe et al. | |
| 5,625,491 A * | 4/1997 | von Gunten et al. | 359/485.02 |
| 5,822,124 A * | 10/1998 | Matsuda et al. | 359/583 |
| 5,828,489 A * | 10/1998 | Johnson et al. | 359/485.02 |
| 5,912,762 A * | 6/1999 | Li et al. | 359/352 |
| 6,014,255 A * | 1/2000 | Van Der Wal et al. | 359/485.03 |
| 6,310,729 B1 * | 10/2001 | Tsukamoto | 359/634 |
| 6,317,264 B1 * | 11/2001 | Li et al. | 359/485.03 |
| 6,432,854 B1 * | 8/2002 | Ueda et al. | 501/74 |
| 6,462,873 B1 | 10/2002 | Kwok et al. | |
| 6,623,121 B2 * | 9/2003 | Sato | 353/20 |
| 6,791,750 B2 * | 9/2004 | Masubuchi et al. | 359/485.03 |
| 6,967,776 B2 * | 11/2005 | Muraguchi et al. | 359/485.03 |
| 7,379,242 B2 * | 5/2008 | Ushigome | 359/485.02 |
| 2004/0061937 A1 | 4/2004 | Masubuchi et al. | |
| 2008/0158673 A1 | 7/2008 | Maeda et al. | |

OTHER PUBLICATIONS

"High Performance Thin-Film Polarizing Beam Splitter Operating at Angles Greater Than the Critical Angle", Li et al., Jun. 1, 2000, vol. 39, No. 16, Applied Optics, p. 2754-2771.

"Optical Coatings for Displays", Li Li, Optical Interference Coatings, Springer 2003, Springer Series in Optical Sciences, vol. 88, p. 423-454.

* cited by examiner

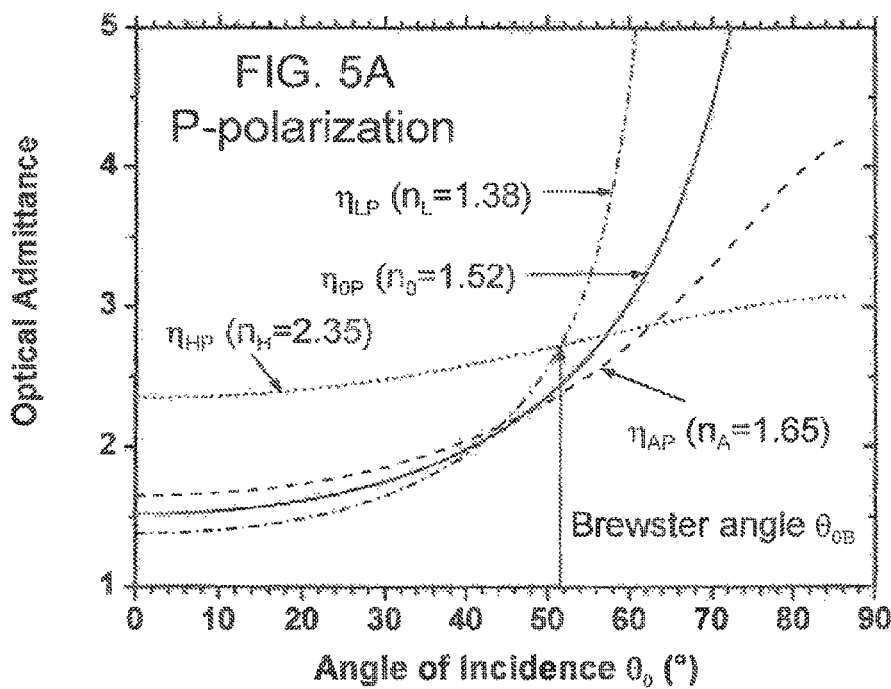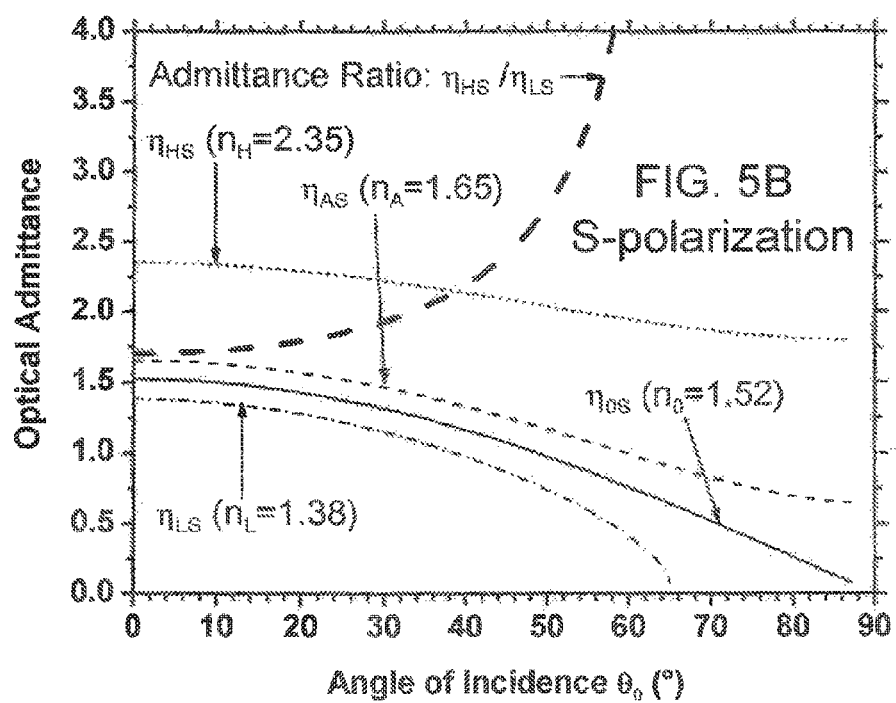

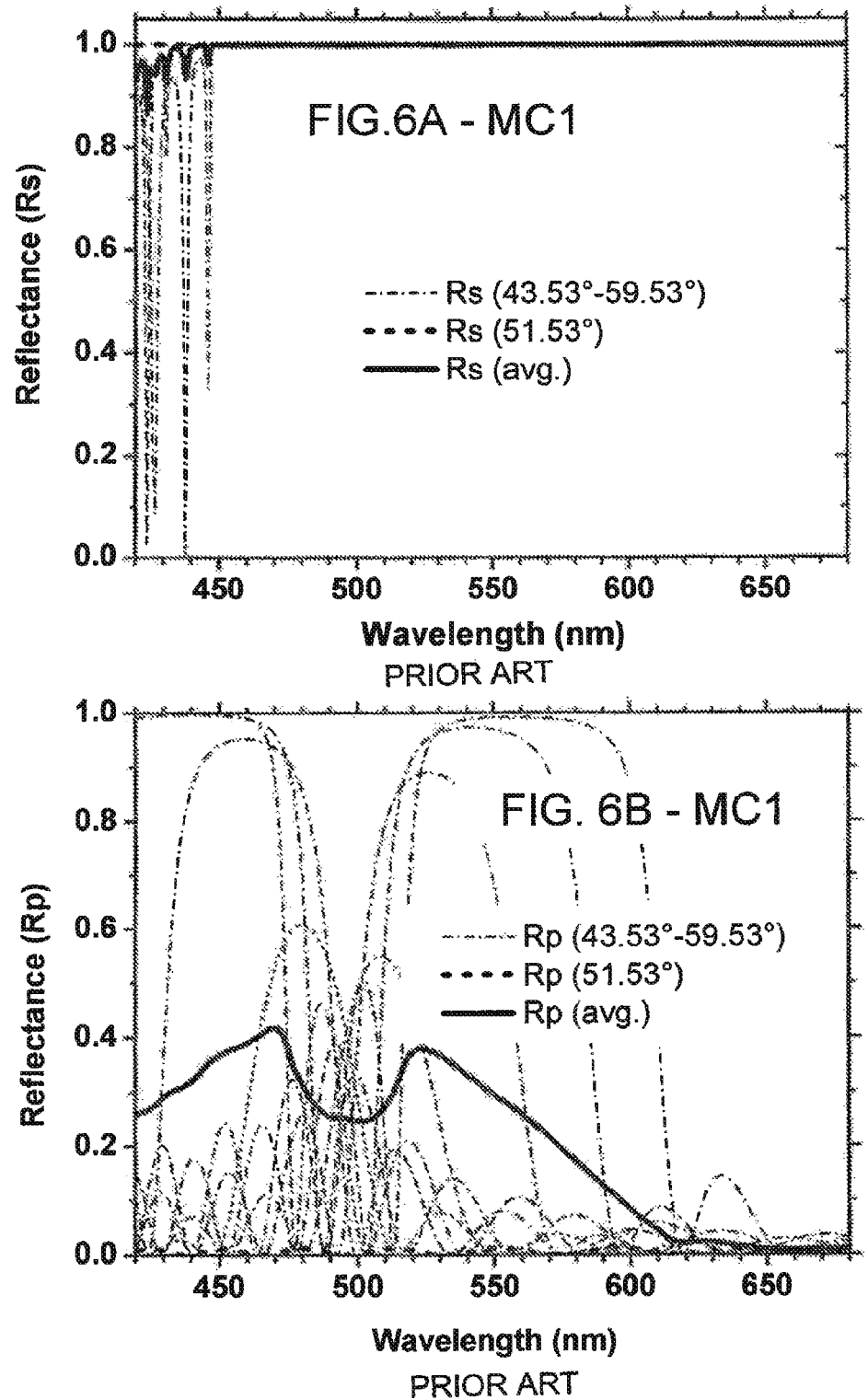

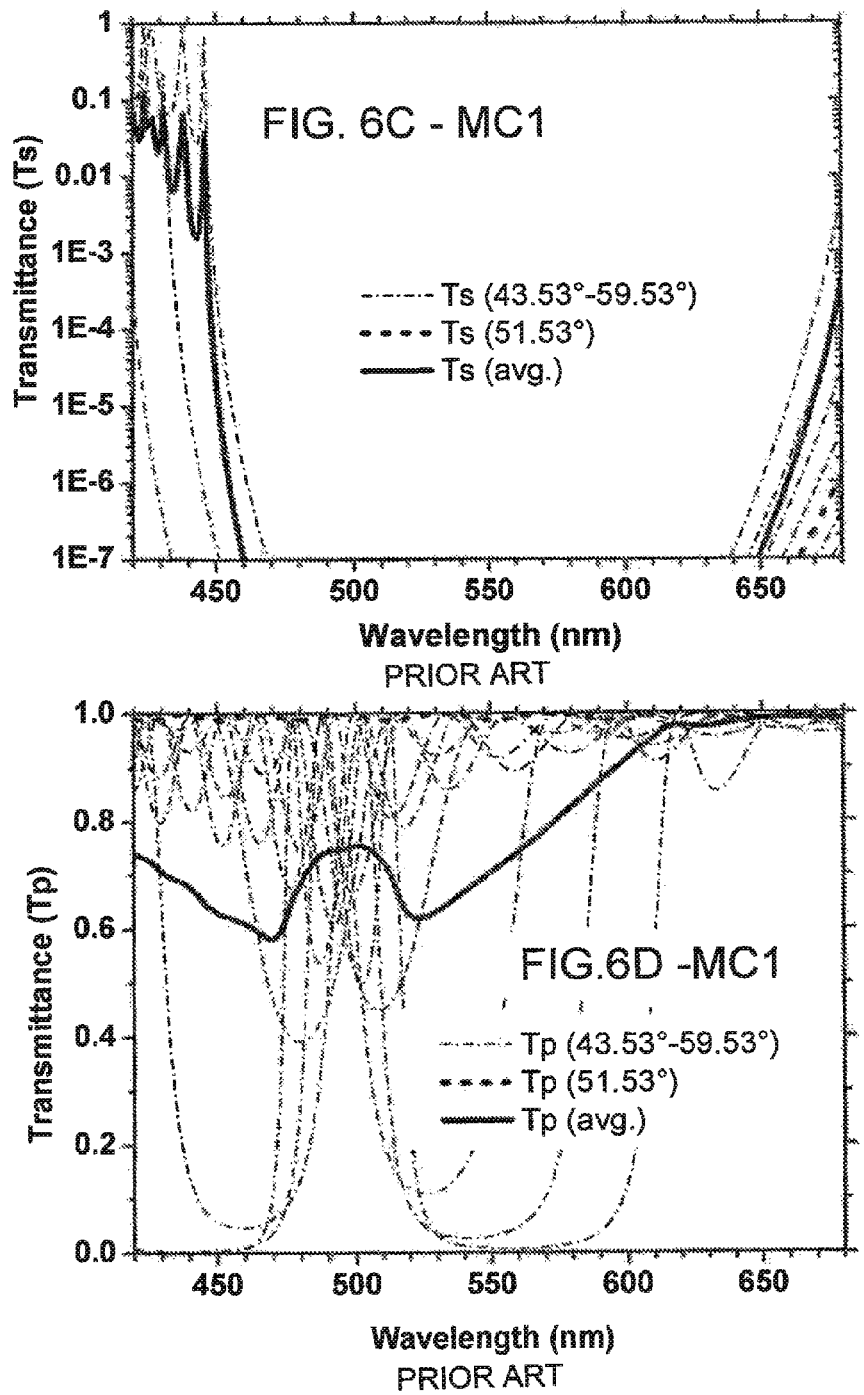
FIG. 6C - MC1
PRIOR ART
FIG. 6D - MC1
PRIOR ART

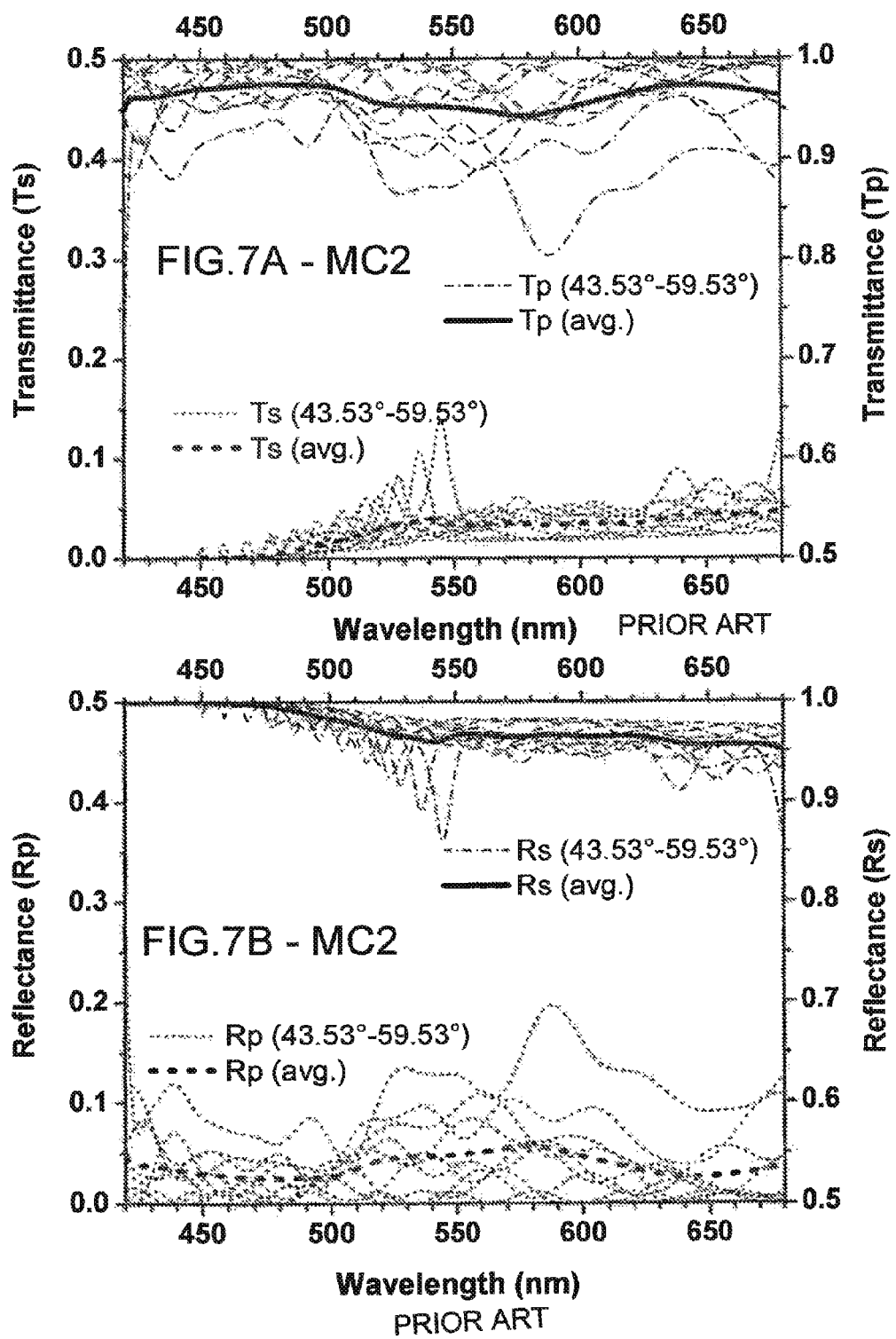

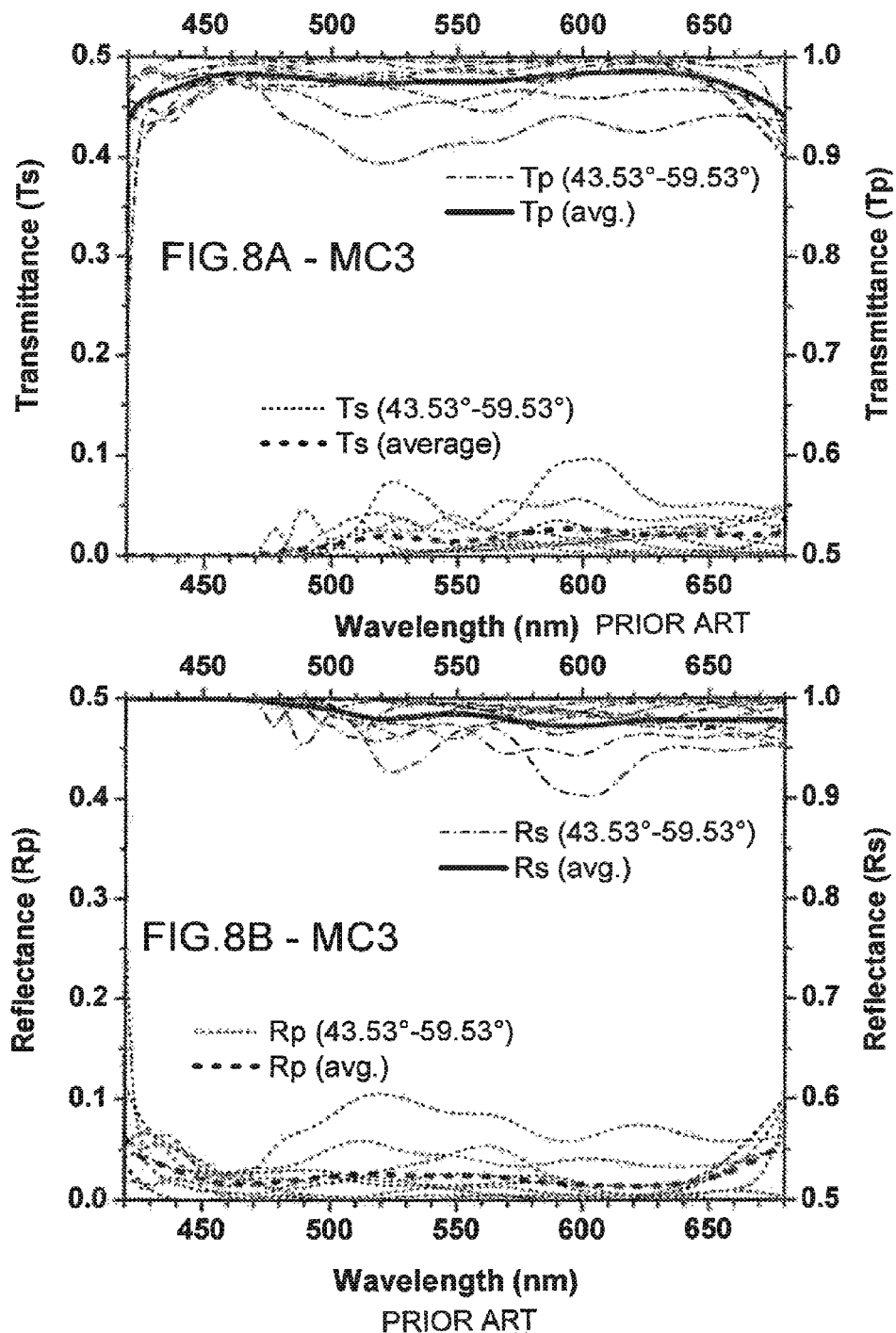

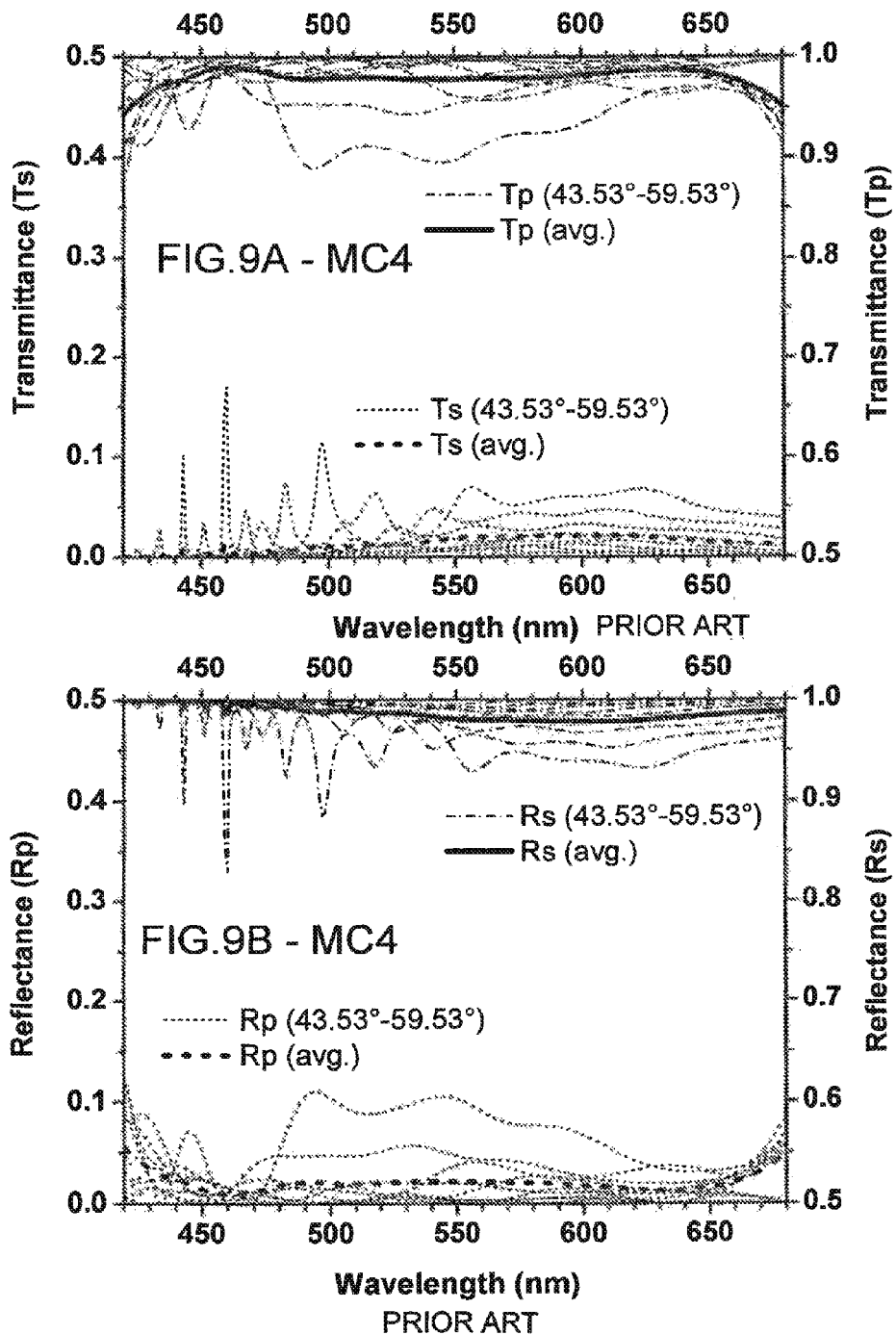

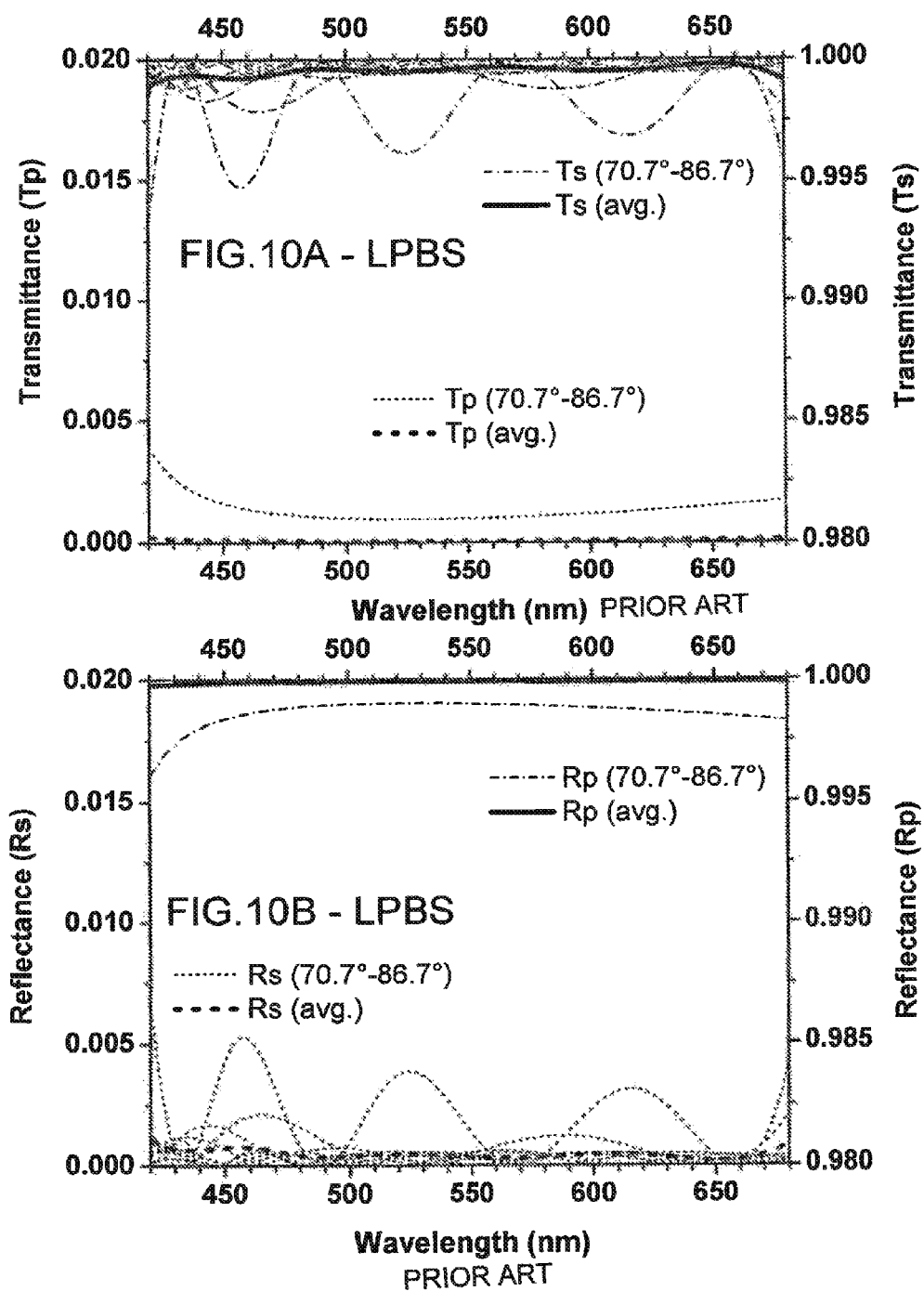

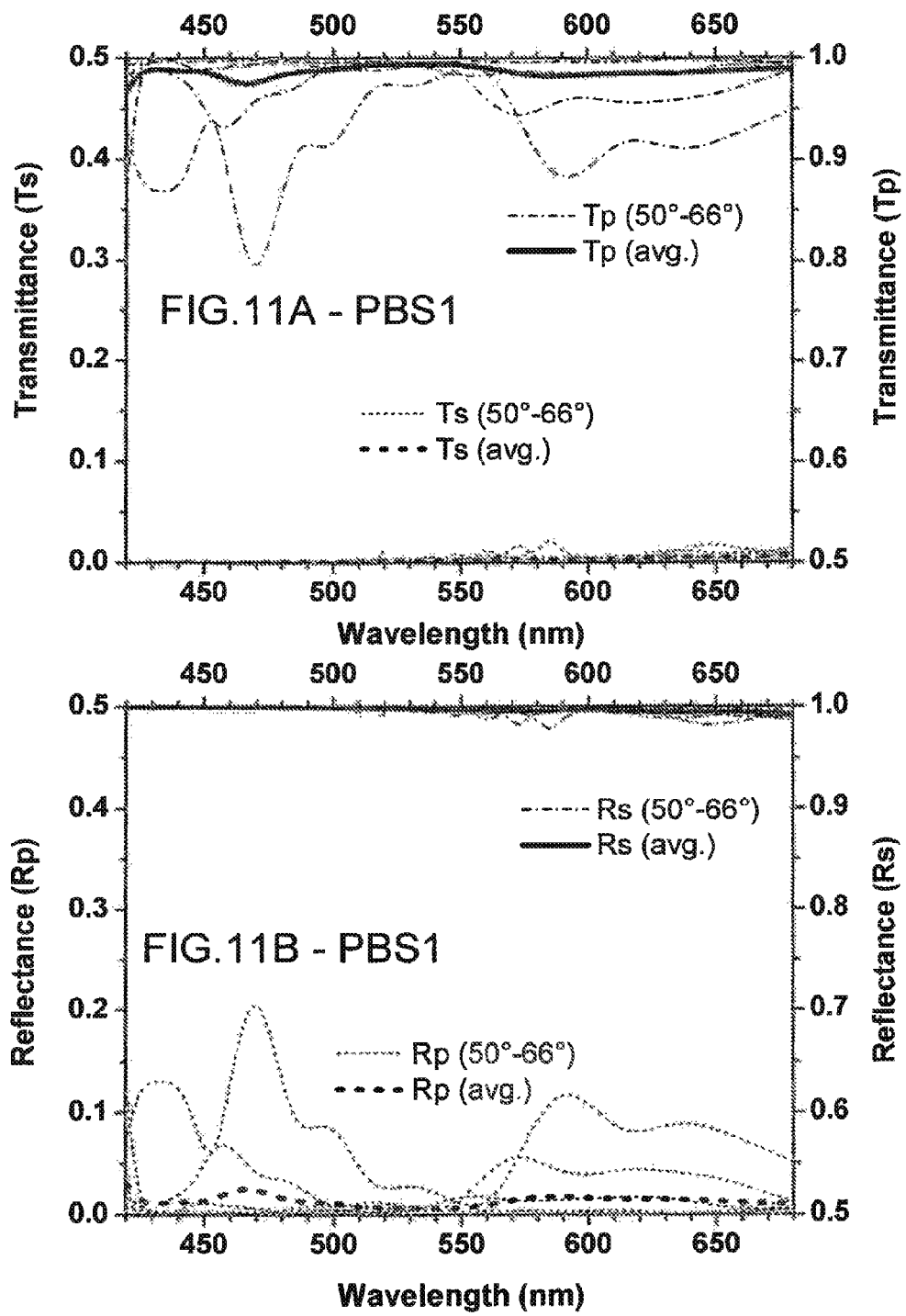

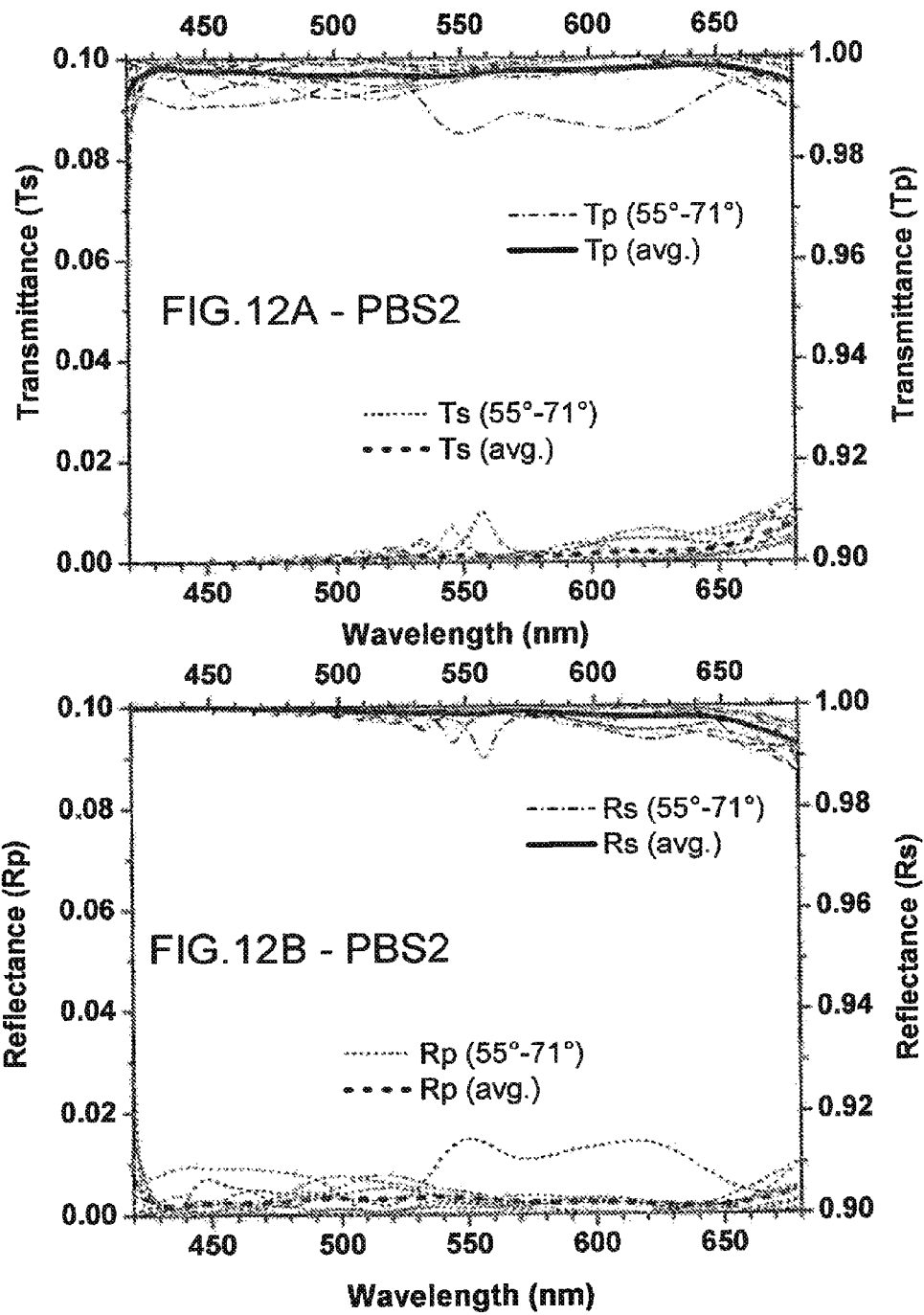

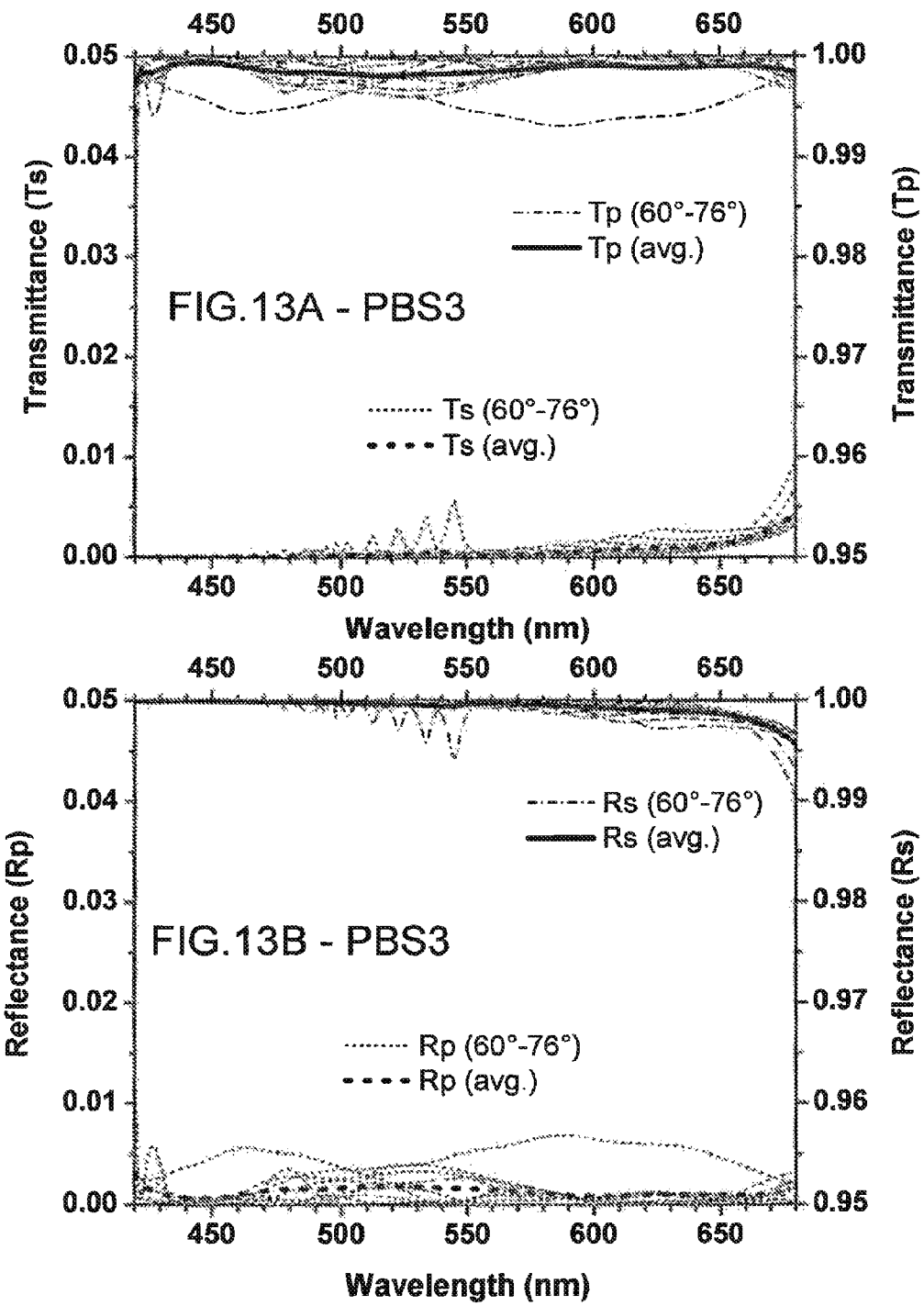

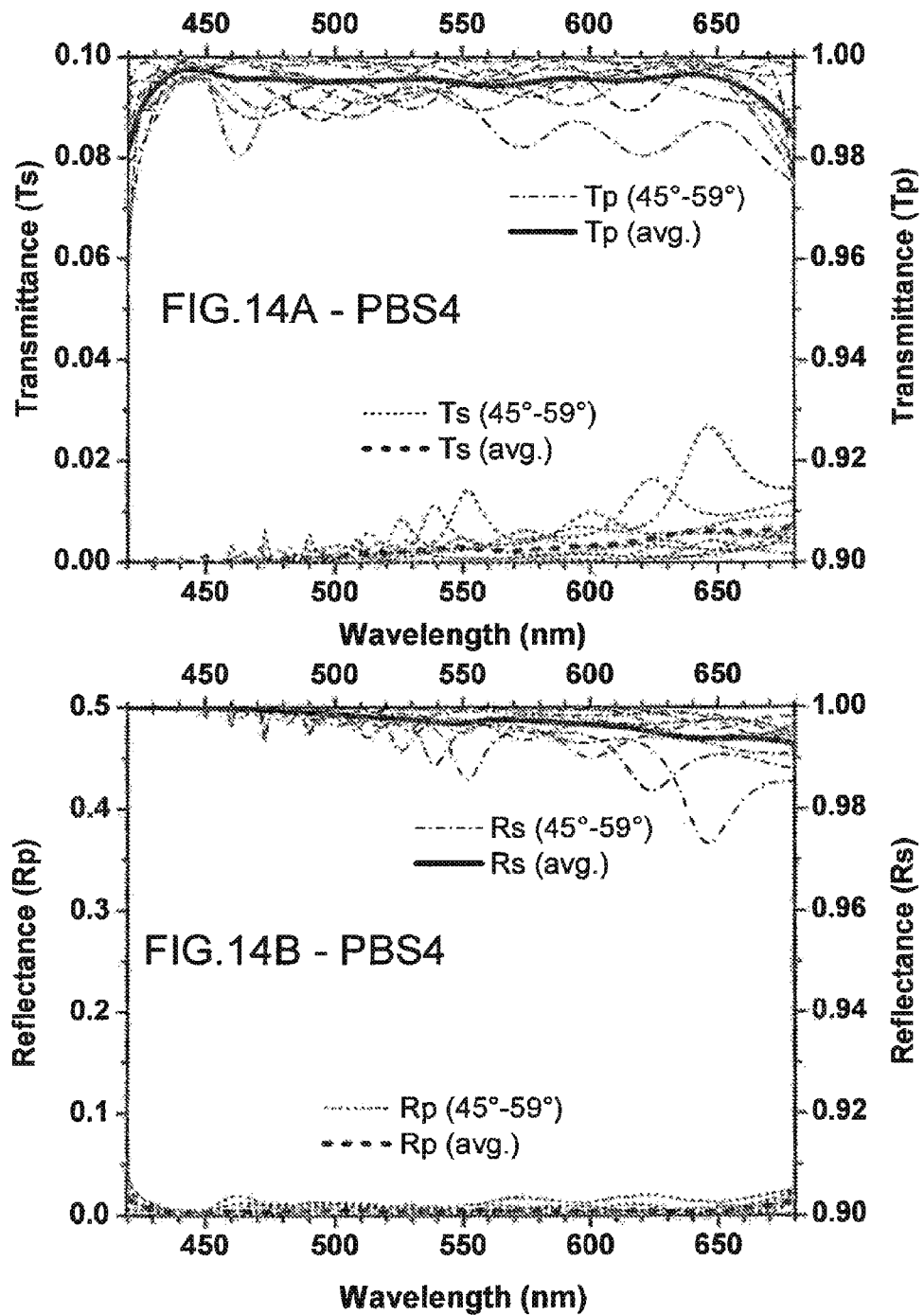

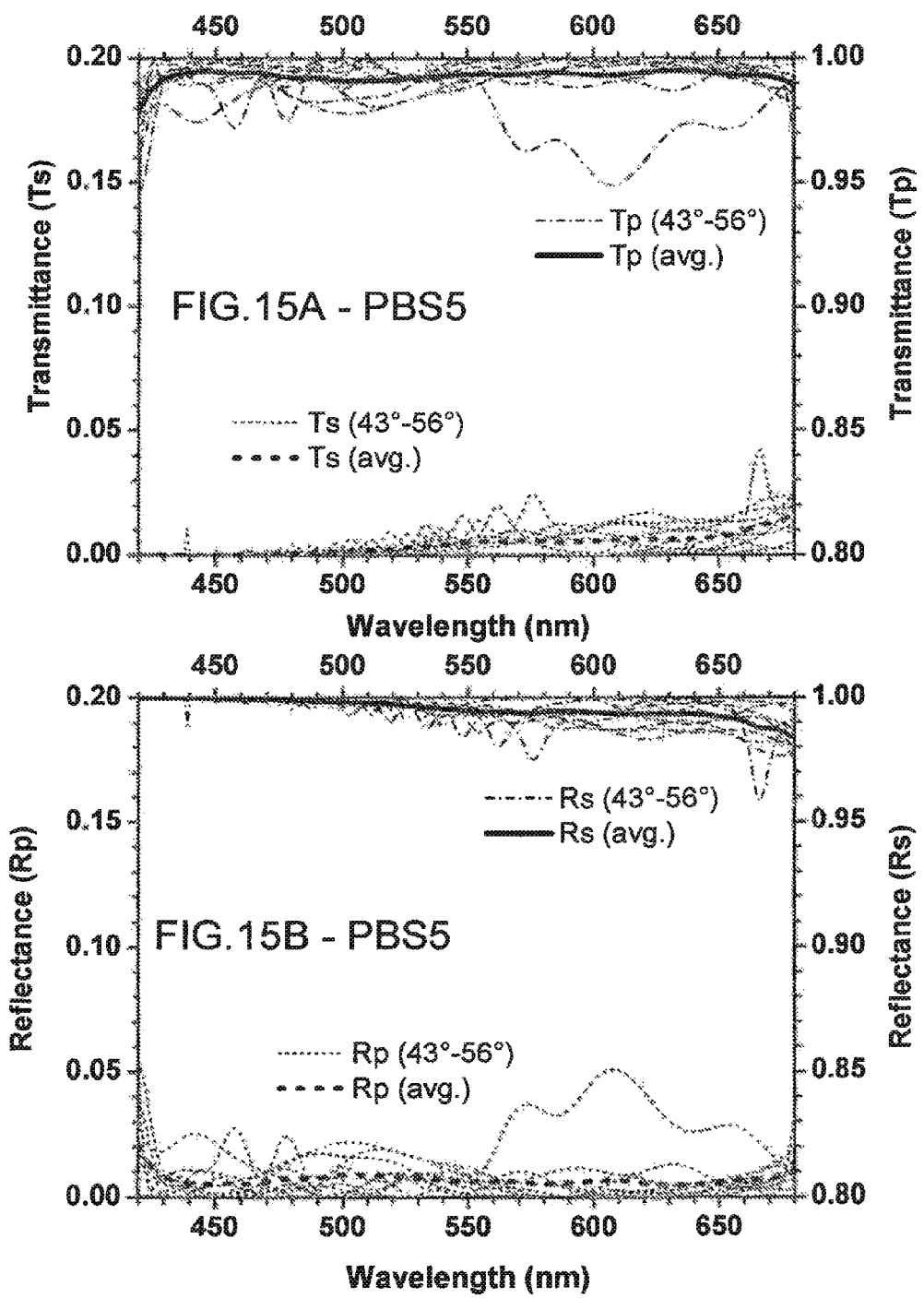

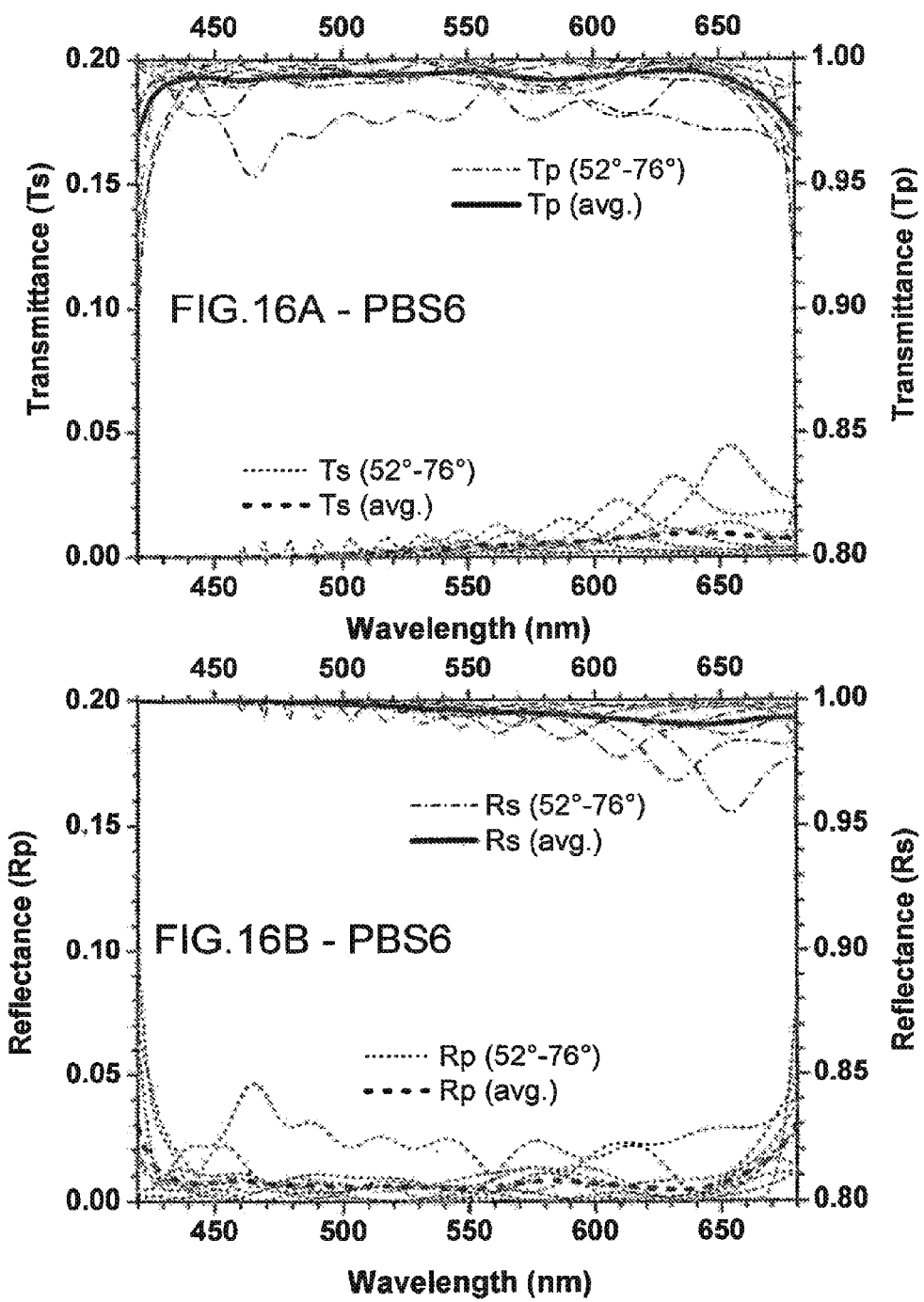

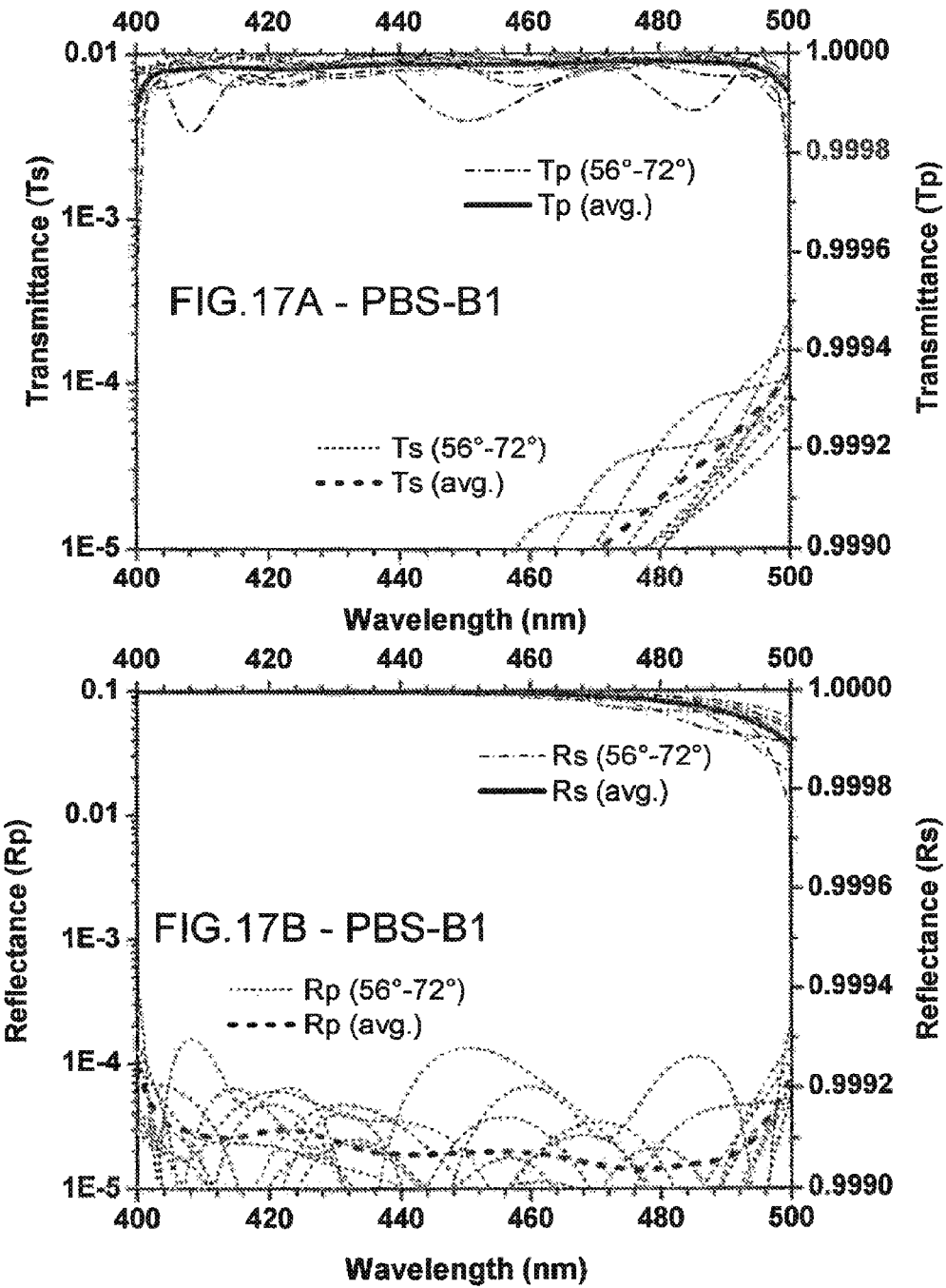

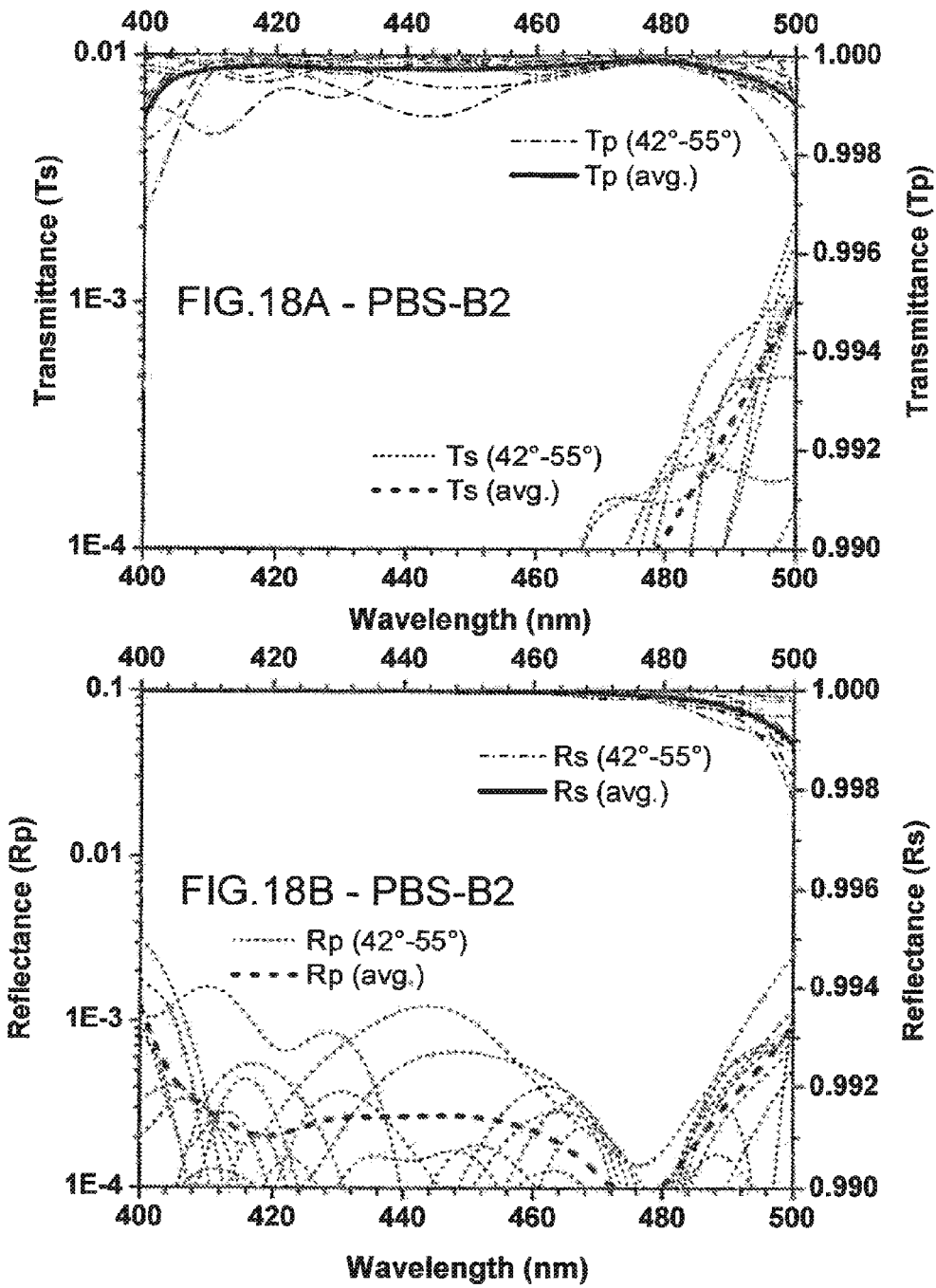

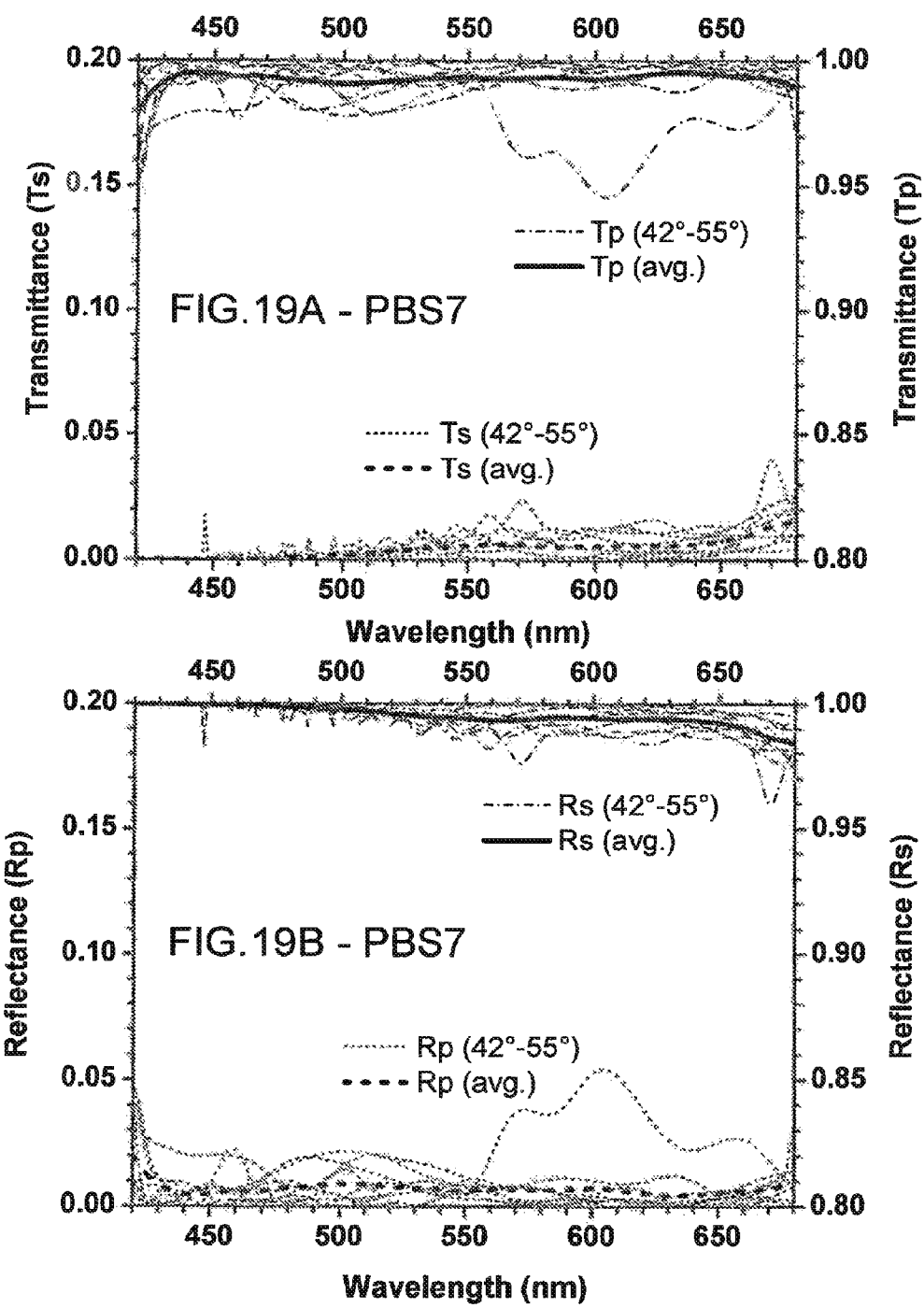

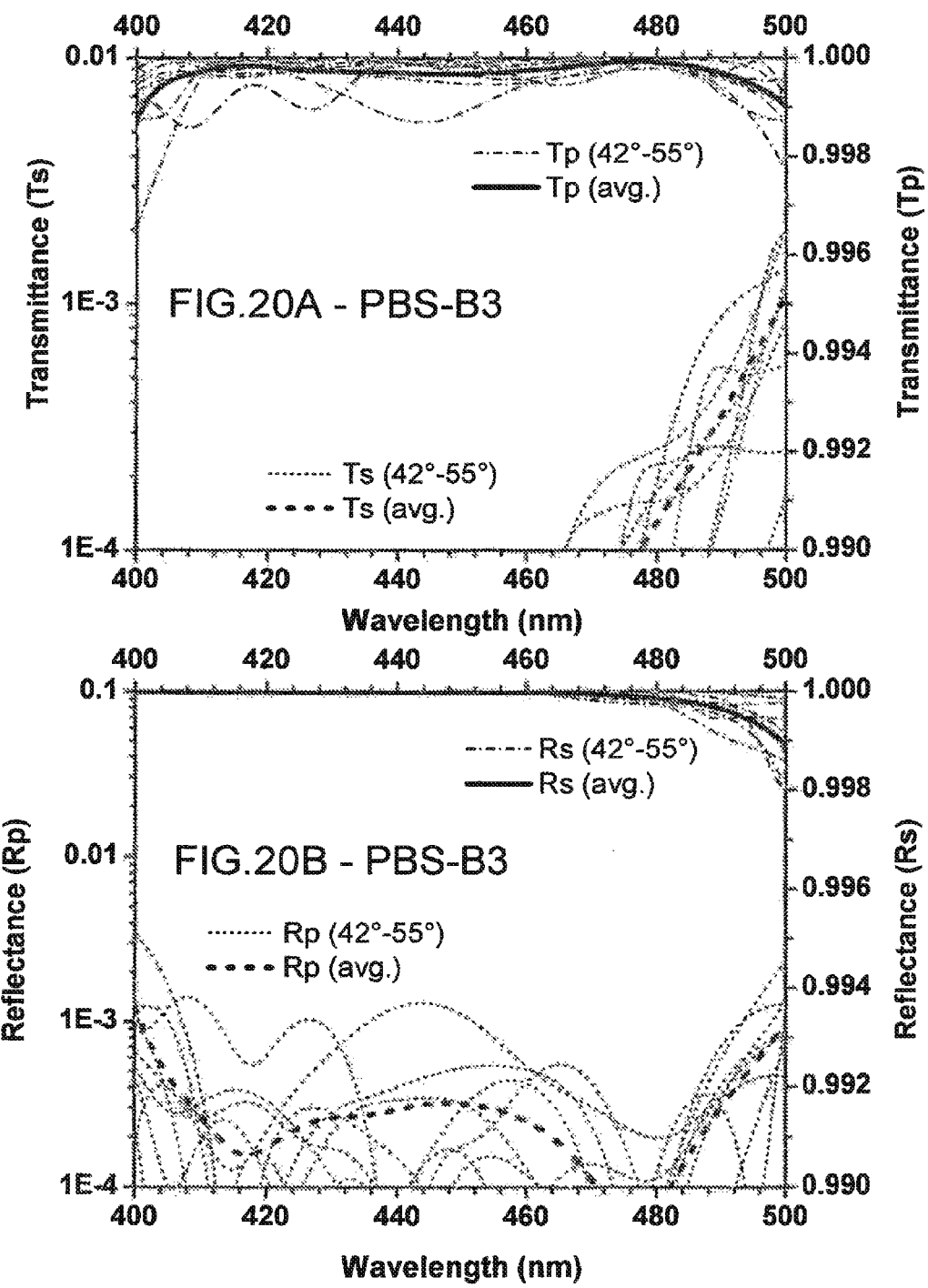

POLARIZING BEAM SPLITTERS

REFERENCE TO CROSS-RELATED APPLICATIONS

This application claims the benefit under 35 USC 119(e) of U.S. provisional application No. 61/085,817, filed Aug. 1, 2008, the contents of which are herein incorporated by reference.

FIELD OF THE INVENTION

This invention relates to polarizing beam-splitters (PBS), and more particularly, to thin film interference based polarizing beam-splitters for separating or combining polarized light.

BACKGROUND OF THE INVENTION

Polarizing beam-splitters are used for many applications to physically separate or combine polarized light in two orthogonal polarizations, by transmitting light in one polarization state and reflecting light in the other polarization state. The useful properties of a PBS are often described as the operational wavelength range or bandwidth, the angular field or the operational angular range, the average extinction ratios (the ratio of the light intensities of desired polarization over the undesired polarization) in both transmitted and reflected beams, and the transmittance and reflectance of the desired polarizations. Polarizers are a special case of polarizing beam-splitters in which only one beam is required, either the transmitted or reflected beam. Detailed descriptions of existing thin film interference based polarizers and polarizing beam-splitters and their applications can be found in the paper "Visible broadband, wide-angle, thin-film multilayer polarizing beam splitter" by Li and Dobrowolski in Applied Optics, Vol. 35, pages 2221-2225 (here referred to as reference D1), the paper "High-performance Thin Film Polarizing Beam Splitter Operating at Angles Greater than the Critical Angle" by Li and Dobrowolski in Applied Optics Vol. 39, pages 2754-2771 (here referred to as reference D2) and the book chapter "Optical Coatings for Displays" by Li in the book "Optical Interference Coatings", Springer 2003, edited N. Kaiser and H. K. Pulker (here referred to as reference D3).

One example of an application for polarizing beam-splitters is in three-dimensional stereoscopic projection displays. A polarizing beam-splitter is used for combining left- and right-eye images with orthogonal polarizations for three-dimensional (3D) displays in various configurations as disclosed in the U.S. patent application Ser. Nos. 11/770,247 and 11/780,910 and 12/045,119 by Boothroyd and which are incorporated herein as references D4, D5 and D6, respectively. FIG. 1 shows a representative arrangement for the use of a polarizing beam-splitter in such 3D projection displays. The PBS separates the unpolarized incident light into first and second orthogonally polarized light beams which are directed to two reflective micro-display panels 1 and 2, respectively. The micro-display panels can be liquid crystal on silicon (LCOS) or digital light processing (DLP) micromirror arrays with waveplates, for example. Left- and right-eye images are displayed on the two panels and are encoded by polarization. For "on" pixels, the reflected image light beams change polarization from the first to the second polarization and vice versa. The orthogonally polarized image light beams are then combined by the polarizing beam-splitter into a single beam as shown in FIG. 1 and the combined image light is directed to a projection lens.

For 3D projection displays, as well as many other applications, it is often required that the PBS operates over a broadband of wavelengths, a wide angular field, has high average extinction ratios or high contrast in both transmitted and reflected beams, and has high transmittance or reflectance in the desired polarizations. For example in a 3D projection display, a broadband wavelength range allows the PBS to operate for all colors in the visible spectrum to make simple two-panel 3D projectors; a wide angular field allows large aperture optics to be used to collect more light and improve image quality; high average extinction ratios allow high contrast images to be formed with low-cross talk between left- and right-eye images. Although there are different types of polarizers or polarizing beam-splitters available today, each of them has limitations either due to poor performance, large device size, or high manufacturing cost, that prevents them from being widely used in applications such as 3D projection displays.

Thin film interference based polarizers or PBSs are the most commonly used polarizers and PBSs because of their design flexibility and relative ease of manufacture. The first prior-art broadband thin film polarizers are the so-called conventional MacNeille polarizers. These are based on the principles of thin film interference as well as the Brewster angle. A conventional MacNeille polarizer consists of a quarterwave thin film multilayer coating having low and high refractive indices sandwiched between two prism substrates. A MacNeille polarizer operates centered at the Brewster angle and for an angular field of only a few degrees in air. Furthermore, it has a high average extinction ratio for the transmitted beam, but not for the reflected beam even at the designed Brewster angle (typically lower than 20:1). The conventional MacNeille polarizer is often used as a polarizer, rather than a PBS, as its name indicates. Its narrow angular field and low average extinction ratio in reflection prevent it from being used in many applications, such as 3D projection displays in which a wide angular field of ±12° (measured in air) and high average extinction ratios of at least 100:1 in both the reflected and transmitted beams are required.

The second type of prior-art broadband thin film polarizers and polarizing beam-splitters are modified MacNeille polarizers or PBSs. Modified MacNeille polarizers still operate centered at the Brewster angle and all operation angles are below the critical angle defined by the refractive index of the substrate and the lowest refractive index in the coating. Modified MacNeille polarizers are an improved version of the conventional MacNeille polarizer where the layer thicknesses have been optimized and result in non-quarterwave PBS coating designs. To further improve the performance, additional intermediate refractive index layers are introduced as described in the reference D1. FIG. 2 shows the calculated performance of a PBS example from reference D1 with an improved angular field of ±6.1° in air for the visible spectral region and an average extinction ratio about 100:1 in both transmitted and reflected beams. Although it has better performance than conventional MacNeille polarizers and other modified MacNeille polarizers, its performance still does not meet the requirement, especially in the angular field, for many applications including 3D projection displays.

The third type of thin film broadband polarizing beam-splitter was disclosed in U.S. Pat. No. 5,912,762 and in reference D2, this device is referred to as the Li Li polarizing beam-splitter or Li Li PBS in the present application. Unlike the conventional and the modified MacNeille polarizers, the Li Li PBS is based on thin film interference and frustrated total internal reflection. It has broadband wavelength operation, a wide angular field, high average extinction ratios for both transmitted and reflected beams and high transmittance or reflectance in the desired polarizations. The disadvantages of the Li Li PBS are, however, that the incident angles or operational angles are above the critical angle and larger than those of conventional or modified MacNeille polarizers because of the requirement of frustrated total internal reflection. This results in larger prism sizes and consequently large size optical systems and higher cost which is not desirable in many applications. Furthermore, the Li Li PBS preferably requires the use of high index prism substrates (preferably with index higher than 1.70) that need optical contacting due to the unavailability of suitable high refractive index optical glues, this also results in high manufacturing cost.

SUMMARY OF THE INVENTION

It is therefore an object of the present invention to design high-performance broadband polarizing beam-splitters with wide angular field and high average extinction ratios for both transmitted and reflected beams while minimizing the size of the PBS and reducing manufacturing cost.

According to a first aspect of the present invention there is provided a polarizing beam splitter comprising: a pair of opposed transparent prism substrates having substantially the same refractive index $n_0$, said pair of opposed transparent substrates providing at least one input port and at least one output port, wherein said input port accepts light incident over a range of operational angles including a central operational angle; a multilayer thin film structure sandwiched between said pair of opposed transparent substrates and consisting essentially of a plurality of layers $l_1 \ldots l_m$ having respective refractive indices $n_1 \ldots n_m$, wherein at least three of said refractive indices $n_1 \ldots n_m$ are different, and wherein the refractive index of the substrates $n_0$ lies between the highest refractive index $n_H$ and lowest refractive index $n_L$, and wherein $n_H$, $n_L$ and $n_0$ define a Brewster angle $\theta_{0B}$:

$$\theta_{0B} = \arcsin\left(\frac{n_L n_H}{n_0 \sqrt{n_L^2 + n_H^2}}\right), \text{ and}$$

a critical angle $\theta_C$:

$$\theta_C = \arcsin\left(\frac{n_L}{n_0}\right), \text{ and}$$

wherein said refractive indices $n_0$ and $n_1 \ldots n_m$ are selected such that the central operational angle for a beam incident on said multiple thin film structure lies above the Brewster angle $\theta_{0B}$ and such that most or all the operational angles defined by said input port lie above the Brewster angle $\theta_{0B}$; and wherein for p-polarized light at least one optical admittance of said layers with refractive indices $n_1 \ldots n_m$ is lower or very close to that of the optical admittance of the substrate for said operational angles such that said thin film polarizing beam-splitter favors the transmittance for p-polarized light incident at said input port such that most of the p-polarized light is transmitted through said multiple thin film structure; and for s-polarized light said polarizing beam-splitter acts as a high reflective coating to favor the reflectance for s-polarized light incident at said input port such that most of the s-polarized light is reflected from said multiple thin film structure.

Some of the operational angles may also exceed the critical angle $\theta_c$.

While the specification refers generally to a polarizing beam splitter for convenience, it will be appreciated by one skilled in the art that such a device also works in reverse as a beam combiner, and the term beam splitter as used herein also encompasses a beam combiner.

Ideally, the refractive index of the two substrates should be the same, but it is possible for them to be slightly different. For example, suitable substrates are SF57HHT manufactured by Schott in Germany or PbH56 manufactured by Ohara in Japan. These glasses, which are nominally equivalent, have slightly different refractive indices, and a possible embodiment would be to use Schott glass for one of the substrates and Ohara glass for the other.

Preferably, for p-polarized light, at least one of the optical admittances of the layers with refractive indices $n_1 \ldots n_m$ is lower than the optical admittance of the substrate over the range of operational angles, the lowest optical admittance can also be slightly higher but very close to the optical admittance of the substrate so long as it is sufficiently favored to transmit most of the p-polarized light.

According to a second aspect of the invention, there is provided a method of making a polarizing beam splitter, comprising: providing a pair of transparent prism substrates having substantially the same refractive index $n_0$, and each having a planar surface; coating the planar surface of at least one of said prisms with a multilayer thin film structure; and bonding said transparent prism substrates together with said multilayer thin film structure sandwiched therebetween to provide a prism structure having at least one input port and at least one output port, wherein said input port accepts light incident over a range of operational angles including a central operational angle; wherein said multilayer thin film structure consists essentially of a plurality of layers $l_1 \ldots lm$ having respective refractive indices $n_1 \ldots n_m$, wherein at least three of said refractive indices $n_1 \ldots n_m$ are different, and wherein the refractive index of the substrates $n_0$ lies between the highest refractive index $n_H$ and lowest refractive index $n_L$, and wherein $n_H$, $n_L$ and $n_0$ define a Brewster angle $\theta_{0B}$:

$$\theta_{0B} = \arcsin\left(\frac{n_L n_H}{n_0 \sqrt{n_L^2 + n_H^2}}\right), \text{ and}$$

a critical angle $\theta_C$:

$$\theta_C = \arcsin\left(\frac{n_L}{n_0}\right), \text{ and}$$

wherein the values of said refractive indices $n_0$ and $n_1 \ldots n_m$ are selected to make the central operational angle for a beam incident on said multiple thin film structure lie above the Brewster angle $\theta_{0B}$ and most or all the operational angles defined by said input port lie above the Brewster angle $\theta_{0B}$; and wherein for p-polarized light at least one optical admittance of said layers with refractive indices $n_1 \ldots n_m$ is lower or very close to that of the optical admittance of said substrate for said operational angles such that the said thin film polarizing beam-splitter favors the transmittance for p-polarized light incident at said input port such that most of the p-polarized light is transmitted through said multiple thin film structure; and for s-polarized light said polarizing beam-splitter acts as a high reflective coating to favor the reflectance for s-polarized light incident at said input port such that most of the s-polarized light is reflected from said multiple thin film structure.

BRIEF DESCRIPTION OF THE DRAWINGS

FIG. 5A shows the optical admittances or effective indices of the incident medium or substrate, the lowest, intermediate and highest index layers with refractive indices $n_0$, $n_L$, $n_A$ and $n_H$, respectively, varying with angles of incidence for p-polarization;

FIG. 5B shows the optical admittances or effective indices of the incident medium or substrate $n_0$, the low, intermediate and high index layers with a refractive indices $n_0$, $n_L$, $n_A$ and $n_H$, respectively, varying with angles of incidence for s-polarization as well as the optical admittance ratio or effective index ratio $\eta_{HS}/\eta_{LS}$.

FIG. 6A shows the calculated reflectance for s-polarized light for prior-art design MC1, the thick dashed line represents the reflectance at the central operational angle, the dash-dot lines represent 9 equally spaced operational angles, and the thick solid line represents the averaged reflectance for 17 equally spaced operational angles;

FIG. 6B shows the calculated reflectance for p-polarized light for prior-art design MC1, the dashed line represents the central operational angle, the thick dash-dot lines represent the reflectance for 9 equally spaced operational angles, and the thick solid line represents the averaged reflectance for 17 equally spaced operational angles;

FIG. 6C shows the calculated transmittance of prior-art design MC1 for s-polarized light, the thick dashed line represents the central operational angle, the dash-dot lines represent 9 equally spaced operational angles, and the thick solid line represents the averaged reflectance for 17 equally spaced operational angles;

FIG. 6D shows the calculated transmittance of prior-art design MC1 for p-polarized light, the thick dashed line represents the central operational angle, the dash-dot lines represent 9 equally spaced operational angles, and the thick solid line represents the averaged reflectance for 17 equally spaced operational angles;

FIG. 7A shows the calculated transmittance of prior-art design MC2 for s- and p-polarized light, the thin dashed lines represent Ts for 9 equally spaced operational angles, and the thick dashed line represents the value of Ts averaged over 17 equally spaced operational angles, the thin dash-dot lines represent Tp for 9 equally spaced operational angles, and the thick solid line represents the value of Tp averaged over 17 equally spaced operational angles;

FIG. 7B shows the calculated reflectance of prior-art design MC2, the thin dashed lines represent Rp for 9 equally spaced operational angles, and the thick dashed line represents the value of Rp averaged over 17 equally spaced operational angles, the thin dash-dot lines represent Rs for 9 equally spaced operational angles, and the thick solid line represents the value of Rs averaged over 17 equally spaced operational angles;

FIG. 8A shows the calculated transmittance performance of prior-art MC3 for s- and p-polarized light, the thin dashed lines represent Ts for 9 equally spaced operational angles, and the thick dashed line represents the value of Ts averaged over 17 equally spaced operational angles, the thin dash-dot lines represent Tp for 9 equally spaced operational angles, and the thick solid line represents the value of Tp averaged over 17 equally spaced operational angles;

FIG. 8B shows the calculated reflectance performance of prior-art MC3 for s- and p-polarized light, the thin dashed lines represent Rp for 9 equally spaced operational angles, and the thick dashed line represents the value of Rp averaged over 17 equally spaced operational angles, the thin dash-dot lines represent Rs for 9 equally spaced operational angles, and the thick solid line represents the value of Rs averaged over 17 equally spaced operational angles;

FIG. 9A shows the calculated transmittance performance of prior-art MC4 for s- and p-polarized light, the thin dashed lines represent Ts for 9 equally spaced operational angles, and the thick dashed line represents the value of Ts averaged over 17 equally spaced operational angles, the thin dash-dot lines represent Tp for 9 equally spaced operational angles, and the thick solid line represents the value of Tp averaged over 17 equally spaced operational angles;

FIG. 9B shows the calculated reflectance performance of prior-art MC4 for s- and p-polarized light, the thin dashed lines represent Rp for 9 equally spaced operational angles, and the thick dashed line represents the value of Rp averaged over 17 equally spaced operational angles, the thin dash-dot lines represent Rs for 9 equally spaced operational angles, and the thick solid line represents the value of Rs averaged over 17 equally spaced operational angles;

FIG. 10A shows the calculated transmittance performance of prior-art Li Li PBS LPBS for s- and p-polarized light, the thin dashed lines represent Tp for 9 equally spaced operational angles, and the thick dashed line represents the value of Tp averaged over 17 equally spaced operational angles, the thin dash-dot lines represent Ts for 9 equally spaced operational angles, and the thick solid line represents the value of Ts averaged over 17 equally spaced operational angles;

FIG. 10B shows the calculated reflectance performance of prior-art Li Li PBS LPBS for s- and p-polarized light, the thin dashed lines represent Rs for 9 equally spaced operational angles, and the thick dashed line represents the value of Rs averaged over 17 equally spaced operational angles, the thin dash-dot lines represent Rp for 9 equally spaced operational angles, and the thick solid line represents the value of Rp averaged over 17 equally spaced operational angles;

FIG. 11A shows the calculated transmittance of the polarizing beam-splitter PBS1 in accordance with the present invention for s- and p-polarized light, the thin dashed lines represent Ts for 9 equally spaced operational angles, and the thick dashed line represents the value of Ts averaged over 17 equally spaced operational angles, the thin dash-dot lines represent Tp for 9 equally spaced operational angles, and the thick solid line represents the value of Tp averaged over 17 equally spaced operational angles;

FIG. 11B shows the calculated reflectance of the polarizing beam-splitter PBS1 in accordance with the present invention for s- and p-polarized light, the thin dashed lines represent Rp for 9 equally spaced operational angles, and the thick dashed line represents the value of Rp averaged over 17 equally spaced operational angles, the thin dash-dot lines represent Rs for 9 equally spaced operational angles, and the thick solid line represents the value of Rs averaged over 17 equally spaced operational angles;

FIG. 12A shows the calculated transmittance of the polarizing beam-splitter PBS2 in accordance with the present invention for s- and p-polarized light, the thin dashed lines represent Ts for 9 equally spaced operational angles, and the thick dashed line represents the value of Ts averaged over 17 equally spaced operational angles, the thin dash-dot lines represent Tp for 9 equally spaced operational angles, and the thick solid line represents the value of Tp averaged over 17 equally spaced operational angles;

FIG. 12B shows the calculated reflectance of the polarizing beam-splitter PBS2 in accordance with the present invention for s- and p-polarized light, the thin dashed lines represent Rp for 9 equally spaced operational angles, and the thick dashed line represents the value of Rp averaged over 17 equally spaced operational angles, the thin dash-dot lines represent Rs for 9 equally spaced operational angles, and the thick solid line represents the value of Rs averaged over 17 equally spaced operational angles;

FIG. 13A shows the calculated transmittance of the polarizing beam-splitter PBS3 in accordance with the present invention for s- and p-polarized light, the thin dashed lines represent Ts for 9 equally spaced operational angles, and the thick dashed line represents the value of Ts averaged over 17 equally spaced operational angles, the dash-dot lines represent Tp for 9 equally spaced operational angles, and the thick solid line represents the value of Tp averaged over 17 equally spaced operational angles;

FIG. 13B shows the calculated reflectance of the polarizing beam-splitter PBS3 in accordance with the present invention for s- and p-polarized light, the thin dashed lines represent Rp for 9 equally spaced operational angles, and the thick dashed line represents the value of Rp averaged over 17 equally spaced operational angles, the thin dash-dot lines represent Rs for 9 equally spaced operational angles, and the thick solid line represents the value of Rs averaged over 17 equally spaced operational angles;

FIG. 14A shows the calculated transmittance of the polarizing beam-splitter PBS4 in accordance with the present invention for s- and p-polarized light, the thin dashed lines represent Ts for 9 equally spaced operational angles, and the thick dashed line represents the value of Ts averaged over 17 equally spaced operational angles, the thin dash-dot lines represent Tp for 9 equally spaced operational angles, and the thick solid line represents the value of Tp averaged over 17 equally spaced operational angles;

FIG. 14B shows the calculated reflectance of the polarizing beam-splitter PBS4 in accordance with the present invention for s- and p-polarized light, the thin dashed lines represent Rp for 9 equally spaced operational angles, and the thick dashed line represents the value of Rp averaged over 17 equally spaced operational angles, the dash-dot lines represent Rs for 9 equally spaced operational angles, and the thick solid line represents the value of Rs averaged over 17 equally spaced operational angles;

FIG. 15A shows the calculated transmittance of the polarizing beam-splitter PBS5 in accordance with the present invention for s- and p-polarized light, the thin dashed lines represent Ts for 9 equally spaced operational angles, and the thick dashed line represents the value of Ts averaged over 17 equally spaced operational angles, the dash-dot lines represent Tp for 9 equally spaced operational angles, and the thick solid line represents the value of Tp averaged over 17 equally spaced operational angles;

FIG. 15B shows the calculated reflectance of the polarizing beam-splitter PBS5 in accordance with the present invention for s- and p-polarized light, the thin dashed lines represent Rp for 9 equally spaced operational angles, and the thick dashed line represents the value of Rp averaged over 17 equally spaced operational angles, the thin dash-dot lines represent Rs for 9 equally spaced operational angles, and the thick solid line represents the value of Rs averaged over 17 equally spaced operational angles;

FIG. 16A shows the calculated transmittance of the polarizing beam-splitter PBS6 in accordance with the present invention for s- and p-polarized light, the thin dashed lines represent Ts for 9 equally spaced operational angles, and the thick dashed line represents the value of Ts averaged over 17 equally spaced operational angles, the thin dash-dot lines represent Tp for 9 equally spaced operational angles, and the thick solid line represents the value of Tp averaged over 17 equally spaced operational angles;

FIG. 16B shows the calculated reflectance of the polarizing beam-splitter PBS6 in accordance with the present invention for s- and p-polarized light, the thin dashed lines represent Rp for 9 equally spaced operational angles, and the thick dashed line represents the value of Rp averaged over 17 equally spaced operational angles, the thin dash-dot lines represent Rs for 9 equally spaced operational angles, and the thick solid line represents the value of Rs averaged over 17 equally spaced operational angles;

FIG. 17A shows the calculated transmittance of the polarizing beam-splitter PBS-B1 in accordance with the present invention for s- and p-polarized light, the thin dashed lines represent Ts for 9 equally spaced operational angles, and the thick dashed line represents the value of Ts averaged over 17 equally spaced operational angles, the dash-dot lines represent Tp for 9 equally spaced operational angles, and the thick solid line represents the value of Tp averaged over 17 equally spaced operational angles;

FIG. 17B shows the calculated reflectance of the polarizing beam-splitter PBS-B1 in accordance with the present invention for s- and p-polarized light, the thin dashed lines represent Rp for 9 equally spaced operational angles, and the thick dashed line represents the value of Rp averaged over 17 equally spaced operational angles, the dash-dot lines represent Rs for 9 equally spaced operational angles, and the thick solid line represents the value of Rs averaged over 17 equally spaced operational angles;

FIG. 18A shows the calculated transmittance of the polarizing beam-splitter PBS-B2 in accordance with the present invention for s- and p-polarized light, the thin dashed lines represent Ts for 9 equally spaced operational angles, and the thick dashed line represents the value of Ts averaged over 17 equally spaced operational angles, the dash-dot lines represent Tp for 9 equally spaced operational angles, and the thick solid line represents the value of Tp averaged over 17 equally spaced operational angles;

FIG. 18B shows the calculated reflectance of the polarizing beam-splitter PBS-B2 in accordance with the present invention for s- and p-polarized light, the thin dashed lines represent Rp for 9 equally spaced operational angles, and the thick dashed line represents the value of Rp averaged over 17 equally spaced operational angles, the dash-dot lines represent Rs for 9 equally spaced operational angles, and the thick solid line represents the value of Rs averaged over 17 equally spaced operational angles;

FIG. 19A shows the calculated transmittance of the polarizing beam-splitter PBS7 in accordance with the present invention for s- and p-polarized light, the thin dashed lines represent Ts for 9 equally spaced operational angles, and the thick dashed line represents the value of Ts averaged over 17 equally spaced operational angles, the dash-dot lines represent Tp for 9 equally spaced operational angles, and the thick solid line represents the value of Tp averaged over 17 equally spaced operational angles;

FIG. 19B shows the calculated reflectance of the polarizing beam-splitter PBS7 in accordance with the present invention for s- and p-polarized light, the thin dashed lines represent Rp for 9 equally spaced operational angles, and the thick dashed line represents the value of Rp averaged over 17 equally spaced operational angles, the thin dash-dot lines represent Rs for 9 equally spaced operational angles, and the thick solid line represents the value of Rs averaged over 17 equally spaced operational angles;

FIG. 20A shows the calculated transmittance of the polarizing beam-splitter PBS-B3 in accordance with the present invention for s- and p-polarized light, the thin dashed lines represent Ts for 9 equally spaced operational angles, and the thick dashed line represents the value of Ts averaged over 17 equally spaced operational angles, the thin dash-dot lines represent Tp for 9 equally spaced operational angles, and the thick solid line represents the value of Tp averaged over 17 equally spaced operational angles;

FIG. 20B shows the calculated reflectance of the polarizing beam-splitter PBS-B3 in accordance with the present invention for s- and p-polarized light, the thin dashed lines represent Rp for 9 equally spaced operational angles, and the thick dashed line represents the value of Rp averaged over 17 equally spaced operational angles, the thin dash-dot lines represent Rs for 9 equally spaced operational angles, and the thick solid line represents the value of Rs averaged over 17 equally spaced operational angles;

DETAILED DESCRIPTION OF EMBODIMENTS OF THE INVENTION

Figure 1:
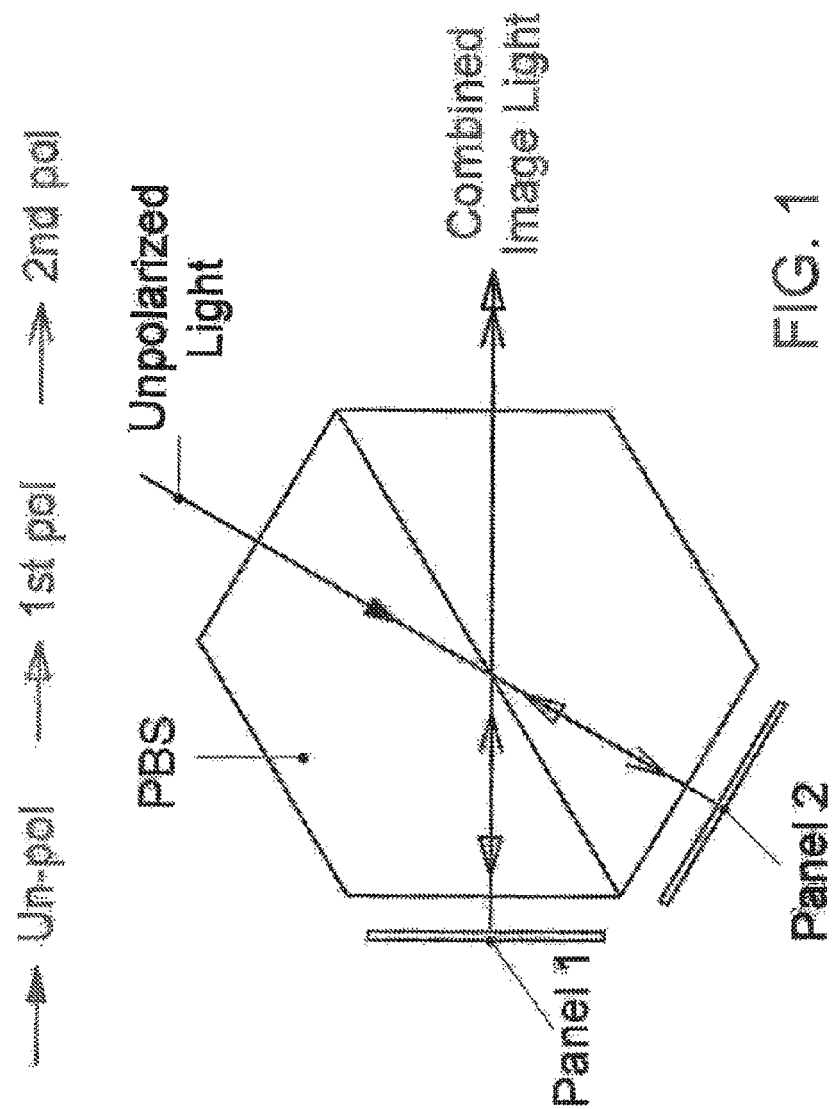
FIG. 1 is a schematic view of a polarizing beam-splitter used for separating and combing polarized light in a 3D projection display using two reflective microdisplay panels.
Figure 2:
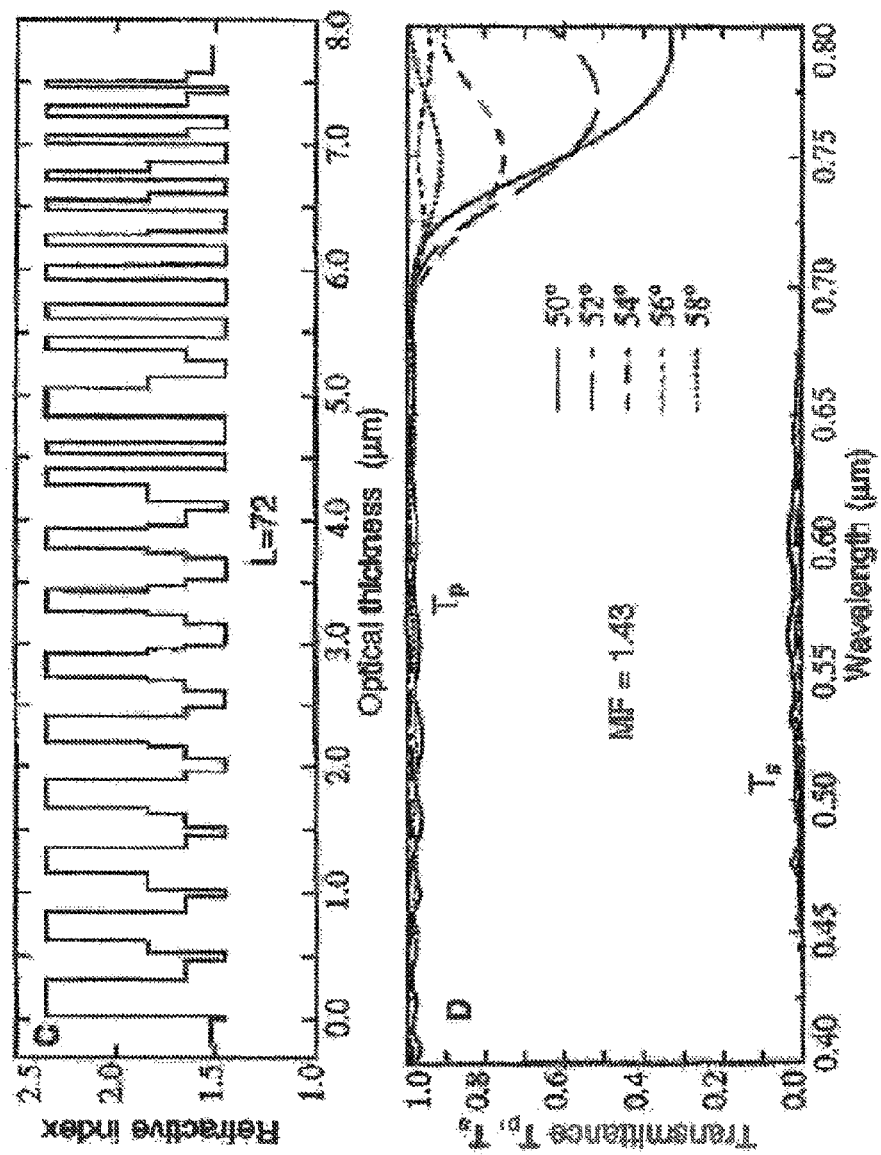
FIG. 2 shows the calculated performance of a prior-art modified MacNeille polarizing beam-splitter.
Figure 3:
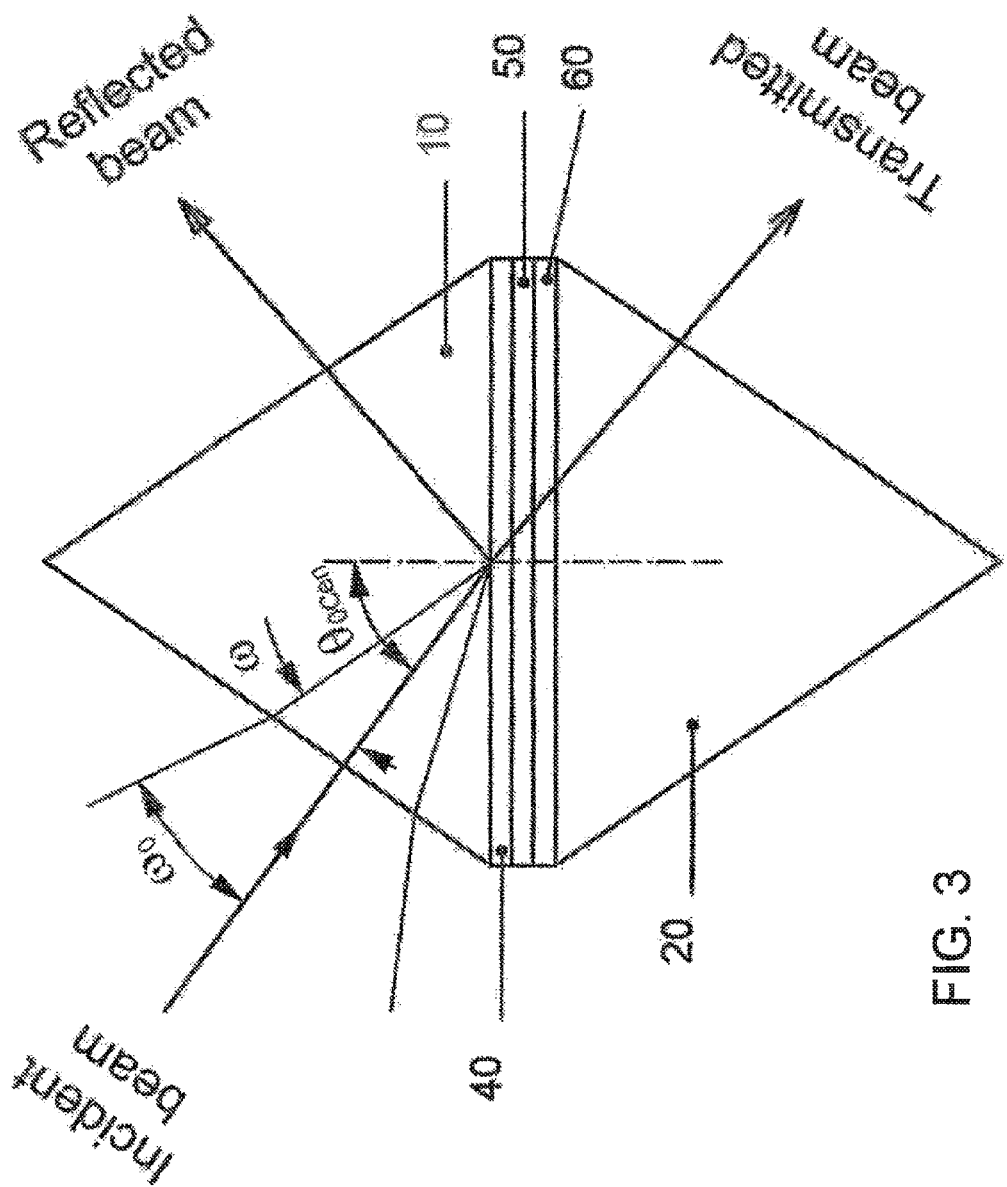
FIG. 3 is a schematic diagram of a polarizing beam-splitter in accordance with the present invention.

The polarizing beam-splitters in accordance with embodiments of the present invention shown in FIG. 3 each comprise of two transparent substrates 10 and 20 having a refractive index $n_0$, the substrates are made of transparent material such as optical glasses, plastics or semiconductors; a thin film polarizing beam-splitter coating 40 sandwiched between the two transparent substrates providing a multilayer thin film structure; an optional transparent glue layer 50 with a refractive index $n_S$ and an optional anti-reflection (AR) coating 60. The multilayer thin film structure 40 consists of plural thin film layers having layer thickness $d_1, \ldots, d_i, \ldots, d_m$, and reflective indices $n_1, \ldots, n_i, \ldots, n_m$, where m represents the total number of layers and the refractive indices include a highest refractive index $n_H$, a lowest refractive index $n_L$, and at least one middle refractive index $n_A$ and $n_L < n_0$. Any two adjacent layers with different refractive indices form a layer interface. At least three different layer interfaces a,b,c that each occur more than once are present within the multilayer thin film structure 40. Each layer can be selected from a group of substantially transparent materials such as oxides, fluorides, semiconductors, sulfates, mixtures of materials, etc.

The transparent substrates 10 and 20 are the incident medium and the exit medium, or vice versa, for the light incident on the thin film polarizing beam-splitter coating. The operational angles or incident angles $\theta_0$, defined inside the incident medium, and the thickness and refractive index of each layer in the thin film PBS coating are selected in such a way that most s-polarized light is reflected and most p-polarized light is transmitted for a wide angular field and a broadband of wavelengths. Thus high average extinction ratios are achieved in both transmitted and reflected beams. The incident angle $\theta_i$ inside each layer i satisfies Snell's law:

$$n_0 \sin \theta_0 = n_i \sin \theta_i, (i=1 \ldots m). \tag{1}$$

The central operational angle $\theta_{0Cen}$, also defined inside the incident medium, of the polarizing beam-splitter in accordance with the present invention is shown in FIG. 3. The polarizing beam-splitter operates at incident angles or operational angles $\theta_0$ ranging from $\theta_{0Cen}-\omega$ to $\theta_{0Cen}+\omega$ inside the substrate. The angular field of the cone of light incident on the thin film coatings is $\pm\omega$ inside the substrate and $\pm\omega_0 = \pm\arcsin(n_0 \sin \omega)$ in air.

The thin film polarizing beam-splitter coatings in accordance with the present invention can be deposited by any suitable deposition processes such as sputtering, ion-assisted evaporation, etc. Different bonding techniques can be used to bond the thin film polarizing beam-splitter substrates. The first bonding technique uses an optical glue or adhesive layer 50 having a refractive index $n_S$ matching that of the substrate $n_0$ and the coatings are deposited onto one prism substrate and then glued to the other substrate, in this case the optional AR coating 60 is not required. When there is no index matching glue available or the glue is not desirable due to other considerations such as absorption or high power damage threshold, then the second bonding technique of optical contacting can be used. In this case the prism substrates must be very flat and the complete thin film coating can be deposited onto one prism substrate, or part of the coating deposited on one substrate and the rest deposited on the second substrate and the two prism substrates bonded by optical contacting, in this case the glue layer 50 and the AR coating 60 are not required. The third technique uses an optical glue or adhesive layer 50 with a refractive index $n_S$ that does not match the index of the substrate $n_0$ ($n_S < n_0$ or $n_S > n_0$) and an AR coating 60. In this case, the thin film polarizing-beam-splitters are designed for the incident medium $n_0$ and the exit medium $n_S$. The AR coating is used to remove any reflection for p-polarized light between the optical glue layer 50 and the substrate 20. The refractive index $n_S$ of the glue layer 50 should be selected such that for all incident angles or operational angles of the thin film polarizing beam-splitters, the incident angle inside the incident medium should be smaller than the critical angle $\theta_{CS}$ defined below and thus no total internal reflection occurs inside the glue layer 50.

$$\theta_{CS} = \arcsin\left(\frac{n_S}{n_0}\right) \tag{2}$$

For many applications with high index substrates, optical contacting is too expensive and also there is limited selection of optical glues that are suitable for index matching with the substrate. The third technique offers a practical way to produce thin film polarizing beam-splitters with low cost.

Figure 4:
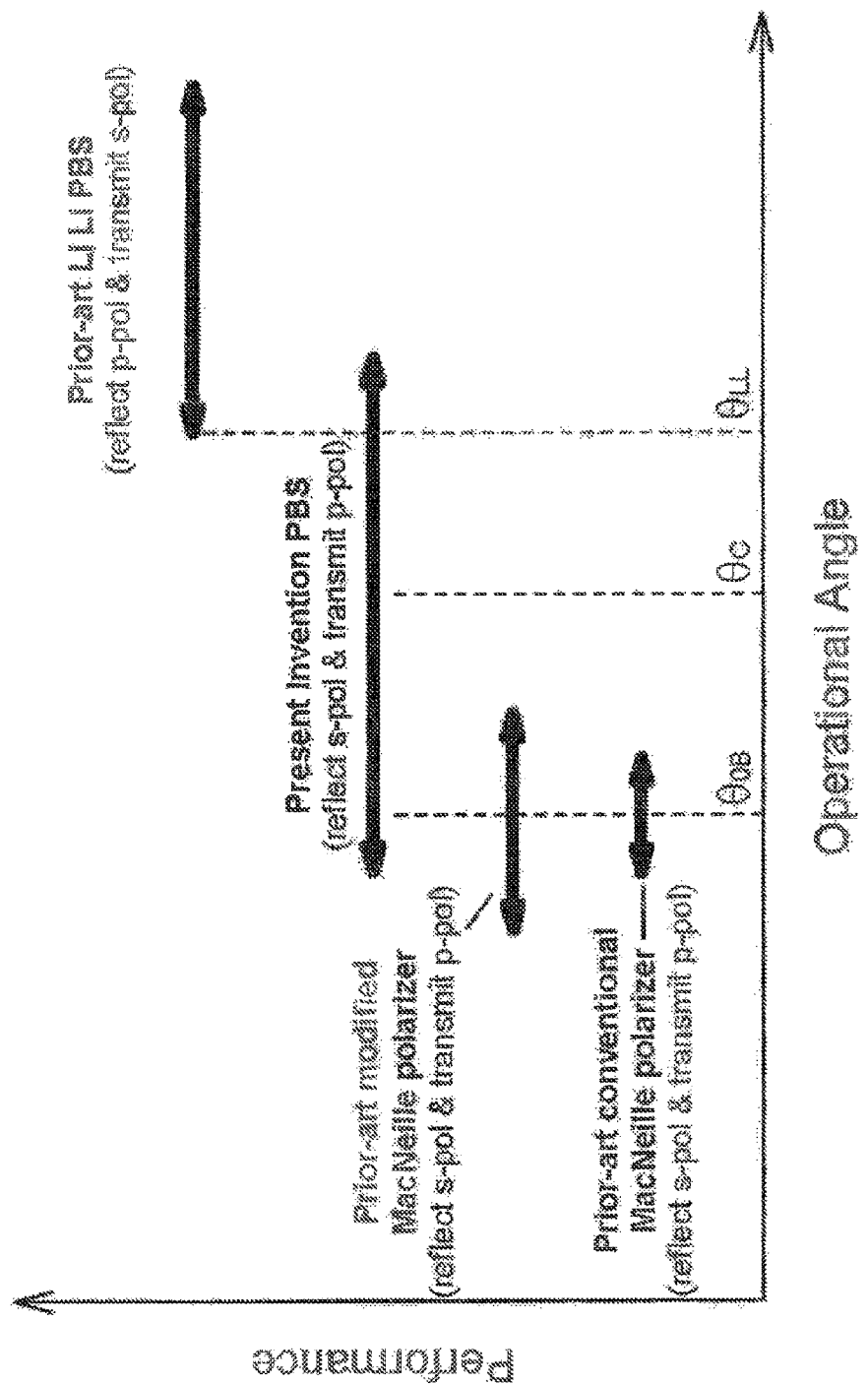
FIG. 4 shows the relationships between the performance and the incident angles or operational angles of prior-art conventional and modified MacNeille polarizers, the Li Li PBS, and the polarizing beam-splitter of the present invention.

One important aspect of the polarizing beam-splitters of embodiments of the present invention is that they operate at incident angles or operational angles significantly different from any existing conventional and modified MacNeille polarizers, or the Li Li PBS. Even though the existing polarizers or PBSs can be designed using the same substrates and thin film coating materials, they are clearly differentiated by the angles of incidence over which they operate. FIG. 4 shows the operational angles of the polarization beam-splitters in accordance with the present invention and the prior art conventional and modified MacNeille polarizers and the Li Li PBS.

The incident angle $\theta_i$ inside each layer i is linked to the incident angle $\theta_0$ inside the incident medium as defined in Eq. (1). The critical angle shown in FIG. 4 is defined inside the incident medium by the refractive indices of the substrate $n_0$ and the lowest refractive index $n_L$ of the thin film PBS coating and is the lowest critical angle among all possible critical angles inside the thin film polarizing beam-splitter coating:

$$\theta_C = \arcsin\left(\frac{n_L}{n_0}\right). \tag{3}$$

When the incident angle $\theta_0$ is larger than the critical angle $\theta_C$, incident light will go through frustrated total internal reflection inside the layers having the lowest refractive index $n_L$.

The Brewster angle $\theta_{0B}$ for conventional polarizers is defined inside the substrate $n_0$ when the Brewster angle condition is satisfied between the interfaces of the low $n_L$ and high index $n_H$ layers:

$$\theta_{0B} = \arcsin\left(\frac{n_L n_H}{n_0\sqrt{n_L^2 + n_H^2}}\right). \tag{4}$$

The central operational angle of the conventional MacNeille polarizers is selected as $\theta_{0B}$ or very close to it. Because of the small angular field of the conventional MacNeille polarizers, modified MacNeille polarizers were proposed in which layers with additional intermediate refractive indices between $n_L$ and $n_H$ were used. As a result, new additional Brewster angles exist at layer interfaces between the intermediate index and the lowest and highest refractive index layers. These additional Brewster angles are both below and above the Brewster angle $\theta_{0B}$ defined by the lowest and highest indices in Eq. (4). This principle of modified MacNeille polarizers with additional index layers was described in D1 and is also the operational principle of many existing polarizers described in scientific papers and patents. Although the introduction of the additional Brewster angles around the central Brewster angle $\theta_{0B}$ can help to improve the performance of the polarizers, the central operational angle is still designed at the Brewster angle $\theta_{0B}$. However, the improvement in performance is relatively small; in particular the angular field is still limited compared to the required angular field for many applications.

The lower-limit angle $\theta_{LL}$ represents the minimum operational angle for which a Li Li PBS works, as described in the reference D2 and is defined by the lowest and highest refractive indices $n_L$, $n_H$ and $n_0$ as:

$$\theta_{LL} = \arcsin\left(\frac{n_L n_H}{n_0\sqrt{n_L^2 + n_H^2 - n_0^2}}\right). \tag{5}$$

Following the above Eqs. (3)-(5) and the condition $n_L < n_0 < n_H$, the relationship among the three important angles $\theta_C$, $\theta_{0B}$ and $\theta_{LL}$ is:

$$\theta_{0B} < \theta_C < \theta_{LL}. \tag{6}$$

As shown in FIG. 4, the prior-art conventional and modified MacNeille polarizers operate around a central angle $\theta_{0Cen}$ that is close to the Brewster angle $\theta_{0B}$ and all operational angles or incident angles for the conventional and modified MacNeille polarizers are below the critical angle $\theta_C$. They reflect s-polarized light and transmit p-polarized light. The performance of the conventional MacNeille polarizer is the lowest, followed by the modified MacNeille polarizer. The prior-art Li Li PBS operates for angles of incidence all greater than the critical angle $\theta_C$, and more precisely, greater than the lower-limit angle $\theta_{LL}$. It reflects p-polarized light and transmits s-polarized light. The performance of the Li Li PBS is the highest, however the operation angles for the Li Li PBS are the largest and they result in a large prism size and long optical paths in optical instruments that use the Li Li PBS which is not desirable in many applications, not least because the optical components involved must be large and therefore more expensive.

The theoretical insight which leads to the polarizing beam-splitters of the present invention is explained below.

The polarizing beam-splitter in accordance with the present invention is based on light interference in thin film coatings. In general, at normal incidence, the performance of a thin film coating is mainly determined by the refractive index and thickness of each layer in the thin film coating, the refractive indices of the incident medium and exit medium, the total number of layers as well as the total optical thickness of all layers. At oblique angles of incidence which is the case in embodiments of the present invention, all the above statements also apply. However, the influence of the refractive indices on the performance of the thin film coating is expressed through the optical admittances, or effective indices of the layers, which are functions of the refractive indices and angles of incidence as defined by:

$$\begin{cases} \eta_{0s} = n_0\cos\theta_0 \\ \eta_{is} = n_i\cos\theta_i \end{cases} s\text{-}pol, \begin{cases} \eta_{0P} = n_0/\cos\theta_0 \\ \eta_{iP} = n_i/\cos\theta_i \end{cases} p\text{-}pol, i = 1 \ldots m \tag{7}$$

where $\eta_{0S}$, $\eta_{iS}$, and $\eta_{0P}$, $\eta_{iP}$, are the optical admittances of s- and p-polarized light for the incident medium and layer i, respectively. $\theta_0$ and $\theta_i$ are the incident angles inside the incident medium and layer i, respectively. These angles satisfy:

$$n_0 \sin\theta_0 = n_1 \sin\theta_1 = \ldots = n_i \sin\theta_i = \ldots = n_m \sin\theta_m \tag{8}.$$

The influence of layer parameters on the performance of the polarizing beam-splitter in the present invention is mainly represented by the amplitude Fresnel reflection coefficient of each layer-layer or layer-medium interface and the phase thickness of each layer:

$$\begin{cases} r_{iS} = \dfrac{\eta_{i-1S} - \eta_{iS}}{\eta_{i-1S} + \eta_{iS}} = \dfrac{n_{i-1}\cos\theta_{i-1} - n_i\cos\theta_i}{n_{i-1}\cos\theta_{i-1} + n_i\cos\theta_i} \\ r_{iP} = \dfrac{\eta_{i-1P} - \eta_{iP}}{\eta_{i-1P} + \eta_{iP}} = \dfrac{n_{i-1}/\cos\theta_{i-1} - n_i/\cos\theta_i}{n_{i-1}/\cos\theta_{i-1} + n_i/\cos\theta_i} \end{cases}, i = 1 \ldots m \tag{9}$$

$$\delta_i = \frac{2\pi}{\lambda}n_i d_i \cos\theta_i - \frac{\phi_{i-1} + \phi_i}{2}, i = 1 \ldots m \tag{10}$$

where $r_{iS}$ and $r_{iP}$ are the Fresnel reflection coefficients at interface i−1 and i, $\delta_i$ is the phase thickness of layer i, $\phi_{i-1}$ and $\phi_i$, are the phase changes on reflection of the two interfaces surrounding the layer i. $\lambda$ is the wavelength, $n_i$, $d_i$ are the refractive index, thickness and angle of incidence of layer i.

At normal angle of incidence, $\theta_0=0$ and all the incident angles inside the layers are also zero, Eq. (9) is only determined by the refractive indices and is expressed as:

$$\left\{r_{iS} = r_{iP} = \frac{n_{i-1} - n_i}{n_{i-1} + n_i}, i = 1 \ldots m. \right. \quad (11)$$

Comparing Eqs. (9) and (11), the optical admittances at oblique angles of incidence are equivalent to the refractive indices at normal angle of incidence, this is the reason that optical admittances are sometimes regarded as effective indices and these two terms are interchangeable in the present invention.

Without losing generality, an exemplary thin film polarizing beam-splitter in accordance with the present invention having three coating materials $n_L$, $n_A$, $n_H$, ($n_L < n_A < n_H$,) is used to explain the present invention. The refractive index of the incident medium and exist medium is $n_0$. The optical admittances can then be written as:

$$\begin{cases} \eta_{0S} = n_0\cos\theta_0 \\ \eta_{LS} = n_L\cos\theta_L \\ \eta_{AS} = n_A\cos\theta_A \\ \eta_{HS} = n_H\cos\theta_H \end{cases} \begin{cases} \eta_{0P} = n_0/\cos\theta_0 \\ \eta_{LP} = n_L/\cos\theta_L \\ \eta_{AP} = n_A/\cos\theta_A \\ \eta_{HP} = n_H/\cos\theta_H \end{cases} \quad (12)$$

where the incident angles $\theta_0$, $\theta_L$, $\theta_A$, $\theta_H$ satisfy:

$$n_0 \sin\theta_0 = n_L \sin\theta_L = n_A \sin\theta_A = n_H \sin\theta_H, \quad (13)$$

For p-polarized light, the thin film polarizing beam-splitter coating in the present invention acts like an anti-reflection coating (AR), it promotes transmission and reduces reflection of p-polarized light. For s-polarized light, the thin film polarizing beam-splitter coating acts as a highly reflective coating.

FIG. 5A shows the calculated admittances for p-polarized light for the case of a thin film polarizing beam-splitter of the present invention where $n_0=1.52$, $n_L=1.38$, $n_A=1.65$, $n_H=2.35$. The Brewster angle $\theta_{0B}$ inside the incident medium is given by Eq. (4). When the incident angle is below the Brewster angle, we can see that for p-polarized light the effective indices or optical admittance for the high index $n_H$ layers is always greater that the effective index or optical admittance for the low index layers $n_L$. However, for incident angles greater than the Brewster angle $\theta_{0B}$, the effective indices of the low index layers is greater than that of the high index layers, so that the low index layers act like high index layers, and the high index layers act like low index layers. This explains why existing conventional or modified MacNeille polarizers have very limited performance, especially in the angular field. These polarizers have a central operational angle that is equal to or very close to the Brewster angle $\theta_{0B}$. A thin film PBS coating designed to work below the Brewster angle is unlikely to also work well above the Brewster angle because although the angle of incidence to the layer structure changes slightly above the Brewster angle the effective indices of the layers are reversed so that the effective layer structure on either side of the Brewster angle is very different. Even when additional intermediate index layers with a refractive between $n_L$ and $n_H$ are added such as in the case of modified MacNeille polarizers, the underlying problem of the effective indices reversing for $n_L$ and $n_H$ layers still exists.

In embodiments of the present invention, the polarizing beam-splitter works for a central incident angle, or central operational angle greater than the Brewster angle $\theta_{0B}$, preferably at least several degrees higher than the Brewster angle and thus most of the operational angles or incident angles are also greater than the Brewster angle $\theta_{0B}$. Furthermore, some of the operation angles can also be greater than the critical angle $\theta_C$, and the angle $\theta_{LL}$ defined for the Li Li PBS. The upper limit operational angle of the thin film polarizing beam-splitter in the present invention is determined by frustrated total internal reflection in the layers having the lowest refractive index $n_L$. Above this angle, p-polarized light has higher reflection than that of s-polarized light, this is why the Li Li PBS operating above $\theta_{LL}$ reflects p-polarized light and transmits s-polarized light. In the present invention, the effective index reversing behavior of low and high index layers around the Brewster angle is minimized because most operational angles are greater than the Brewster angle. The performance of the polarizing beam-splitter will improve as the central incident angle increases to higher angles.

A further key aspect of embodiments of the present invention is that at least one additional coating material of intermediate refractive index $n_A$ is used. From FIG. 5A, as the incident angle increases above the Brewster angle $\theta_{0B}$, the difference between the effective indices of the lowest and highest index layers increase quickly. Although this is better than the situation of effective index reversing in the middle of the range of operational angles as in conventional or modified MacNeille polarizers, it is also not a desirable condition either for designing a wide angle thin film polarizing beam-splitter. In addition, for some operational angles or incident angles around the Brewster angle, the optical admittance or effective index of the substrate $\eta_{OP}$ is lower than both $\eta_{LP}$ and $\eta_{HP}$. This is undesirable because the thin film polarizing beam-splitter coating must act as an AR coating for p-polarized light, and layers with effective indices close to, and preferably lower, than that of the substrate $\eta_{OP}$ are required. The use of layers with at least one intermediate index between $n_L$ and $n_H$ can overcome both problems. This is because they provide additional optical admittances or effective indices that are very close to, or preferably lower than, the admittance of the substrate over a range of operational angles where both $\eta_{LP}$ and $\eta_{HP}$ are greater than $\eta_{OP}$. In addition, they provide intermediate effective indices between $\eta_{LP}$ and $\eta_{HP}$ for a range of operational angles where $\eta_{LP}$ and $\eta_{HP}$ change quickly. As a result, the present invention achieves significantly improved performance over the conventional or the modified MacNeille polarizers, especially in the average extinction ratio of the reflected beam over a wide angular field. As seen in FIG. 5A, the optical admittance $\eta_{AP}$, in the case where the intermediate index $n_A=1.65$, is lower than that of the substrate $\eta_{OP}$ for a range of operational angles around the Brewster angle, furthermore, there exists an intermediate effective index between the values of $\eta_{HP}$ and $\eta_{LP}$ over most of the operational angles.

For s-polarized light, another key advantage of a polarizing beam-splitter in accordance with embodiments of the present invention is that it acts as a much better high reflective coating because most of the operational angles are greater than the Brewster angle. The performance of a high reflective coating is determined by the optical admittance ratio or the effective refractive index ratio of the highest and lowest refractive index $\eta_{HS}/\eta_{LS}$, the higher the ratio, the better the performance and the easier to obtain a coating design. By way of example, FIG. 5B shows the calculated optical admittances $\eta_{OS}$, $\eta_{LS}$, $\eta_{AS}$, $\eta_{HS}$, and admittance ratio ($\eta_{HS}/\eta_{LS}$,) for the sample coating materials as in FIG. 5A. Clearly, the optical admittance ratio increases with angle of incidence. Because most of the operational or incident angles are greater than the Brewster angle, which is used as a central angle in conventional or modified MacNeille polarizers, the performance for the s-polarized light in the thin film polarizing beam-splitter in the present invention is better than that of the conventional or modified MacNeille polarizers.

Yet another aspect of embodiments of the present invention is that because some of the incident angular range of the polarizing beam-splitter is above the critical angle, the effect of frustrated total internal reflection can also contribute to the improved performance in the present invention in combination with thin film interference effects.

To illustrate the performance of embodiments of the present invention, and to demonstrate the trend in performance with regard to incident angles or operational angles as shown in FIG. 4, we have designed three embodiments of PBS1, PBS2 and PBS3 that work over three different operational angular ranges. To compare the performance of PBS1-PBS3 with that of prior-art polarizers or polarizing beam-splitters, we have also designed a conventional MacNeille polarizer MC1 using two refractive indices, three modified MacNeille polarizers with two, three, and four refractive index layer systems MC2, MC3, MC4, respectively, and a prior-art Li Li polarizing beam-splitter LPBS using two refractive indices. We use a common PBS performance target for all the polarizing beam-splitter designs: the spectral region is from 420 nm-680 nm, the reflectance for p-polarized light is Rp=0 (Rs=0 for LPBS) and the transmittance for s-polarized is Ts=0 (Tp=0 for LPBS) and the angular field is $\omega_0=\pm 12°$ in air. Without loss of generality, we limit these designs to use the substrate material BK7 glass with $n_0=1.52$ and the coating materials are limited to $MgF_2$, $Nb_2O_5$, $Al_2O_3$, and $Y_2O_3$ with refractive indices of $n_L=1.38$, $n_H=2.35$, $n_{A1}=1.65$, and $n_{A2}=1.84$, respectively. Furthermore, and again without loss of generality, the coating designs disclosed here do not account for dispersion in the refractive indices across the wavelength region of operation. It would be understood by those familiar with the art of optical thin film coating design that including index dispersion will lead to only a minor modification in the designs presented and have only a small impact on the overall performance that can be achieved. We also attempt to design all coatings with a similar number of layers and total layer thickness to minimize the influence of differences in total thickness and number of layers when comparing design performance.

Most of these thin film coatings have been designed with the assistance of a commercial thin film program called Optilayer (any other thin film design software, performing similar tasks, could be used). With the specification of the correct performance target for the operational angular ranges and the specification of correct refractive indices of the substrate and coating materials, the automatic needle synthesis method or the gradual evolution method in Optilayer was used to generate the coating designs within limits of a certain total number of layers and total layer thickness.

In a typical thin film design program, the performance of thin film coatings is evaluated using a merit function MF:

$$MF = \frac{1}{L}\frac{1}{M}\sqrt{\sum_{l=1}^{L}\sum_{i=1}^{M}\left(\frac{QC_{il} - QT_{il}}{\delta_{il}}\right)^2} \quad (14)$$

in our case, where M and L are the number of wavelengths and the numbers of incident angles or operational angles used for evaluation, $QC_i$ and $QT_i$ are the calculated and targeted value of Rp or Ts (or Rs and Tp for LPBS) at the designed wavelength $\lambda_i$, and the operational angle $\theta_i$, and $\delta_{il}$ is the tolerance, similar to a weighting factor on the quantities $QC_i$ and $QT_i$ used in the nonlinear optimization routines of the design software. Here we take M=261 and L=17, spaced uniformly over the range of wavelengths and angles used, and $\delta_i$=0.01. In the design process using the program, the merit function is minimized automatically via an optimization routine and additional layers with correct refractive indices are add if needed.

Figure 5C:
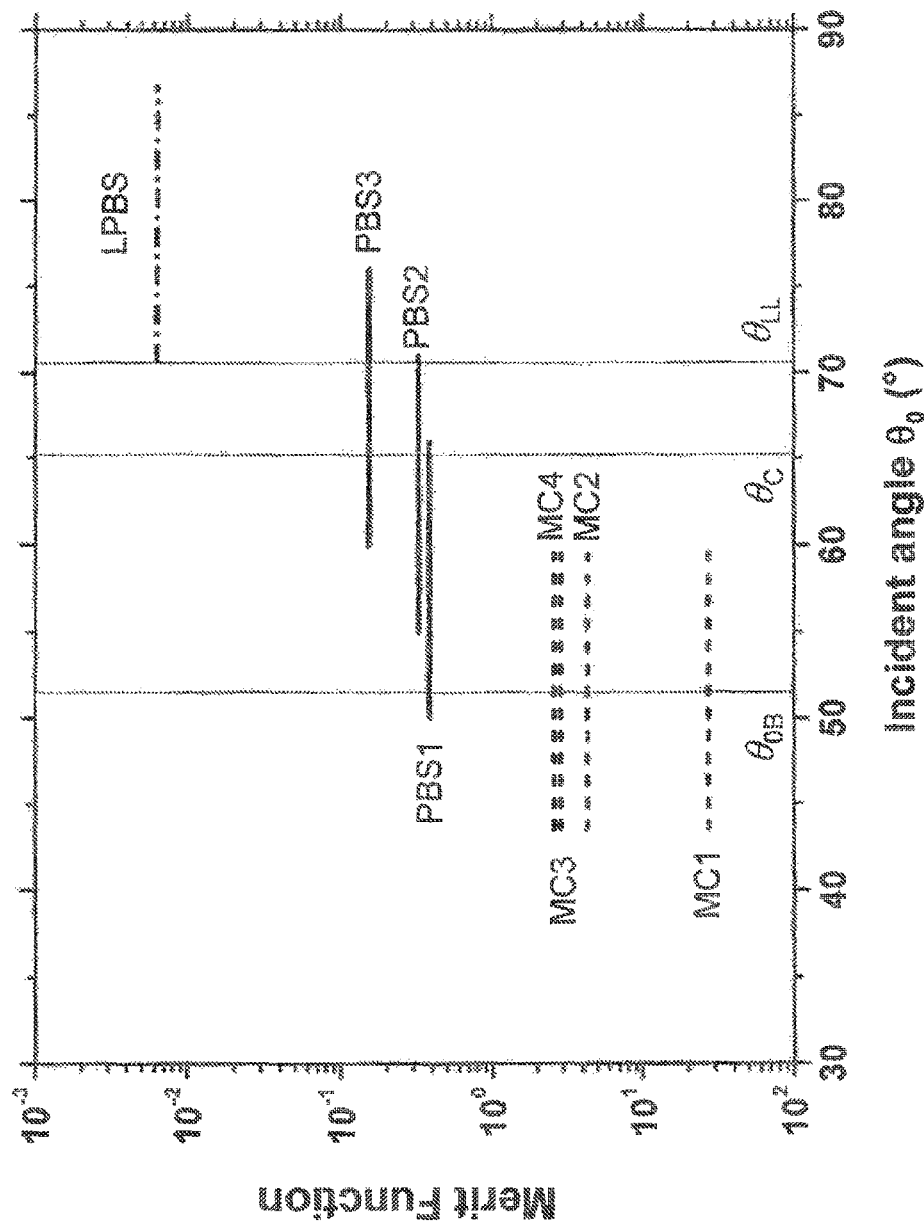
FIG. 5C shows the merit function of the polarizing beam splitter designs MC1-MC4 and LPBS based on prior-art and the polarizing beam-splitter PBS1-PBS3 in accordance with the present invention.

Detailed layer structures with each layer's thickness and refractive index for the designs MC1-MC4 and LPBS, and PBS1-PBS3, are listed in Tables 1 and 2, respectively. A summary of the coating designs as well as their performance are listed in Tables 3 and 4, including the wavelength regions, the substrate and coating material refractive indices, the total number of layers and the total layer thickness, the three important angles $\theta_{OB}$, $\theta_C$, and $\theta_{LL}$, and the central operational angle $\theta_{OCen}$, the relative prism substrate length, the angular field in air and in glass, the operation angular ranges in glass, the averaged transmittance and reflectance of s- and p-polarized light over all incident angles and wavelengths, and the averaged extinction ratios of the transmitted and reflected beams for all wavelengths and operational angles. The performance of all coating designs PBS1-PBS3, MC1-MC4 and LPBS is also shown in FIG. 5C in which the merit function is plotted on the vertical axis (in reverse order as decreasing merit function is equivalent to increasing performance) and the operational angular ranges for the various designs are plotted on the horizontal axis. FIG. 5C is a quantitative version of the general trends shown in FIG. 4.

TABLE 1

Layer structures of MCI-MC4 and LPBS

| | Prior-Art | | | | | | | | | |
|---|---|---|---|---|---|---|---|---|---|---|
| | MC1 | | MC2 | | MC3 | | MC4 | | LPBS | |
| Layer No. | Index | Th. (nm) | Index | Th. (nm) | Index | Th. (nm) | Index | Th. (nm) | Index | Th. (nm) |
| Inc. medium | 1.52 | | 1.52 | | 1.52 | | 1.52 | | 1.52 | |
| 1 | 2.35 | 38.56 | 2.35 | 18.69 | 2.35 | 21.95 | 1.84 | 45.87 | 2.35 | 5.12 |
| 2 | 1.38 | 131.34 | 1.38 | 108.99 | 1.65 | 30.14 | 1.38 | 63.39 | 1.38 | 74.59 |
| 3 | 2.35 | 77.13 | 2.35 | 23.67 | 1.38 | 28.90 | 1.84 | 40.18 | 2.35 | 7.04 |
| 4 | 1.38 | 131.34 | 1.38 | 197.44 | 2.35 | 72.16 | 1.38 | 31.15 | 1.38 | 53.41 |
| 5 | 2.35 | 77.13 | 2.35 | 23.92 | 1.38 | 64.72 | 1.38 | 80.71 | 2.35 | 6.92 |
| 6 | 1.38 | 131.34 | 1.38 | 78.85 | 2.35 | 41.51 | 2.35 | 50.02 | 1.38 | 50.40 |
| 7 | 2.35 | 77.13 | 2.35 | 88.53 | 1.65 | 8.78 | 1.38 | 106.04 | 2.35 | 6.79 |
| 8 | 1.38 | 131.34 | 1.38 | 13.90 | 1.38 | 93.91 | 2.35 | 38.82 | 1.38 | 51.48 |

TABLE 1-continued

Layer structures of MCI-MC4 and LPBS

| | Prior-Art | | | | | | | | | |
|---|---|---|---|---|---|---|---|---|---|---|
| | MC1 | | MC2 | | MC3 | | MC4 | | LPBS | |
| Layer No. | Index | Th. (nm) | Index | Th. (nm) | Index | Th. (nm) | Index | Th. (nm) | Index | Th. (nm) |
| 9 | 2.35 | 77.13 | 2.35 | 11.46 | 2.35 | 58.74 | 1.65 | 14.21 | 2.35 | 6.81 |
| 10 | 1.38 | 131.34 | 1.38 | 12.78 | 1.38 | 52.93 | 1.38 | 103.68 | 1.38 | 54.98 |
| 11 | 2.35 | 77.13 | 2.35 | 14.11 | 2.35 | 63.67 | 2.35 | 23.02 | 2.35 | 7.01 |
| 12 | 1.38 | 131.34 | 1.38 | 11.03 | 1.38 | 89.78 | 1.38 | 107.18 | 1.38 | 60.14 |
| 13 | 2.35 | 77.13 | 2.35 | 26.23 | 2.35 | 46.46 | 1.65 | 26.30 | 2.35 | 7.48 |
| 14 | 1.38 | 131.34 | 1.38 | 116.44 | 1.38 | 99.82 | 1.38 | 256.00 | 1.38 | 65.58 |
| 15 | 2.35 | 77.13 | 2.35 | 38.31 | 2.35 | 46.15 | 2.35 | 34.83 | 2.35 | 8.31 |
| 16 | 1.38 | 131.34 | 1.38 | 114.29 | 1.65 | 8.53 | 1.38 | 109.04 | 1.38 | 69.89 |
| 17 | 2.35 | 77.13 | 2.35 | 48.13 | 1.38 | 109.24 | 2.35 | 26.90 | 2.35 | 9.42 |
| 18 | 1.38 | 131.34 | 1.38 | 101.43 | 2.35 | 39.21 | 1.84 | 21.01 | 1.38 | 75.44 |
| 19 | 2.35 | 77.13 | 2.35 | 43.43 | 1.38 | 114.53 | 1.65 | 23.70 | 2.35 | 10.42 |
| 20 | 1.38 | 131.34 | 1.38 | 115.15 | 2.35 | 40.84 | 1.38 | 211.44 | 1.38 | 87.27 |
| 21 | 2.35 | 77.13 | 2.35 | 41.86 | 1.38 | 86.84 | 2.35 | 18.89 | 2.35 | 11.11 |
| 22 | 1.38 | 131.34 | 1.38 | 106.08 | 1.65 | 18.59 | 1.38 | 243.80 | 1.38 | 100.55 |
| 23 | 2.35 | 77.13 | 2.35 | 48.02 | 2.35 | 41.96 | 1.65 | 43.07 | 2.35 | 12.54 |
| 24 | 1.38 | 131.34 | 1.38 | 105.81 | 1.38 | 106.10 | 1.38 | 12.27 | 1.38 | 108.23 |
| 25 | 2.35 | 77.13 | 2.35 | 47.64 | 1.65 | 7.50 | 2.35 | 39.38 | 2.35 | 15.20 |
| 26 | 1.38 | 131.34 | 1.38 | 106.14 | 2.35 | 43.39 | 1.38 | 99.05 | 1.38 | 131.63 |
| 27 | 2.35 | 77.13 | 2.35 | 52.81 | 1.38 | 114.05 | 2.35 | 40.98 | 2.35 | 15.71 |
| 28 | 1.38 | 131.34 | 1.38 | 123.28 | 2.35 | 51.89 | 1.38 | 142.26 | 1.38 | 142.75 |
| 29 | 2.35 | 77.13 | 2.35 | 44.52 | 1.38 | 127.64 | 2.35 | 30.77 | 2.35 | 18.76 |
| 30 | 1.38 | 131.34 | 1.38 | 87.05 | 2.35 | 28.97 | 1.84 | 43.57 | 1.38 | 169.24 |
| 31 | 2.35 | 38.56 | 2.35 | 7.98 | 1.65 | 14.03 | 2.35 | 37.09 | 2.35 | 20.12 |
| 32 | | | 1.38 | 9.47 | 1.38 | 112.96 | 1.84 | 46.78 | 1.38 | 180.40 |
| 33 | | | 2.35 | 132.83 | 2.35 | 127.52 | 1.65 | 12.89 | 2.35 | 21.40 |
| 34 | | | 1.38 | 126.26 | 1.65 | 14.17 | 1.38 | 199.94 | 1.38 | 190.71 |
| 35 | | | 2.35 | 28.19 | 1.38 | 145.71 | 2.35 | 11.94 | 2.35 | 21.40 |
| 36 | | | 1.38 | 144.08 | 2.35 | 30.88 | 1.38 | 15.07 | 1.38 | 180.40 |
| 37 | | | 2.35 | 133.35 | 1.38 | 105.31 | 1.65 | 14.25 | 2.35 | 20.12 |
| 38 | | | 1.38 | 132.36 | 2.35 | 48.53 | 1.38 | 185.04 | 1.38 | 169.24 |
| 39 | | | 2.35 | 31.07 | 1.65 | 55.16 | 1.84 | 37.41 | 2.35 | 18.76 |
| 40 | | | 1.38 | 138.23 | 2.35 | 20.62 | 2.35 | 82.99 | 1.38 | 142.75 |
| 41 | | | 2.35 | 140.64 | 1.38 | 157.21 | 1.84 | 15.96 | 2.35 | 15.71 |
| 42 | | | 1.38 | 100.33 | 2.35 | 19.18 | 1.65 | 37.00 | 1.38 | 131.63 |
| 43 | | | 2.35 | 137.43 | 1.38 | 218.54 | 1.38 | 97.18 | 2.35 | 15.20 |
| 44 | | | 1.38 | 161.16 | 1.65 | 31.31 | 1.65 | 31.85 | 1.38 | 108.23 |
| 45 | | | 2.35 | 16.62 | 2.35 | 92.70 | 1.84 | 17.88 | 2.35 | 12.54 |
| 46 | | | 1.38 | 167.09 | 1.65 | 39.92 | 2.35 | 81.65 | 1.38 | 100.55 |
| 47 | | | 2.35 | 12.96 | 1.38 | 130.23 | 1.84 | 18.16 | 2.35 | 11.11 |
| 48 | | | 1.38 | 108.52 | 1.65 | 30.13 | 1.65 | 49.87 | 1.38 | 87.27 |
| 49 | | | 2.35 | 149.64 | 2.35 | 96.57 | 1.38 | 66.19 | 2.35 | 10.42 |
| 50 | | | 1.38 | 49.59 | 1.65 | 34.76 | 1.65 | 39.34 | 1.38 | 75.44 |
| 51 | | | 2.35 | 128.28 | 1.38 | 232.60 | 1.84 | 13.00 | 2.35 | 9.42 |
| 52 | | | | | 2.35 | 13.91 | 2.35 | 93.62 | 1.38 | 69.89 |
| 53 | | | | | 1.38 | 199.07 | 1.65 | 65.50 | 2.35 | 8.31 |
| 54 | | | | | 1.65 | 48.96 | 1.38 | 45.29 | 1.38 | 65.58 |
| 55 | | | | | 2.35 | 19.08 | 1.65 | 59.31 | 2.35 | 7.48 |
| 56 | | | | | 1.65 | 11.11 | 1.84 | 11.97 | 1.38 | 60.14 |
| 57 | | | | | 2.35 | 88.53 | 2.35 | 100.81 | 2.35 | 7.01 |
| 58 | | | | | 1.38 | 90.15 | 1.38 | 95.58 | 1.38 | 54.98 |
| 59 | | | | | 1.65 | 51.52 | 1.65 | 43.40 | 2.35 | 6.81 |
| 60 | | | | | 1.38 | 50.31 | 1.38 | 168.79 | 1.38 | 51.48 |
| 61 | | | | | 1.65 | 65.28 | 2.35 | 32.95 | 2.35 | 6.79 |
| 62 | | | | | 2.35 | 33.22 | 1.38 | 90.30 | 1.38 | 50.40 |
| 63 | | | | | 1.65 | 54.44 | 2.35 | 15.02 | 2.35 | 6.92 |
| 64 | | | | | 2.35 | 19.12 | 1.84 | 24.62 | 1.38 | 53.41 |
| 65 | | | | | | | | | 2.35 | 7.04 |
| 66 | | | | | | | | | 1.38 | 74.59 |
| 67 | | | | | | | | | 2.35 | 5.12 |
| Exit medium | 1.52 | | 1.52 | | 1.52 | | 1.52 | | 1.52 | |

TABLE 2

Layer structures of PBS1-PBS3

Present Invention

| Layer No. | PBS1 Index | PBS1 Th. (nm) | PBS2 Index | PBS2 Th. (nm) | PBS3 Index | PBS3 Th. (nm) |
|---|---|---|---|---|---|---|
| Inc. medium | 1.52 | | 1.52 | | 1.52 | |
| 1 | 1.38 | 55.37 | 1.38 | 55.44 | 1.84 | 22.38 |
| 2 | 2.35 | 23.27 | 2.35 | 22.51 | 1.38 | 86.58 |
| 3 | 1.65 | 41.12 | 1.65 | 43.47 | 1.84 | 25.29 |
| 4 | 1.38 | 125.21 | 1.38 | 125.82 | 2.35 | 14.93 |
| 5 | 2.35 | 42.20 | 2.35 | 43.00 | 1.84 | 22.40 |
| 6 | 1.38 | 35.08 | 1.38 | 35.87 | 1.38 | 142.90 |
| 7 | 1.65 | 24.86 | 1.65 | 24.68 | 2.35 | 49.70 |
| 8 | 1.38 | 97.67 | 1.38 | 94.85 | 1.38 | 164.94 |
| 9 | 2.35 | 45.04 | 2.35 | 48.16 | 2.35 | 38.09 |
| 10 | 1.65 | 24.68 | 1.65 | 22.86 | 1.84 | 17.82 |
| 11 | 1.38 | 112.74 | 1.38 | 103.24 | 1.38 | 172.26 |
| 12 | 2.35 | 49.11 | 2.35 | 52.00 | 2.35 | 29.14 |
| 13 | 1.38 | 50.05 | 1.38 | 47.40 | 1.84 | 31.46 |
| 14 | 1.65 | 26.90 | 1.65 | 33.07 | 1.38 | 181.67 |
| 15 | 1.38 | 118.51 | 1.38 | 109.99 | 2.35 | 49.67 |
| 16 | 2.35 | 42.54 | 2.35 | 44.64 | 1.38 | 180.29 |
| 17 | 1.38 | 194.23 | 1.38 | 186.24 | 2.35 | 53.10 |
| 18 | 2.35 | 43.08 | 2.35 | 44.64 | 1.38 | 113.84 |
| 19 | 1.38 | 118.27 | 1.38 | 114.61 | 1.84 | 60.76 |
| 20 | 1.65 | 74.29 | 1.65 | 84.77 | 2.35 | 105.78 |
| 21 | 2.35 | 136.35 | 2.35 | 133.51 | 1.84 | 71.17 |
| 22 | 1.65 | 12.28 | 1.65 | 15.23 | 1.38 | 104.64 |
| 23 | 1.38 | 104.09 | 1.38 | 101.10 | 2.35 | 57.54 |
| 24 | 2.35 | 47.99 | 2.35 | 49.46 | 1.38 | 105.99 |
| 25 | 1.38 | 105.96 | 1.38 | 103.40 | 2.35 | 5.43 |
| 26 | 2.35 | 124.01 | 2.35 | 123.33 | 1.84 | 52.10 |
| 27 | 1.65 | 28.62 | 1.65 | 29.25 | 2.35 | 120.35 |
| 28 | 2.35 | 15.08 | 2.35 | 12.63 | 1.84 | 49.16 |
| 29 | 1.65 | 49.41 | 1.65 | 62.14 | 1.38 | 105.92 |
| 30 | 1.38 | 111.36 | 1.38 | 108.75 | 2.35 | 57.10 |
| 31 | 2.35 | 46.98 | 2.35 | 48.04 | 1.38 | 104.48 |
| 32 | 1.38 | 116.80 | 1.38 | 114.18 | 1.84 | 29.12 |
| 33 | 2.35 | 127.12 | 2.35 | 126.67 | 2.35 | 106.77 |
| 34 | 1.65 | 22.90 | 1.65 | 26.39 | 1.84 | 46.65 |
| 35 | 2.35 | 14.56 | 2.35 | 12.84 | 1.47 | 11.72 |
| 36 | 1.65 | 47.41 | 1.65 | 54.40 | 1.84 | 42.48 |
| 37 | 1.38 | 121.89 | 1.38 | 118.90 | 1.47 | 55.56 |
| 38 | 2.35 | 41.78 | 2.35 | 43.24 | 1.38 | 73.25 |
| 39 | 1.38 | 141.02 | 1.38 | 137.03 | 2.35 | 51.47 |
| 40 | 1.65 | 90.13 | 1.65 | 95.73 | 1.38 | 108.90 |
| 41 | 1.38 | 48.00 | 1.38 | 44.36 | 1.47 | 36.18 |
| 42 | 1.65 | 47.25 | 1.65 | 49.16 | 1.84 | 68.62 |
| 43 | 2.35 | 95.47 | 2.35 | 94.62 | 1.47 | 79.42 |
| 44 | 1.65 | 42.25 | 1.65 | 45.02 | 1.84 | 40.49 |
| 45 | 1.38 | 57.28 | 1.38 | 53.57 | 2.35 | 98.12 |
| 46 | 1.65 | 87.38 | 1.65 | 93.12 | 1.38 | 52.80 |
| 47 | 1.38 | 126.28 | 1.38 | 121.58 | 1.84 | 82.75 |
| 48 | 2.35 | 19.29 | 2.35 | 21.67 | 1.38 | 103.54 |
| 49 | 1.38 | 34.35 | 1.38 | 37.55 | 1.84 | 29.12 |
| 50 | 2.35 | 22.00 | 2.35 | 22.66 | 1.47 | 27.60 |
| 51 | 1.38 | 119.59 | 1.38 | 112.69 | 2.35 | 20.33 |
| 52 | 1.65 | 90.57 | 1.65 | 94.95 | 1.38 | 53.68 |
| 53 | 1.38 | 43.84 | 1.38 | 38.60 | 2.35 | 10.44 |
| 54 | 1.65 | 60.16 | 1.65 | 65.38 | 1.47 | 8.41 |
| 55 | 2.35 | 100.03 | 2.35 | 100.61 | 2.35 | 7.35 |
| 56 | 1.38 | 19.15 | 1.38 | 22.56 | 1.38 | 74.86 |
| 57 | 2.35 | 13.35 | 2.35 | 13.19 | 1.84 | 50.97 |
| 58 | 1.65 | 66.66 | 1.65 | 72.61 | 1.38 | 43.20 |
| 59 | 1.38 | 37.42 | 1.38 | 39.39 | | |
| 60 | 1.65 | 44.07 | 1.65 | 45.36 | | |
| Exit medium | 1.52 | | 1.52 | | 1.52 | |

TABLE 3

Summary of MC1-MC4 and LPBS

| | Prior-Art MC1 | MC2 | MC3 | MC4 | LPBS |
|---|---|---|---|---|---|
| Wavelength range | 420-680 nm | 420-680 nm | 420-680 nm | 420-680 nm | 420-680 nm |
| Substrate index | $n_0 = 1.52$ | $n_0 = 1.52$ | $n_0 = 1.52$ | $n0 = 1.52$ | $n0 = 1.52$ |
| Layer indices | $n_L = 1.38$ | $n_L = 1.38$ | $n_L = 1.38$ | $n_L = 1.38$ | $n_L = 1.38$ |
| | $n_H = 2.35$ | $n_H = 2.35$ | $n_H = 2.35$ | $n_H = 2.35$ | $n_H = 2.35$ |
| | $n_A = 1.65$ | $n_A = 2.35$ | $n_A = 1.65$ | $n_{A1} = 1.65$ | $n_A = 1.65$ |
| | | | | $n_{A2} = 1.84$ | |
| Angular field in air | ±12.2° | ±12.2° | ±12.2° | ±12.2° | ±12.2° |
| Angular field in glass | ±8.0° | ±8.0° | ±8.0° | ±8.0° | ±8.0° |
| Angular range in glass | 43.5°-59.5° | 43.5°-59.5° | 43.5°-59.5° | 43.5°-59.5° | 70.7°-86.7° |
| Central angle $\theta_{0Cen}$ | 51.5° | 51.5° | 51.5° | 51.5° | 78.7° |
| Relative substrate length ($1/\cos\theta_{0Cen}$) | 1.61 | 1.61 | 1.61 | 1.61 | 5.10 |
| Brewster angle $\theta_{0B}$ in glass | 51.5° | 51.5° | 51.5° | 51.5° | 51.5° |
| Critical angle $\theta_C$ | 65.2° | 65.2° | 65.2° | 65.2° | 65.2° |
| Lower-limit angle $\theta_{LL}$ | 70.6° | 70.6° | 70.6° | 70.6° | 70.6° |
| Total number of layers | 31 | 47 | 55 | 64 | 67 |
| Total layer thickness | 3,127 nm | 4,022 nm | 4,075 nm | 4,086 nm | 4,009 nm |
| Merit function MF | 27.0 | 4.280 | 2.850 | 2.580 | 0.006 |
| Avg. transmittance Ts | 0.003305 | 0.025729 | 0.014898 | 0.013068 | 0.999544 |
| Avg. transmittance Tp | 0.793497 | 0.963035 | 0.976014 | 0.979237 | 0.000079 |
| Extinction ratio in transmission | Tp/Ts = 240 | Tp/Ts = 37 | Tp/Ts = 66 | Tp/Ts = 75 | Ts/Tp = 12,596 |
| Avg. reflectance Rs | 0.996695 | 0.974271 | 0.985102 | 0.986932 | 0.000456 |
| Avg. reflectance Rp | 0.206503 | 0.036965 | 0.023986 | 0.020763 | 0.999921 |
| Extinction ratio in reflection | Rs/Rp = 5 | Rs/Rp = 26 | Rs/Rp = 41 | Rs/Rp = 48 | Rp/Rs = 2,193 |

TABLE 4

Summary of PBS1-PBS3

| | Present Invention | | |
|---|---|---|---|
| | PBS1 | PBS2 | PBS3 |
| Wavelength range | 420-680 nm | 420-680 nm | 420-680 nm |
| Substrate index | $n_0 = 1.52$ | $n_0 = 1.52$ | $n_0 = 1.52$ |
| Layer indices | $n_L = 1.38$ | $n_L = 1.38$ | $n_L = 1.38$ |
| | $n_H = 2.35$ | $n_H = 2.35$ | $n_H = 2.35$ |
| | $n_A = 1.65$ | $n_A = 2.35$ | $n_A = 1.65$ |
| Angular field in air | ±12.2° | ±12.2° | ±12.2° |
| Angular field in glass | ±8.0° | ±8.0° | ±8.0° |
| Angular range in glass | 50°-66° | 55°-71° | 60°-76° |
| Central angle $\theta_{0Cen}$ | 58.0° | 63.0° | 68.0° |
| Relative substrate length ($1/\cos\theta_{0Cen}$) | 1.89 | 2.20 | 2.67 |
| Brewster angle $\theta_{0B}$ in glass | 51.5° | 51.5° | 51.5° |
| Critical angle $\theta_C$ | 65.2° | 65.2° | 65.2° |
| Lower-limit angle $\theta_{LL}$ | 70.6° | 70.6° | 70.6° |
| Total number of layers | 57 | 55 | 53 |
| Total layer thickness | 4,009 nm | 3,958 nm | 3,975 nm |
| Merit function MF | 0.383 | 0.325 | 0.153 |
| Avg. transmittance Ts | 0.002406 | 0.001413 | 0.000598 |
| Avg. transmittance Tp | 0.986685 | 0.997330 | 0.998748 |
| Extinction ratio in transmission | Tp/Ts = 410 | Tp/Ts = 706 | Tp/Ts = 1,671 |
| Avg. reflectance Rs | 0.997594 | 0.998587 | 0.999402 |
| Avg. reflectance Rp | 0.013315 | 0.002670 | 0.001252 |
| Extinction ratio in reflection | Rs/Rp = 75 | Rs/Rp = 374 | Rs/Rp = 798 |

The prior-art conventional MacNeille polarizer MC1 uses two coating materials $MgF_2$ and $Nb_2O_5$ with $n_L$=1.38 and $n_H$=2.35, respectively, and substrate BK7 with $n_0$=1.52. The Brewster angle $\theta_{0B}$ is calculated to be 51.53° according to Eq. (2) and the central operation angle of the polarizer is set to $\theta_{0Cen}=\theta_{0B}$=51.53°. The required angular field in glass is $\omega=\pm7.86°\approx8.0°$ and the operational angular range is then 51.53°±8° in glass. The thin film design is a standard quarterwave layer stack with 31 layers. The detailed layer structure and the summary of the coating design and performance are listed in Tables 1 and 3, respectively.

FIGS. 6A-6B and FIGS. 6C-6D show the calculated reflectance and transmittance for MC1 over the design wavelength range for s- and p-polarized light, respectively. The thick dashed line shows the reflectance or transmittance at the central operational angle $\theta_{0Cen}$; the dash-dot lines show the reflectance or transmittance calculated for 9 operational angles equally spaced within the specified angular field from 41.53° to 59.53° in glass; and the thick solid line shows the average reflectance or transmittance calculated from data for 17 operational angles equally spaced within the specified angular field from 41.53° to 59.53° in glass. At the central operational angle $\theta_{0Cen}$ (which is the same as the Brewster angle $\theta_{0B}$) the Brewster angle condition is satisfied for all interfaces between the layers $n_L$ and $n_H$, thus, p-polarized light does not see any interfaces (i.e. there is a uniform index throughout the thin film structure) and so is completely transmitted between the interfaces of layers $n_L$ and $n_H$. However, there is still residual reflectance at the layer/substrate interfaces because at these interfaces the Brewster angle condition is not satisfied. Because of this, even at the Brewster angle, conventional MacNeille polarizers have a low average extinction ratio Rs/Rp in the reflected beam. MC1 with its quarterwave stack of high/low index layers is a broadband high reflecting coating for s-polarized light at the Brewster angle as well as beyond this angle except at the shorter or longer wavelengths and thus s-polarized light is substantially reflected as shown in FIG. 6A. The Brewster angle condition is not satisfied at other incident angles or operational angles $\theta_0$ ($\theta_0 \neq \theta_{0Cen} = \theta_{0B}$). As indicated in FIG. 6B, when the incident angle $\theta_0$ decreases or increases by only 1-2° from the Brewster angle $\theta_{0B}$, a significant increase in the reflectance for the p-polarized light occurs. Thus, as shown in Table 3, MC1 has a very low average extinction ratio in reflection, the average extinction ratio in reflection is only about 5:1 while the average extinction in transmission is about 240:1 over an angular field of ±12° in air. The merit function MF of MC1 is about 27 and the average transmission for the desired p-polarized light is undesirably low at 79%. As a consequence all prior-art conventional MacNeille polarizers are used as narrow-angular field polarizers if high transmission is required and they can not be used as polarizing beam-splitters when both high average extinction ratios in reflection and transmission are required over a wide angular field.

Several approaches are commonly used by thin film coating designers to improve the performance of thin film coatings with variable degree of success depending on the nature of the coating. These approaches include changing the thickness of each layer, increasing the number of layers or the total layer thickness or adding additional layers with different refractive indices. The total number of layers and the total layer thicknesses are often dictated by the process used to deposit thin film coatings. Even when increasing the number of layers and total thickness improve thin film coating performance it is often the case that thin film coatings with fewer layers and smaller total thickness are preferred due to the complexity and high cost associated with manufacturing higher layer counts and thick coatings. These approaches have been applied to the design of modified MacNeille polarizers or polarizing beam-splitters and we apply them here to design representative prior-art modified MacNeille polarizers.

The prior-art modified MacNeille polarizer MC2 also uses the two coating materials $MgF_2$ and $Nb_2O_5$ with $n_L$=1.38 and $n_H$=2.35, respectively, and substrate BK7 with $n_0$=1.52. The Brewster angle $\theta_{0B}$ is calculated to be 51.53° according to Eq. (2) with the lowest and highest refractive index values of 1.38 and 2.35 and the central operation angle of the polarizer is set to $\theta_{0Cen}=\theta_{0B}$=51.53°. The required angular field in glass is $\omega=\pm7.86°\approx8.0°$ and the angular range is 51.53°±8° in glass, the same as for MC1. The thin film design is a non-quarterwave layer stack with 47 layers and all layer thicknesses are optimized and additional layers are added when it is necessary by using the Optilayer thin film design software with the gradual evolution design approach. The detailed layer structure and summary of the coating design and performance are listed in Tables 1 and 3, respectively.

FIG. 7A shows the calculated transmittance of prior-art MC2 for s- and p-polarized light, the thin dashed lines represent Ts for 9 operational angles equally spaced across the design angular range, and the thick dashed line represents the averaged Ts calculated from 17 operational angles equally spaced across the design angular range, the thin dash-dot lines represent Tp for 9 equally spaced operational angles, and the thick solid line represents the averaged Tp calculated from 17 equally spaced operational angles. FIG. 7B shows the calculated reflectance of prior-art MC2 for s- and p-polarized light, the thin dashed lines represent Rp for 9 operational angles equally spaced across the design angular range, and the thick dashed line represents the averaged Rp calculated from 17 equally spaced operational angles, the dash-dot lines represent Rs for 9 equally spaced operational angles, and the thick solid line represents the averaged Rs calculated from 17 equally spaced operational angles. The merit function is improved from MF=27.00 in MC1 to MF=4.28 in MC2. The average extinction ratio in reflection is improved from 5:1 in MC1 to 26:1 in MC2, however, this improvement is at the sacrifice of a lower average extinction ratio in transmission from 240:1 in MC1 to 37:1 in MC2. The performance of MC2 is far from acceptable for many applications that require both high average extinction ratios in both transmission and reflection for a wide angular field.

To further improve the performance of modified MacNeille polarizers it has been proposed to use additional layers with intermediate refractive indices between the low and high indices as described in reference D1. This approach was adapted here for the design of the modified MacNeille polarizers MC3 with one additional coating material ($Al_2O_2$ with $n_A=1.65$) and MC4 with two additional coating materials ($Al_2O_3$ with $n_{A1}=1.65$ and $Y_2O_3$ with $n_{A2}=1.85$). The detailed layer structures and summary of the coating structure and performance for MC3 and MC4 are listed in Tables 1 and 3, respectively.

FIGS. 8A and 9A show the calculated transmittance for s- and p-polarized light of MC3 and MC4, respectively. In FIGS. 8A and 9A the thin dashed lines represent Ts for 9 operational angles equally spaced across the design angular range, and the thick dashed line represent Ts averaged over 17 operational angles equally spaced across the design angular range, the dash-dot lines represent Tp for 9 operational angles equally spaced across the design angular range, and the thick solid line represents Tp averaged over 17 operational angles equally spaced across the design angular range. FIGS. 8B and 9B show the calculated reflectance for s- and p-polarized light for MC3 and MC4, respectively. In FIGS. 8B and 9B the thin dashed lines represent Rp for 9 operational angles equally spaced across the design angular range, and the thick dashed line represents Rp averaged over 17 operational angles equally spaced across the design angular range, the dash-dot lines represent Rs for 9 operational angles equally spaced across the design angular range, and the thick solid line represents Rs averaged over 17 operational angles equally spaced across the design angular range. The merit functions for MC3 and MC4 are 2.85 and 2.58, respectively, an improvement factor of less than two over MC2 with a merit function 4.28. The average extinction ratios in reflection for MC3 and MC4 are 41:1 and 48:1, also an improvement factor less than two over MC2 with an average extinction ratio of about 26:1 in reflection. The performance of MC3 and MC4 is not acceptable for many applications that require both high average extinction ratios in both transmission and reflection for a wide angular field.

Another prior-art thin film polarizing beam-splitter is the Li Li PBS, as disclosed in U.S. Pat. No. 5,912,762 and in reference D2. Here, the design LPBS is based on the design principles of the Li Li PBS. LPBS uses two coating materials $n_L=1.38$ and $n_H=2.35$ and $n_O=1.52$. The lower-limit angle is calculated to be 70.6° from Eq. (5). Thus, the operational angular range in glass is specified from 70.7° to 87.7°. The detailed layer structure and summary of the coating structure and its performance are listed in Tables 1 and 3, respectively.

FIG. 10A shows the calculated transmittance for the prior-art LPBS for s- and p-polarized light, the thin dashed lines represent Tp for 9 equally spaced operational angles, and the thick dashed line represents Tp averaged over 17 equally spaced operational angles, the thin dash-dot lines represent Ts for 9 equally spaced operational angles, and the thick solid line represents Ts averaged over 17 equally spaced operational angles. FIG. 10B shows the calculated reflectance of prior-art PBS LPBS for s- and p-polarized light, the thin dashed lines represent Rs for 9 equally spaced operational angles, and the thick dashed line represents Rs averaged over 17 equally spaced operational angles, the thin dash-dot lines represent Rp for 9 equally spaced operational angles, and the thick solid line represents Rp averaged over 17 equally spaced operational angles. Notice that LPBS reflects p-polarized light and transmits s-polarized light, unlike conventional and modified MacNeille polarizers or PBSs. The merit function for LPBS is 0.0063, and compared to the best modified MacNeille design MC4 is an improvement by a factor of 400 times over that of MC4. The average extinction ratio in transmission is >12,000 for LPBS, an improvement factor of 168 times higher than that of MC4, the average extinction ratio in reflection is >2,000 for LPBS, i.e. 46 times higher than that of MC4.

Although LPBS has superior performance than the conventional and modified MacNeille polarizers or PBSs, it operates at much larger angles of incidence with the central incident angle or operational angle $\theta_{0Cen}=78.7°$ and results in a much larger prism than for any of MC1-4 for any given incident beam size. The required coated surface length L of the prism substrate is proportional to $1/\cos\theta_{0Cen}$. Although the Li Li PBS often uses high index prism substrates to lower the incident angles or operational angles, high index substrates require more expensive optical contacting to bond them and this limits the use of the Li Li PBSs in applications such as low-cost 3D projection displays.

As demonstrated in the above prior-art designs MC1-MC4 and LPBS even with all the known optimization approaches available to thin film coating designers, and assistance from powerful thin film design programs, it is not possible to achieve satisfactory high-performance thin film polarizing beam-splitters with compact size and ease of manufacture. Clearly, there is a need to have improved performance polarizing beam-splitters over conventional designs while still maintaining reasonable device size and ease of manufacture.

At the heart of the high-performance thin film polarizing beam-splitters in accordance with the present invention is the idea to move the central operational angle $\theta_{0Cen}$ to an angle above the Brewster angle $\theta_{0B}$ in such a way that all or most incident angles or operational angles for the polarizing beam-splitter will be above the Brewster angle and in most cases some operational angles are even greater than the critical angle. The Brewster angle condition leads to the situation that for incident angles or operational angles $\theta_0$ on either side of the Brewster angle $\theta_{0B}$, the relative values for the effective index or optical admittance of the low and high index layers are interchanged for p-polarized light. In other words, for incident angles $\theta_0$ smaller than the Brewster angle $\theta_{0B}$ the high index layers have an effective index which is greater than the effective index for the low index layers; however, for incident angles $\theta_0$ greater than the Brewster angle $\theta_{0B}$, the high index layers have an effective index that is lower than the effective index for the low index layers, in the case of p-polarized light. Details about the effective index, or optical admittance, can be found in the book "Thin-Film Optical Filters" by Hugh Angus Macleod published by CRC Press in 2001. Having such an abrupt change in the effective index structure of the thin film stack for incident angles around the Brewster angle prevents conventional or modified MacNeille polarizers that have operational angles centered on the Brewster angle from achieving good angular performance. In the present invention, by moving most of the incident angles or operational angles away from the Brewster angle, the conflicting behavior of low and high index layers on either side of the Brewster angle for p-polarized light is not apparent and thin film polarizing beam-splitters with improved performance can be designed. In addition, some of the incident angles or operational angles in the present invention can be greater than the critical angle $\theta_C$, and the effect of frustrated total internal reflection can contribute to enhance the PBS performance as demonstrated by the high performance of the Li Li PBS. Furthermore, additional layers with different refractive indices can be used to further improve the performance of the polarizing beam-splitter in accordance with the present invention.

The three polarizing beam-splitters PBS1, PBS2 and PBS3 designed in accordance with the principles of present invention have similar performance target and use the same substrate material BK7 ($n_0$=1.52) and coating materials MgF$_2$ ($n_L$=1.38) and Nb$_2$O$_5$ ($n_H$=2.35) and an intermediate refractive index material Al$_2$O$_3$ ($n_A$=1.65). The Brewster angle determined by $n_L$ and $n_H$ is calculated to be 51.53°, the critical angle $\theta_C$=65.2°, and the lower-limit angle $\theta_{LL}$ is 70.6°. PBS1, PBS2 and PBS3 are designed for different angular ranges, covering the range 50°-66° with central operational angle $\theta_{oCen}$=58°, the range 55°-71° with central operational angle $\theta_{oCen}$=63° and the range 60°-76° with central operational angle $\theta_{oCen}$=68°, respectively. The detailed layer structure and the summary of the coating structure and the performance of PBS1, PBS2 and PBS3 are listed in Tables 2 and 4, respectively.

FIGS. 11A, 12A and 13A show the calculated transmittance for s- and p-polarized light of PBS1, PBS2 and PBS3, respectively, the thin dashed lines represent Ts for 9 equally spaced operational angles, and the thick dashed line represents Ts averaged over 17 equally spaced operational angles, the thin dash-dot lines represent Tp for 9 equally spaced operational angles, and the thick solid line represents Tp averaged over 17 equally spaced operational angles. FIGS. 11B, 12B and 13B show the calculated reflectance for s- and p-polarized light of PBS1, PBS2 and PBS3 of the present invention, respectively, the thin dashed lines represent Rp for 9 equally spaced operational angles, and the thick dashed line represents Rp averaged over 17 equally spaced operational angles, the thin dash-dot lines represent Rs for 9 equally spaced operational angles, and the thick solid line represents Rs averaged over 17 equally spaced operational angles. The merit functions of PBS1, PBS2 and PBS3 are 0.383, 0.325 and 0.153, respectively, compared to the best modified MacNeille polarizer with MF=2.58, the improvement factor is about 6.7, 7.9 and 16.8. The average extinction ratios in transmission for PBS1, PBS2 and PBS3 are 410:1, 706:1 and 1671:1, improvement factors of 5.4, 9.4 and 22.2 compared to the MC4 value of 75:1. The average extinction ratios in reflection of PBS1, PBS2 and PBS3 are 75:1, 374:1 and 978:1, the improvement factors are 1.5, 7.8 and 16.6 compared to the MC4 value of 48:1. Clearly, the performance of PBS1, PBS2 and PBS3 should meet the requirements of many applications, including 3D projection displays, that are not met by conventional or the modified MacNeille PBS.

The performance of PBS1, PBS2 and PBS3 are directly linked to the central incident angle or operational angle $\theta_{oCen}$ (or the operational angular range), as the central operational angle $\theta_{oCen}$ increases from $\theta_{oCen}$=58° in PBS1, to $\theta_{oCen}$=63° in PBS2 and $\theta_{oCen}$=68° in PBS3, so does the performance, as shown through the decreasing value of the merit function. FIG. 5C shows the calculated merit functions and incident angles or operational angles of the prior-art MC1-MC4 and LPBS, as well as the present invention PBS1-PBS3. The merit function is plotted in log scale in reverse direction and the lower the merit function, the better the performance. The performance trend of the prior-art polarizers or PBSs as well as the thin film polarizing beam-splitters according to the present invention is clearly demonstrated in FIG. 5C. FIG. 5C is a quantitative version of FIG. 4. Although the merit function of LPBS is lower than that of PBS1, PBS2 and PBS3, it has a much larger central operational angle and thus a much larger prism size is required for a given incident cone of light. Assuming the length of the coated surface of LPBS is unity, then the length of the coated beam splitting surface would be 0.37, 0.43, and 0.52 for PBS1, PBS2 and PBS3, respectively, representing significantly smaller prism sizes than that of LPBS. Tables 3 and 4 lists the relative substrate lengths for the various PBS designs.

To further reduce the sizes of the prism substrates of the thin film polarizing beam-splitters in accordance with the present invention, higher index prism substrates can be used. As shown in Eqs. (3) and (4), the Brewster angle $\theta_{oB}$ and the critical angle $\theta_C$ decrease as the refractive index of the substrate $n_0$ increases. Two thin film polarizing beam-splitters PBS4 and PBS5 in accordance with the present invention have been designed with higher index prism substrates for the visible spectral region from 420 nm to 680 nm with an angular field of ±12° in air. The design processes of PBS4 and PBS5 are similar to PBS1-PBS3. First the three angles $\theta_{oB}$, $\theta_C$, $\theta_{LL}$ are calculated and then the operational angular ranges are selected. Detailed layer structures with each layer's thickness and refractive index for the designs PBS4 and PBS5 are listed in Table 5. A summary of the coating designs as well as their performance are listed in Table 7, including the wavelength range, the substrate and coating material refractive indices, the total number of layers and the total layer thickness, the three angles $\theta_{oB}$, $\theta_C$, and $\theta_{LL}$, the central operational angle $\theta_{oCen}$, the relative prism substrate length, the angular field in air and in glass, the operation angular ranges in glass, the averaged transmittance and reflectance of s- and p-polarized light over all incident angles and wavelengths, and the average extinction ratios of the transmitted and reflected beams for all wavelengths and operational angles.

TABLE 5

Layer structures of PBS4 to PBS7

| | PBS4 | | PBS5 | | PBS6 | | PBS7 | |
|---|---|---|---|---|---|---|---|---|
| Layer No. | Index | Th. (nm) | Index | Th. (nm) | Index | Th. (nm) | Index | Th. (nm) |
| Inc. medium | 1.75 | | 1.85 | | 1.52 | | 1.85 | |
| 1 | 1.65 | 86.936 | 2.35 | 36.913 | 2.35 | 8.766 | 1.75 | 19.414 |
| 2 | 1.38 | 12.013 | 1.75 | 215.381 | 1.38 | 62.872 | 1.47 | 100.737 |
| 3 | 2.35 | 15.202 | 1.47 | 71.824 | 2.35 | 23.044 | 2.35 | 23.234 |
| 4 | 1.65 | 99.072 | 2.35 | 50.439 | 1.65 | 48.777 | 1.75 | 22.347 |
| 5 | 1.38 | 63.558 | 1.75 | 98.65 | 1.38 | 124.782 | 1.47 | 161.876 |
| 6 | 2.35 | 31.871 | 1.47 | 183.998 | 2.35 | 45.731 | 2.35 | 40.771 |
| 7 | 1.65 | 55.178 | 2.35 | 108.188 | 1.38 | 14.059 | 1.47 | 156.959 |
| 8 | 1.38 | 112.431 | 1.47 | 220.549 | 1.65 | 12.942 | 2.35 | 49.807 |
| 9 | 2.35 | 46.31 | 2.35 | 111.946 | 1.38 | 146.285 | 1.47 | 124.444 |
| 10 | 1.38 | 31.054 | 1.75 | 14.681 | 2.35 | 47.64 | 2.35 | 55.194 |

TABLE 5-continued

Layer structures of PBS4 to PBS7

| Layer No. | PBS4 Index | PBS4 Th. (nm) | PBS5 Index | PBS5 Th. (nm) | PBS6 Index | PBS6 Th. (nm) | PBS7 Index | PBS7 Th. (nm) |
|---|---|---|---|---|---|---|---|---|
| 11 | 1.65 | 23.286 | 1.47 | 179.133 | 1.38 | 84.861 | 1.47 | 81.000 |
| 12 | 1.38 | 116.82 | 2.35 | 131.91 | 1.65 | 11.59 | 1.75 | 13.03 |
| 13 | 2.35 | 47.90 | 1.47 | 101.10 | 1.38 | 93.62 | 1.47 | 57.08 |
| 14 | 1.38 | 65.57 | 1.75 | 14.13 | 2.35 | 46.49 | 2.35 | 45.23 |
| 15 | 1.65 | 25.49 | 1.47 | 102.04 | 1.38 | 169.20 | 1.47 | 164.32 |
| 16 | 1.38 | 96.85 | 2.35 | 109.96 | 1.65 | 15.77 | 2.35 | 44.09 |
| 17 | 2.35 | 50.10 | 1.47 | 245.16 | 2.35 | 42.89 | 1.47 | 100.16 |
| 18 | 1.38 | 149.20 | 2.35 | 103.67 | 1.38 | 99.67 | 1.75 | 82.62 |
| 19 | 1.65 | 19.58 | 1.47 | 151.21 | 1.65 | 57.76 | 2.35 | 136.36 |
| 20 | 2.35 | 44.06 | 1.75 | 150.55 | 2.35 | 154.99 | 1.47 | 94.62 |
| 21 | 1.38 | 83.27 | 2.35 | 318.71 | 1.38 | 91.87 | 1.47 | 48.34 |
| 22 | 1.65 | 100.75 | 1.47 | 143.19 | 1.65 | 6.04 | 1.47 | 94.09 |
| 23 | 2.35 | 138.21 | 2.35 | 113.69 | 2.35 | 50.19 | 1.75 | 34.41 |
| 24 | 1.65 | 20.69 | 1.47 | 141.17 | 1.38 | 69.37 | 2.35 | 145.10 |
| 25 | 1.38 | 70.19 | 1.75 | 74.38 | 1.65 | 106.81 | 1.75 | 34.72 |
| 26 | 1.65 | 19.75 | 2.35 | 345.29 | 2.35 | 123.22 | 1.47 | 95.51 |
| 27 | 2.35 | 48.78 | 1.75 | 42.29 | 1.65 | 38.05 | 2.35 | 48.77 |
| 28 | 1.38 | 74.09 | 1.47 | 141.64 | 1.38 | 7.58 | 1.47 | 99.60 |
| 29 | 1.65 | 37.51 | 2.35 | 115.00 | 1.65 | 92.84 | 2.35 | 140.19 |
| 30 | 2.35 | 167.46 | 1.47 | 142.75 | 2.35 | 121.21 | 1.75 | 45.12 |
| 31 | 1.38 | 77.36 | 2.35 | 323.91 | 1.65 | 136.96 | 2.35 | 16.93 |
| 32 | 2.35 | 45.88 | 1.75 | 85.36 | 1.38 | 8.97 | 1.47 | 102.43 |
| 33 | 1.65 | 17.789 | 2.35 | 40.403 | 2.35 | 116.347 | 2.35 | 47.849 |
| 34 | 1.38 | 52.372 | 1.47 | 147.658 | 1.65 | 141.824 | 1.47 | 95.899 |
| 35 | 1.65 | 125.847 | 2.35 | 111.753 | 1.38 | 54.289 | 1.75 | 54.048 |
| 36 | 2.35 | 117.324 | 1.47 | 141.38 | 2.35 | 10.381 | 2.35 | 155.367 |
| 37 | 1.65 | 160.725 | 1.75 | 51.346 | 1.65 | 65.308 | 1.47 | 95.577 |
| 38 | 2.35 | 110.443 | 2.35 | 24.131 | 2.35 | 13.221 | 2.35 | 45.838 |
| 39 | 1.65 | 119.634 | 1.75 | 50.592 | 1.38 | 55.21 | 1.47 | 102.57 |
| 40 | 1.38 | 30.899 | 2.35 | 337.926 | 1.65 | 105.089 | 1.75 | 97.731 |
| 41 | 1.65 | 71.758 | 1.47 | 137.75 | 2.35 | 142.495 | 1.47 | 34.748 |
| 42 | 1.38 | 22.393 | 2.35 | 109.234 | 1.38 | 15.673 | 1.75 | 52.145 |
| 43 | 2.35 | 21.045 | 1.47 | 148.949 | 1.65 | 65.594 | 2.35 | 92.851 |
| 44 | 1.38 | 36.995 | 1.75 | 171.602 | 2.35 | 138.574 | 1.75 | 68.7 |
| 45 | 1.65 | 79.828 | 1.47 | 48.727 | 1.65 | 106.053 | 1.47 | 27.032 |
| 46 | 1.38 | 24.599 | 1.75 | 93.72 | 1.38 | 14.643 | 1.75 | 86.865 |
| 47 | 1.65 | 102.457 | 2.35 | 222.018 | 1.65 | 72.202 | 1.47 | 94.377 |
| 48 | 2.35 | 113.991 | 1.75 | 103.516 | 2.35 | 33.689 | 2.35 | 40.214 |
| 49 | 1.65 | 180.799 | 1.47 | 43.5 | 1.38 | 29.147 | 1.47 | 90.17 |
| 50 | 2.35 | 118.053 | 1.75 | 156.657 | 2.35 | 64.639 | 1.75 | 77.476 |
| 51 | 1.65 | 87.52 | 1.47 | 150.056 | 1.38 | 13.81 | 1.47 | 26.513 |
| 52 | 1.38 | 17.831 | 2.35 | 94.827 | 2.35 | 17.303 | 1.75 | 63.624 |
| 53 | 1.65 | 63.287 | 1.47 | 152.283 | 1.65 | 282.298 | 2.35 | 102.735 |
| 54 | 1.38 | 28.948 | 1.75 | 154.057 | 2.35 | 32.516 | 1.75 | 48.803 |
| 55 | 2.35 | 18.644 | 1.47 | 46.545 | 1.65 | 68.48 | 1.47 | 40.686 |
| 56 | 1.65 | 24.742 | 1.75 | 85.056 | 2.35 | 25.229 | 1.75 | 82.856 |
| 57 | 1.38 | 62.746 | 2.35 | 234.295 | 1.38 | 15.875 | 1.47 | 72.781 |
| 58 | 2.35 | 36.39 | 1.75 | 97.16 | 1.65 | 106.65 | 2.35 | 19.40 |
| 59 | 1.38 | 48.75 | 1.47 | 55.14 | 1.38 | 35.97 | 1.47 | 53.59 |
| 60 | 1.65 | 63.75 | 1.75 | 159.55 | 1.65 | 53.57 | 2.35 | 28.67 |
| 61 | 1.38 | 17.19 | 1.47 | 154.72 | | | 1.47 | 78.74 |
| 62 | 1.65 | 172.47 | 2.35 | 96.15 | | | 1.75 | 79.01 |
| 63 | 2.35 | 73.89 | 1.47 | 139.94 | | | 1.47 | 30.97 |
| 64 | 1.38 | 9.98 | 1.75 | 168.61 | | | 1.75 | 66.96 |
| 65 | 2.35 | 53.55 | 1.47 | 33.72 | | | 2.35 | 17.86 |
| 66 | 1.65 | 52.51 | 1.75 | 122.44 | | | 1.47 | 8.88 |
| 67 | 2.35 | 10.59 | 2.35 | 281.34 | | | 2.35 | 106.93 |
| Exit medium or Optical glue | 1.75 | | 1.85 | | 1.52 | | 1.56 | |

TABLE 6

Layer structures of PBS-B1 to PBS-B3

| Layer No. | PBS-B1 Index | PBS-B1 Th. (nm) | PBS-B2 Index | PBS-B2 Th. (nm) | PBS-B3 Index | PBS-B3 Th. (nm) |
|---|---|---|---|---|---|---|
| Inc. medium | 1.52 | | 1.85 | | 1.85 | |
| 1 | 1.38 | 34.77 | 1.65 | 105.32 | 1.65 | 36.06 |
| 2 | 1.65 | 40.53 | 2.35 | 13.30 | 1.47 | 67.54 |
| 3 | 2.35 | 11.37 | 1.65 | 17.00 | 1.65 | 17.06 |
| 4 | 1.38 | 89.90 | 1.47 | 85.62 | 2.35 | 12.32 |
| 5 | 2.35 | 21.31 | 2.35 | 30.59 | 1.65 | 36.80 |

TABLE 6-continued

Layer structures of PBS-B1 to PBS-B3

| Layer No. | PBS-B1 Index | PBS-B1 Th. (nm) | PBS-B2 Index | PBS-B2 Th. (nm) | PBS-B3 Index | PBS-B3 Th. (nm) |
|---|---|---|---|---|---|---|
| 6 | 1.38 | 34.27 | 1.47 | 99.69 | 1.47 | 57.20 |
| 7 | 2.35 | 15.01 | 1.65 | 98.11 | 1.65 | 147.02 |
| 8 | 1.65 | 14.25 | 1.47 | 29.12 | 1.47 | 12.83 |
| 9 | 1.38 | 76.19 | 2.35 | 11.02 | 2.35 | 96.78 |
| 10 | 1.65 | 110.29 | 1.65 | 44.97 | 1.65 | 138.81 |
| 11 | 1.38 | 19.86 | 2.35 | 53.16 | 1.47 | 80.42 |
| 12 | 2.35 | 92.31 | 1.65 | 98.05 | 2.35 | 26.98 |
| 13 | 1.38 | 16.41 | 1.47 | 13.54 | 1.47 | 98.04 |
| 14 | 1.65 | 139.27 | 1.65 | 54.55 | 1.65 | 97.37 |
| 15 | 2.35 | 85.96 | 1.47 | 90.16 | 1.47 | 24.27 |
| 16 | 1.65 | 81.42 | 2.35 | 22.93 | 1.65 | 32.28 |
| 17 | 1.38 | 18.87 | 1.47 | 108.64 | 2.35 | 77.29 |
| 18 | 1.65 | 42.95 | 1.65 | 102.56 | 1.65 | 45.48 |
| 19 | 2.35 | 98.87 | 1.47 | 32.39 | 1.47 | 17.18 |
| 20 | 1.65 | 117.66 | 2.35 | 88.03 | 1.65 | 99.51 |
| 21 | 1.38 | 79.01 | 1.47 | 36.76 | 1.47 | 122.92 |
| 22 | 2.35 | 51.30 | 1.65 | 109.24 | 2.35 | 30.61 |
| 23 | 1.38 | 105.10 | 1.47 | 136.59 | 1.47 | 98.75 |
| 24 | 2.35 | 45.19 | 2.35 | 29.44 | 2.35 | 90.75 |
| 25 | 1.65 | 29.01 | 1.47 | 105.56 | 1.65 | 146.43 |
| 26 | 1.38 | 115.64 | 2.35 | 27.10 | 1.47 | 120.30 |
| 27 | 2.35 | 47.45 | 1.65 | 19.61 | 2.35 | 31.12 |
| 28 | 1.65 | 10.48 | 2.35 | 49.80 | 1.47 | 87.50 |
| 29 | 1.38 | 130.22 | 1.65 | 156.76 | 1.65 | 30.95 |
| 30 | 2.35 | 53.78 | 1.47 | 123.82 | 2.35 | 96.10 |
| 31 | 1.38 | 127.85 | 2.35 | 30.51 | 1.65 | 140.78 |
| 32 | 2.35 | 53.57 | 1.47 | 93.43 | 1.47 | 15.13 |
| 33 | 1.38 | 111.30 | 1.65 | 29.29 | 1.65 | 28.89 |
| 34 | 1.65 | 9.35 | 2.35 | 95.81 | 1.47 | 68.34 |
| 35 | 1.38 | 11.23 | 1.65 | 141.33 | 2.35 | 44.86 |
| 36 | 2.35 | 51.53 | 1.47 | 26.25 | 1.47 | 102.40 |
| 37 | 1.38 | 121.03 | 1.65 | 24.34 | 1.65 | 8.93 |
| 38 | 1.65 | 10.57 | 1.47 | 63.50 | 2.35 | 47.40 |
| 39 | 2.35 | 44.50 | 2.35 | 44.12 | 1.47 | 121.11 |
| 40 | 1.38 | 136.10 | 1.47 | 96.67 | 2.35 | 49.32 |
| 41 | 1.65 | 20.67 | 1.65 | 14.46 | 1.47 | 110.41 |
| 42 | 2.35 | 33.49 | 2.35 | 48.19 | 2.35 | 54.04 |
| 43 | 1.38 | 115.33 | 1.47 | 114.41 | 1.47 | 113.78 |
| 44 | 1.65 | 52.66 | 2.35 | 51.15 | 2.35 | 50.73 |
| 45 | 2.35 | 12.87 | 1.47 | 105.93 | 1.47 | 115.42 |
| 46 | 1.38 | 44.01 | 2.35 | 55.59 | 2.35 | 52.55 |
| 47 | | | 1.47 | 111.72 | 1.47 | 114.55 |
| 48 | | | 2.35 | 51.72 | 2.35 | 50.12 |
| 49 | | | 1.47 | 112.95 | 1.47 | 117.20 |
| 50 | | | 2.35 | 53.36 | 2.35 | 49.76 |
| 51 | | | 1.47 | 115.95 | 1.47 | 118.92 |
| 52 | | | 2.35 | 49.84 | 2.35 | 44.23 |
| 53 | | | 1.47 | 116.59 | 1.47 | 128.97 |
| 54 | | | 2.35 | 51.87 | 2.35 | 41.20 |
| 55 | | | 1.47 | 110.70 | 1.47 | 87.83 |
| 56 | | | 2.35 | 43.45 | 1.65 | 17.94 |
| 57 | | | 1.65 | 11.87 | 2.35 | 36.35 |
| 58 | | | 1.47 | 119.96 | 1.47 | 13.44 |
| 59 | | | 2.35 | 43.13 | 1.65 | 55.37 |
| 60 | | | 1.47 | 95.45 | 2.35 | 18.87 |
| 61 | | | 2.35 | 36.95 | | |
| 62 | | | 1.65 | 44.69 | | |
| 63 | | | 1.47 | 17.63 | | |
| 64 | | | 2.35 | 14.72 | | |
| Exit medium or Optical glue | 1.52 | | 1.85 | | 1.56 | |

TABLE 7

Summary of PBS4 to PBS7

| | PBS4 | PBS5 | PBS6 | PBS7 |
|---|---|---|---|---|
| Wavelength range | 420-680 nm | 420-680 nm | 420-680 nm | 420-680 nm |
| Substrate index | $n_0 = 1.75$ | $n_0 = 1.85$ | $n_0 = 1.52$ | $n_0 = 1.85$ |

TABLE 7-continued

Summary of PBS4 to PBS7

| | PBS4 | PBS5 | PBS6 | PBS7 |
|---|---|---|---|---|
| Layer indices | $n_L = 1.38$ | $n_L = 1.47$ | $n_L = 1.38$ | $n_L = 1.47$ |
| | $n_H = 2.35$ | $n_H = 2.35$ | $n_H = 2.35$ | $n_H = 2.35$ |
| | $n_A = 1.65$ | $n_A = 1.75$ | $n_A = 1.65$ | $n_A = 1.75$ |
| Optical glue | | | | $n_S = 1.56$ |
| Angular field in air | ±12.3° | ±12.1° | ±18.4° | ±12.1° |
| Angular field in glass | ±7.0° | ±6.5° | ±12.0° | ±6.5° |
| Angular range in glass | 45°-59° | 43°-56° | 52°-76° | 43°-56° |
| Central angle $\theta_{0Cen}$ | 52.0° | 49.5° | 64.0° | 49.5° |
| Relative substrate length $(1/\cos\theta_{0Cen})$ | 1.62 | 1.54 | 2.28 | 1.54 |
| Brewster angle $\theta_{0B}$ in glass | 42.8° | 42.3° | 51.5° | 42.3° |
| Critical angle $\theta_C$ | 52.1° | 52.6° | 65.2° | 52.6° |
| Lower-limit angle $\theta_{LL}$ | 62.5° | 64.8° | 70.6° | 64.8° |
| Total number of layers | 67 | 67 | 60 | 67 |
| Total layer thickness | 4,426 nm | 4,854 nm | 4,060 nm | 4,767 nm |
| Merit function MF | 0.58645 | 0.89334 | 0.95452 | 0.90597 |
| Avg. transmittance Ts | 0.002698 | 0.004337 | 0.004121 | 0.004588 |
| Avg. transmittance Tp | 0.994899 | 0.993057 | 0.992110 | 0.993031 |
| Extinction ratio in transmission | Tp/Ts = 369 | Tp/Ts = 229 | Tp/Ts = 241 | Tp/Ts = 216 |
| Avg. reflectance Rs | 0.997302 | 0.995663 | 0.995879 | 0.995412 |
| Avg. reflectance Rp | 0.005101 | 0.006943 | 0.007890 | 0.006969 |
| Extinction ratio in reflection | Rs/Rp = 196 | Rs/Rp = 143 | Rs/Rp = 126 | Rs/Rp = 143 |

TABLE 8

Summary of PBS-B1 to PBS-B3

| | PBS-B1 | PBS-B2 | PBS-B3 |
|---|---|---|---|
| Wavelength range | 400-500 nm | 400-500 nm | 400-500 nm |
| Substrate index | $n_0 = 1.52$ | $n_0 = 1.85$ | $n_0 = 1.85$ |
| Layer indices | $n_L = 1.38$ | $n_L = 1.47$ | $n_L = 1.47$ |
| | $n_H = 2.35$ | $n_H = 2.35$ | $n_H = 2.35$ |
| | $n_A = 1.65$ | $n_A = 1.75$ | $n_A = 1.65$ |
| Optical glue | | | $n_S = 1.56$ |
| Angular field in air | ±12.2° | ±12.1° | ±12.1° |
| Angular field in glass | ±8.0° | ±6.5° | ±6.5° |
| Angular range in glass | 56°-72° | 42°-55° | 42°-55° |
| Central angle $\theta_{0Cen}$ | 64.0° | 48.5° | 48.5° |
| Relative substrate length $(1/\cos\theta_{0Cen})$ | 2.28 | 1.51 | 1.51 |
| Brewster angle $\theta_{0B}$ in glass | 51.5° | 42.3° | 42.3° |
| Critical angle $\theta_C$ | 65.2° | 52.6° | 52.6° |
| Lower-limit angle $\theta_{LL}$ | 70.6° | 64.8° | 64.8° |
| Total number of layers | 46 | 64 | 60 |
| Total layer thickness | 2,784 nm | 4,230 nm | 4,095 nm |
| Merit function MF | 0.00334 | 0.03866 | 0.03937 |
| Avg. transmittance Ts | 0.000013 | 0.000096 | 0.000104 |
| Avg. transmittance Tp | 0.999976 | 0.999709 | 0.999707 |
| Extinction ratio in transmission | Tp/Ts = 75,552 | Tp/Ts = 10,392 | Tp/Ts = 9,584 |
| Avg. reflectance Rs | 0.999987 | 0.999904 | 0.999896 |
| Avg. reflectance Rp | 0.000024 | 0.000291 | 0.000293 |
| Extinction ratio in reflection | Rs/Rp = 41,317 | Rs/Rp = 3,441 | Rs/Rp = 3,413 |

PBS4 uses glass prism substrates with a refractive index $n_0=1.75$ and identical coating materials as PBS1-PBS3 with MgF$_2$ ($n_L=1.38$), Nb$_2$O$_5$ ($n_H=2.35$) and Al$_2$O$_3$ ($n_A=1.65$). PBS5 uses prism substrates with refractive index $n_0=1.85$, such as Schott glass SF57HHT or Ohara glass PBH56, and coating materials SiO$_2$ with $n_L=1.47$, Nb$_2$O$_5$ with $n_H=2.35$ and an SiO$_2$/Nb$_2$O$_5$ mixture with $n_A=1.75$. SF57HHT and PBH56 optical glasses have low birefringence which is advantageous for use in applications require high power light sources such as high brightness 3D projection displays because low birefringence results in low depolarization in the polarized light. In additional, it is advantageous to use $SiO_2$ ($n_L$=1.47) as the lowest refractive index rather than $MgF_2$ because oxides such as $SiO_2$, $Al_2O_3$, $Nb_2O_5$ and their mixtures can be deposited with high energy deposition processes that produce much denser and more environmentally stable coatings desirable for many applications.

FIGS. 14A and 15A show the calculated transmittance for s- and p-polarized light of PBS4 and PBS5 of the present invention, respectively, the thin dashed lines represent Ts for 9 equally spaced operational angles, and the thick dashed line represents Ts averaged over 17 equally spaced operational angles, the thin dash-dot lines represent Tp for 9 equally spaced operational angles, and the thick solid line represents Tp averaged over 17 equally spaced operational angles. FIGS. 14B and 15B show the calculated reflectance for s- and p-polarized light of PBS4 and PBS5 of the present invention, respectively, the thin dashed lines represent Rp for 9 equally spaced operational angles, and the thick dashed line represents Rp averaged over 17 equally spaced operational angles, the thin dash-dot lines represent Rs for 9 equally spaced operational angles, and the thick solid line represents Rs averaged over 17 equally spaced operational angles. The merit functions of PBS4 and PBS5 are 0.586 and 0.893, respectively. The average extinction ratios in transmission of PBS4 and PBS5 are 369:1 and 229:1, respectively. The average extinction ratios in reflection of PBS4 and PBS5 are 196:1 and 143:1, respectively.

The performance of the thin film polarizing beam-splitters in accordance with embodiments of the present invention depends on the refractive indices of the coating and substrate materials. In general, the smaller the lowest refractive index $n_L$ and the substrate index $n_0$, the better the performance. Although the performance of PBS4 and PBS5 are not as good as PBS2 and PBS3 because different substrate/coating materials are used, they are much better than their counterpart MacNeille or modified MacNeille designs with the same prism substrates.

For some applications, thin film polarizing beam-splitters with an even wider angular field than ±12° in air are required. For example, in some embodiments of 3D projection displays using polarizing beam-splitters and digital light processing (DLP) panels, as disclosed in reference D4, an angular field of ±18° in air is needed. The thin film coating PBS6 in accordance with the present invention is designed for such an application or applications with similar requirement that could only previously be met with the Li Li PBS although for much larger prism sizes. PBS6 uses a glass prism substrate with a refractive index $n_0$=1.52 and identical coating materials as for PBS1-PBS3 with $MgF_2$ ($n_L$=1.38), $Nb_2O_5$ ($n_H$=2.35) and $Al_2O_3$ ($n_A$=1.65). Detailed layer structures with each layer's thickness and refractive index for the design PBS6 are listed in Table 5. A summary of the coating designs as well as their performance are listed in Table 7.

FIGS. 16A and 16B show the calculated transmittance and reflectance for s- and p-polarized light, respectively, the thin dashed lines represent Ts or Rp for 9 equally spaced operational angles, and the thick dashed line represents Ts or Rp averaged over 17 equally spaced operational angles, the thin dash-dot lines represent Tp or Rs for 9 equally spaced operational angles, and the thick solid line represents Tp or Rs averaged over 17 equally spaced operational angles. The merit function of PBS6 is 0.954. The average extinction ratios in transmission and reflection are 241:1 and 126:1.

Polarizing beam-splitters in accordance with embodiments of the present invention can be designed for different wavelength regions such as UV, near infrared, middle infrared and far infrared spectral regions and different wavelength bandwidths. For some applications such as 3D projection displays using six reflective liquid crystal panels or liquid crystal on silicon panels as disclosed in reference D5 and D6, blue, green and red polarizing beam-splitters are required with very high average extinction ratios. The two blue polarizers PBS-B1 and PBS-B2 in accordance with the present invention for the wavelength region 400-500 nm and angular field±12° in air are designed for such applications or applications with similar requirements. Detailed layer structures with each layer's thickness and refractive index for the designs PBS-B1 and PBS-B2 are listed in Table 6. A summary of the coating designs as well as their performance are listed in Table 8. PBS-B1 uses glass prism substrates with refractive index $n_0$=1.52 and coating materials $MgF_2$ ($n_L$=1.38), $Nb_2O_5$ ($n_H$=2.35) and $Al_2O_3$ ($n_A$=1.65). PBS-B2 uses prism substrates with refractive index $n_0$=1.85, such as Schott glass SF57HHT or Ohara glass PBH56, and coating materials $SiO_2$ with $n_L$=1.47, $Nb_2O_5$ with $n_H$=2.35 and $Al_2O_3$ with $n_A$=1.75. Because of the smaller wavelength bandwidth, the central incident angles or operational angles $\theta_{0Cen}$ are reduced for PBS-B1 ($\theta_{0Cen}$=64°) and PBS-B2 ($\theta_{0Cen}$=48.5°), compared to the related broader wavelength bandwidth designs PBS3 ($\theta_{0Cen}$=68°) and PBS5 ($\theta_{0Cen}$=49.5°).

FIGS. 17A and 18A show the calculated transmittance for s- and p-polarized light of PBS-B1 and PBS-B2 of the present invention, respectively, the thin dashed lines represent Ts for 9 equally spaced operational angles, and the thick dashed line represents Ts averaged over 17 equally spaced operational angles, the thin dash-dot lines represent Tp for 9 equally spaced operational angles, and the thick solid line represents Tp averaged over 17 equally spaced operational angles. FIGS. 17B and 17B show the calculated reflectance for s- and p-polarized light of PBS-B1 and PBS-B2 of the present invention, respectively, the thin dashed lines represent Rp for 9 equally spaced operational angles, and the thick dashed line represents Rp averaged over 17 equally spaced operational angles, the thin dash-dot lines represent Rs for 9 equally spaced operational angles, and the thick solid line represents Rs averaged over 17 equally spaced operational angles. The merit functions of PBS-B1 and PBS-B2 are 0.00334 and 0.0387, respectively. The average extinction ratios in transmission of PBS-B1 and PBS-B2 are 75,552:1 and 10,392:1, respectively. The average extinction ratios in reflection of PBS-B1 and PBS-B2 are 41,317:1 and 3,441:1, respectively. Such high extinction ratios can meet the requirement to achieve high contrast and low cross-talk in 3D projection displays using LCOS panels as disclosed in references D5 and D6. The requirement for high extinction ratios can also be achieved with the Li Li PBS although with much larger prism sizes. PBS-B1 and PBS-B2 can be easily modified to work for green and red light with spectral ranges 500-600 nm and 600-700 nm, respectively. The above embodiments of thin film polarizing beam-splitter coatings PBS1-6 and PBS-B1 and PBS-B2 are either bonded by using an index matching optical glue layer 50 or using optical contacting.

When an index-matching glue is not available, an optical glue with optical index $n_S$ different to that of the substrate can be used. The designs PBS7 and PBS-B3 in accordance with the present invention are designed for an exit medium of optical glue $n_S$=1.56. PBS7 and PBS-B3 are designed for white light from 420-680 nm and blue light from 400-500 nm, respectively, with angular field±12° in air. Detailed layer structures with each layer's thickness and refractive index for the designs PBS7 and PBS-B3 are listed in Tables 5 and 6, respectively. A summary of the coating designs as well as their performance are listed in Table 7 and 8. Both PBS7 and PBS-B3 use glass prism substrates with a refractive index $n_0$=1.85 such as Schott glass SF57HHT or Ohara glass PBH56, and coating materials SiO$_2$ ($n_L$=1.47), Nb$_2$O$_5$ ($n_H$=2.35) and Al$_2$O$_3$ ($n_A$=1.65). The AR coatings for PBS7 and PBS-B3 are designed to remove reflection at the interface $n_0/n_S$ for p-polarized light for all wavelengths and operational angles. They can use the same coating materials as PBS7 and PBS-B3 or different coating materials. Their designs are straight forward for a person skilled in the art and thus are not presented here.

FIGS. 19A and 20A show the calculated transmittance for s- and p-polarized light of PBS7 and PBS-B3 of the present invention, respectively, the thin dashed lines represent Ts for 9 equally spaced operational angles, and the thick dashed line represents Ts averaged over 17 equally spaced operational angles, the thin dash-dot lines represent Tp for 9 equally spaced operational angles, and the thick solid line represents Tp averaged over 17 equally spaced operational angles. FIGS. 19B and 20B show the calculated reflectance for s- and p-polarized light of PBS7 and PBS-B3 of the present invention, respectively, the thin dashed lines represent Rp for 9 equally spaced operational angles, and the thick dashed line represents Rp averaged over 17 equally spaced operational angles, the thin dash-dot lines represent Rs for 9 equally spaced operational angles, and the thick solid line represents Rs averaged over 17 equally spaced operational angles. The merit functions of PBS7 and PBS-B3 are 0.906 and 0.039, respectively. The average extinction ratios in transmission of PBS7 and PBS-B3 are 216:1 and 9, 584:1, respectively. The average extinction ratios in reflection of PBS7 and PBS-B3 are 143:1 and 3, 413:1, respectively.

Without departing from the spirit of the invention, thin film polarizing beam-splitters in accordance with embodiments of the present invention can be designed using different coating and substrate materials to operate for different wavelength regions, angular field, angular range, etc.

We claim:

1. A polarizing beam splitter comprising:
a pair of opposed transparent prism substrates having substantially the same refractive index $n_0$, said pair of opposed transparent substrates providing at least one input port and at least one output port, wherein said input port accepts light incident over a range of operational angles including a central operational angle;
a multilayer thin film structure sandwiched between said pair of opposed transparent substrates and consisting essentially of a plurality of layers $l_1 \ldots l_m$ having respective refractive indices $n_1 \ldots n_m$, wherein at least three of said refractive indices $n_1 \ldots n_m$ are different, and wherein each pair of adjacent layers form a layer interface with different refractive indices, and wherein the refractive index of the substrates $n_0$ lies between a highest refractive index $n_H$ and a lowest refractive index $n_L$, and wherein $n_H$, $n_L$ and $n_0$ define a Brewster angle $\theta_{OB}$:

$$\theta_{OB} = \arcsin\left(\frac{n_L n_H}{n_0\sqrt{n_L^2 + n_H^2}}\right), \text{ and}$$

a critical angle $\theta_C$:

$$\theta_C = \arcsin\left(\frac{n_L}{n_0}\right), \text{ and}$$

wherein said refractive indices $n_0$, and $n_1 \ldots n_m$ are selected such that the central operational angle for a beam incident on said multilayer thin film structure lies at least 4° above the Brewster angle $\theta_{OB}$ and such that most or all the operational angles defined by said input port lie above the Brewster angle $\theta_{OB}$;
wherein said multilayer thin film structure is a non-quarterwave stack, at least three different layer interfaces that each occur more than once are present within said multilayer thin film structure; and
wherein for p-polarized light at least one optical admittance of said layers with refractive indices $n_1 \ldots n_m$ is lower or very close to that of the optical admittance of said substrate for said operational angles such that said polarizing beam-splitter favors transmittance for p-polarized light incident at said input port such that most of the p-polarized light is transmitted through said multilayer thin film structure; and thr s-polarized light said polarizing beam-splitter acts as a high reflective coating to favor reflectance for s-polarized light incident at said input port such that most of the s-polarized light is reflected from said multilayer thin film structure.

2. A polarizing beam splitter as claimed in claim 1, wherein said refractive indices $n_0$ and $n_1 \ldots n_m$ are selected such that some of the operational angles also lie above the critical angle $\theta_C$.

3. A polarizing beam splitter as claimed in claim 1, wherein said at least one output port includes a transmitted beam output port for said p-polarized light and a reflected beam port for said s-polarized light.

4. A polarizing beam splitter as claimed in claim 1, wherein the lowest refractive index layer is made of SiO$_2$.

5. A polarizing beam splitter as claimed in claim 1, wherein the lowest refractive index layer is made of MgF$_2$.

6. A polarizing beam splitter as claimed in claim 1, wherein said multilayer thin film structure is bonded between said two transparent substrates by a glue layer having a refractive index $n_S$ matching the refractive index $n_0$ of said pair of substrates.

7. A polarizing beam splitter as claimed in claim 1, wherein said multilayer thin film structure is bonded between said two transparent substrates by a glue layer having a refractive index $n_S$ different from the refractive index $n_0$ of said pair of substrates, and wherein $n_S$ is selected such that the incident angle within the glue layer for all operational angles of the incident light is smaller than a critical angle $\theta_{CS}$ defined by:

$$\theta_{CS} = \arcsin\left(\frac{n_S}{n_0}\right).$$

8. A polarizing beam splitter as claimed in claim 7, wherein an anti-reflection coating is present between said glue layer and one of said substrates to promote the transmission of the p-polarized light.

9. A polarizing beam splitter as claimed in claim 1, wherein the thicknesses of the layers of said multilayer thin film structure are different from quarterwave stacks.

10. A polarizing beam splitter as claimed in claim 1, wherein the substrates are made of transparent optical glasses selected from the group consisting of: BK7, SF4, SF57HHT and PBH56.

11. A polarizing beam splitter as claimed in claim 1, wherein the substrates are made of BK7 glass and the thin film structure is made up of layers of MgF$_2$, Nb$_2$O$_5$ and Al$_2$O$_3$.

12. A polarizing beam splitter as claimed in claim 1, wherein the transparent prism substrates have a refractive index of at least 1.75.

13. A polarizing beam splitter as claimed in claim 1, wherein the transparent prism substrates are made of prism glass having a refractive index of 1.75 and the thin film structure is made up of layers of $MgF_2$, $Nb_2O_5$ and $Al_2O_3$.

14. A polarizing beam splitter as claimed in claim 1, wherein the transparent prism substrates are made of prism glass having a refractive index of 1.85 and the thin film structure is made up of layers of $SiO_2$, $Nb_2O_5$ and at least one layer selected from the group consisting of $SiO_2$, $Nb_2O_5$ and $Al_2O_3$.

15. A polarizing beam splitter as claimed in claim 1, wherein the transparent prism substrates are made of prism glass having a refractive index of 1.85 and the thin film structure is made up of layers of $SiO_2$, $Nb_2O_5$ and $Al_2O_3$.

16. A polarizing beam splitter as claimed in claim 1, wherein the Brewster angle is about 51.5° and the central operating angle lies in the range of 58° to 68°.

17. A polarizing beam splitter as claimed in claim 1, wherein the Brewster angle is about 42.5° and the central operating angle lies in the range of 48° to 52°.

18. A polarizing beam splitter as claimed in claim 1, wherein the substrates are made of nominally equivalent glass from different sources, and have slightly different refractive indices, $n_0$ and $n_0'$.

19. A method of making a polarizing beam splitter, comprising:
providing a pair of transparent prism substrates having substantially the same refractive index $n_0$, and each having a planar surface;
coating the planar surface of at least one of said prisms with a multilayer thin film structure; and
bonding said transparent prism substrates together with said multilayer thin film structure sandwiched therebetween to provide a prism structure having at least one input port and at least one output port, wherein said input port accepts light incident over a range of operational angles including a central operational angle;
wherein said multilayer thin film structure consists essentially of a plurality of layers $l_1 \ldots l_m$ having respective refractive indices $n_1 \ldots n_m$, wherein at least three of said refractive indices $n_1 \ldots n_m$ are different, and wherein each pair of adjacent layers form a layer interface with different refractive indices, and wherein the refractive index of the substrates $n_0$ lies between a highest refractive index $n_H$ and a lowest refractive index $n_L$, and wherein $n_H$, $n_L$, and $n_0$ define a Brewster angle $\theta_{0B}$:

$$\theta_{0B} = \arcsin\left(\frac{n_L n_H}{n_0\sqrt{n_L^2 + n_H^2}}\right), \text{ and}$$

a critical angle $\theta_C$:

$$\theta_C = \arcsin\left(\frac{n_L}{n_0}\right), \text{ and}$$

wherein the values of said refractive indices $n_0$ and $n_1 \ldots n_m$ are selected to make the central operational angle for a beam incident on said multilayer thin film structure lie at least 4' above the Brewster angle $\theta_{0B}$ and most or all the operational angles defined by said input port lie above the Brewster angle $\theta_{0B}$; and wherein said multilayer thin film structure is a non-quarterwave stack, at least three different layer interfaces that each occur more than once are present within said multilayer thin film structure; and wherein for p-polarized light at least one optical admittance of said layers with refractive indices $n_1 \ldots n_m$ is lower or very close to that of the optical admittance of said substrate for said operational angles such that said polarizing beam-splitter favors transmittance for p-polarized light incident at said input port such that most of the p-polarized light is transmitted through said multilayer thin film structure; and for s-polarized light said polarizing beam-splitter acts as a high reflective coating to favor reflectance for s-polarized light incident at said input port such that most of the s-polarized light is reflected from said multilayer thin film structure.

20. A method as claimed in claim 19, wherein some of the operational angles also lie above the critical angle $\theta_C$.

21. A method as claimed in claim 19, wherein said at least one output port includes a transmitted beam output port for said p-polarized light and a reflected beam port for said s-polarized light.

22. A method as claimed in claim 19, wherein the lowest refractive index layer is made of $SiO_2$.

23. A method as claimed in claim 19, wherein the lowest refractive index layer is made of $MgF_2$.

24. A method as claimed in claim 19, wherein said two transparent prism substrates are bonded together by a glue layer having a refractive index $n_S$ matching the refractive index $n_0$ of said pair of substrates.

25. A method as claimed in claim 19, wherein said two transparent prism substrates are bonded together by a glue layer having a refractive index $n_S$ different from the refractive index $n_0$ of said pair of substrates, and wherein $n_S$ is selected such that the incident angle within the glue layer for all operational angles of the incident light is smaller than a critical angle $\theta_{CS}$ defined by:

$$\theta_{CS} = \arcsin\left(\frac{n_S}{n_0}\right).$$

26. A method as claimed in claim 19, further comprising forming an anti-reflection coating between said glue layer and one of said substrates to promote the transmission of the p-polarized light.

27. A method as claimed in claim 19, wherein the computed thicknesses of the layers of said multilayer thin film structure are different from quarterwave stacks.

28. A method as claimed in claim 19, wherein the substrates are made of BK7 glass and the thin film structure is made up of layers of $MgF_2$, $Nb_2O_5$ and $Al_2O_3$.

29. A method as claimed in claim 19, wherein the transparent prism substrates have a refractive index of at least 1.75.

30. A method as claimed in claim 19, wherein the transparent prism substrates are made of prism glass having a refractive index of 1.75 and the thin film structure is made up of layers of $MgF_2$, $Nb_2O_5$ and $Al_2O_3$.

31. A method as claimed in claim 19, wherein the transparent prism substrates are made of prism glass having a refractive index of 1.85 and the thin film structure is made up of layers of $SiO_2$, $Nb_2O_5$ and at least one layer selected from the group consisting of $SiO_2$, $Nb_2O_5$ and $Al_2O_3$.

32. A method as claimed in claim 19, wherein the transparent prism substrates are made of prism glass having a refractive index of 1.85 and the thin film structure is made up of layers of $SiO_2$, $Nb_2O_5$ and $Al_2O_3$.

33. A method as claimed in claim 19, wherein the Brewster angle is about 51.5° and the central operating angle lies in the range of 58° to 68°.

34. A method as claimed in claim 19, wherein the Brewster angle is about 42.5° and the central operating angle lies in the range of 48° to 52°.

* * * * *